(12) United States Patent
Arai et al.

(10) Patent No.: US 6,532,591 B1
(45) Date of Patent: Mar. 11, 2003

(54) SYSTEM FOR DOWNLOADING COMPUTER SOFTWARE WITH BROADCASTING PROGRAM

(75) Inventors: Yuko Arai, Tokyo (JP); Takayuki Suzuki, Tokyo (JP); Tomoyuki Karibe, Tokyo (JP); Hiroki Shinohara, Yokohama (JP); Hiroyuki Hikita, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/158,492

(22) Filed: Sep. 23, 1998

(30) Foreign Application Priority Data

Sep. 24, 1997  (JP) .............................................. 9-258127

(51) Int. Cl.⁷ ......................... H04N 5/445; H04N 7/173
(52) U.S. Cl. ........................... 725/132; 725/37; 725/86; 725/91; 725/98; 725/114
(58) Field of Search .............................. 725/60, 61, 67, 725/68, 86, 105, 117, 132, 140, 152, 114–118, 90–93, 98, 37

(56) References Cited

U.S. PATENT DOCUMENTS

| | | | |
|---|---|---|---|
| 5,003,591 A | | 3/1991 | Kauffman et al. |
| 5,367,571 A | | 11/1994 | Bowen et al. |
| 5,635,979 A | | 6/1997 | Kostreski et al. |
| 5,666,293 A | * | 9/1997 | Metz et al. ............... 395/200.5 |
| 5,687,331 A | * | 11/1997 | Volk et al. ................... 395/327 |
| 5,729,549 A | * | 3/1998 | Kostreski et al. ........... 370/522 |
| 5,734,589 A | * | 3/1998 | Kostreski et al. ....... 364/514 A |
| 5,951,639 A | * | 9/1999 | MacInnis .................... 709/217 |
| 6,061,449 A | * | 5/2000 | Candelore et al. ............ 380/28 |

FOREIGN PATENT DOCUMENTS

| | | |
|---|---|---|
| DE | 19642558 | 4/1997 |
| EP | 0723372 | 7/1996 |
| JP | 8-195952 | 7/1996 |
| WO | WO97/30549 | 8/1997 |

* cited by examiner

*Primary Examiner*—Andrew Faile
*Assistant Examiner*—Kieu-Oanh Bui
(74) *Attorney, Agent, or Firm*—Lowe Hauptman Gilman & Berner, LLP

(57) ABSTRACT

A guide of a broadcasting program with a computer software product, in which a transmission start time, a name of the broadcasting program, a name of the computer software product, a version number of the computer software product and a terminal type required of a terminal are listed, is transmitted from a center station to each terminal. Also, files of the computer software product are transmitted from the center station to each terminal with video-audio data of the broadcasting program at the transmission start time. In each terminal, a particular terminal type of the terminal and a particular version number of the computer software product downloaded in the terminal are managed. In cases where the particular terminal type of the terminal agrees with the terminal type listed in the guide and the particular version number of the computer software product is higher than the version number listed in the guide, the downloading of the computer software product is judged, and the computer software product is downloaded to the terminal at the transmission start time. Accordingly, the computer software product can be downloaded to user's terminal without requiring a special frequency band used only for the computer software product. Also, because the computer software product received in the terminal is updated, the user can always execute the updated computer software product.

15 Claims, 64 Drawing Sheets

FIG. 3

| NAME OF COMPUTER SOFTWARE | CA | | OS | |
|---|---|---|---|---|
| VERSION NO. | 7 | | 6 | |
| TERMINAL TYPE | M | | P | |
| ELEMENTS | FILE NAME | VERSION NO. | FILE NAME | VERSION NO. |
| | FL1 | 3 | FL7 | 2 |
| | FL5 | 5 | FL3 | 5 |

FIG. 4

| DATE | CHANNEL | TRANSMISSION START TIME | TRANSMISSION FINISH TIME | NAME OF BROADCASTING PROGRAM | ELEMENTS | NAME OF COMPUTER SOFTWARE |
|---|---|---|---|---|---|---|
| 6/25,'97 | CH1 | 6:00 | 7:00 | MORNING NEWS | Dv1, Da1 | |
| 6/25,'97 | CH1 | 7:00 | 7:30 | PING-PONG KIDS | Dv2, Da3 | |
| 6/25,'97 | CH1 | 7:30 | 8:00 | MORNING DOWNLOAD | Dv11, Da11, FL1, FL5 | CA |
| 6/25,'97 | CH2 | 6:00 | 7:00 | NEWS 6 | Dv5, Da7 | |
| 6/25,'97 | CH2 | 7:00 | 8:00 | LET'S PLAY WITH MOTHERS | Dv3, Da2 | |
| 6/25,'97 | CH2 | 8:00 | 9:00 | DOWNLOAD A | Dv12, Da12, FL7, FL3 | OS |

Dv : VISUAL DATA
Da : AUDIO DATA

FIG. 5

| DATE | CHANNEL | TRANSMISSION START TIME | TRANSMISSION FINISH TIME | NAME OF BROADCASTING PROGRAM | ELEMENTS NAME | ELEMENTS VERSION NO. | NAME OF COMPUTER SOFTWARE | VERSION NO. OF SOFTWARE | TERMINAL TYPE |
|---|---|---|---|---|---|---|---|---|---|
| 6/25,'97 | CH1 | 6:00 | 7:00 | MORNING NEWS | Dv1<br>Da1 | | | | |
| 6/25,'97 | CH1 | 7:00 | 7:30 | PING-PONG KIDS | Dv2<br>Da3 | | | | |
| 6/25,'97 | CH1 | 7:30 | 8:00 | MORNING DOWNLOAD | Dv11<br>Da11<br>FL1<br>FL5 | <br><br>3<br>4 | CA | 7 | M |
| 6/25,'97 | CH2 | 6:00 | 7:00 | NEWS 6 | Dv5<br>Da7 | | | | |
| 6/25,'97 | CH2 | 7:00 | 8:00 | LET'S PLAY WITH MOTHERS | Dv3<br>Da2 | | | | |
| 6/25,'97 | CH2 | 8:00 | 9:00 | DOWNLOAD A | Dv12<br>Da12<br>FL7<br>FL3 | <br><br>2<br>5 | OS | 6 | P |

Dv : VISUAL DATA
Da : AUDIO DATA

FIG. 6

| DATE | CHANNEL | TRANSMISSION START TIME | TRANSMISSION FINISH TIME | NAME OF BROADCASTING PROGRAM | ELEMENTS NAME | VERSION NO. | NAME OF COMPUTER SOFTWARE | VERSION NO. OF SOFTWARE | TERMINAL TYPE |
|---|---|---|---|---|---|---|---|---|---|
| 6/25,'97 | CH1 | 7:30 | 8:00 | MORNING DOWNLOAD | FL1<br>FL5 | 3<br>4 | CA | 7 | M |
| 6/25,'97 | CH2 | 8:00 | 9:00 | DOWNLOAD A | FL7<br>FL3 | 2<br>5 | OS | 6 | P |

FIG. 7

| TERMINAL TYPE | M |
|---|---|

FIG. 8

| NAME OF COMPUTER SOFTWARE | CA | | OS | | DSMCC | |
|---|---|---|---|---|---|---|
| VERSION NO. | 6 | | 6 | | 5 | |
| ELEMENTS | FILE NAME | VERSION NO. | FILE NAME | VERSION NO. | FILE NAME | VERSION NO. |
| | FL1 | 2 | FL7 | 2 | FL10 | 5 |
| | FL5 | 4 | FL3 | 5 | FL12 | 3 |
| | | | | | FL20 | 19 |

FIG. 9

| DATE | CHANNEL | TRANSMISSION START TIME | TRANSMISSION FINISH TIME | NAME OF BROADCASTING PROGRAM | ELEMENTS NAME | ELEMENTS VERSION NO. | NAME OF COMPUTER SOFTWARE | VERSION NO. OF SOFTWARE |
|---|---|---|---|---|---|---|---|---|
| 6/25,'97 | CH1 | 7:30 | 8:00 | MORNING DOWNLOAD | FL1 | 3 | CA | 7 |
|  |  |  |  |  | FL5 | 4 |  |  |

FIG. 10

| DATE | CHANNEL | TRANSMISSION START TIME | TRANSMISSION FINISH TIME | NAME OF BROADCASTING PROGRAM | DOWNLOAD FILE NAME | DOWNLOAD FILE VERSION NO. | NAME OF COMPUTER SOFTWARE | VERSION NO. OF SOFTWARE |
|---|---|---|---|---|---|---|---|---|
| 6/25,'97 | CH1 | 7:30 | 8:00 | MORNING DOWNLOAD | FL1 | 3 | CA | 7 |

FIG. 11
| NAME OF COMPUTER SOFTWARE | CA | | OS | | DSMCC | |
|---|---|---|---|---|---|---|
| VERSION NO. | 7 | | 6 | | 5 | |
| ELEMENTS | FILE NAME | VERSION NO. | FILE NAME | VERSION NO. | FILE NAME | VERSION NO. |
| | FL1 | 3 | FL7 | 2 | FL10 | 5 |
| | FL5 | 4 | FL3 | 5 | FL12 | 3 |
| | | | | | FL20 | 19 |
FIG. 12
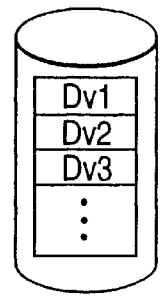
FIG. 13
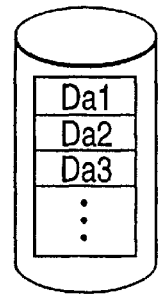
FIG. 14
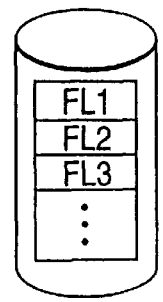

| CHANNEL | NAME OF BROADCASTING PROGRAM | DOWNLOAD FILE | | NAME OF SOFTWARE | VERSION OF SOFTWARE |
|---|---|---|---|---|---|
| | | NAME | VERSION | | |
| CH1 | MORNING DOWNLOAD | FL1 | 3 | CA | 7 |

FIG. 20

| NAME OF COMPUTER SOFTWARE | CA | | OS | | DSMCC | |
|---|---|---|---|---|---|---|
| VERSION NO. | 7 | | 6 | | 5 | |
| TERMINAL TYPE | M | | P | | P | |
| ELEMENTS | FILE NAME | VERSION NO. | FILE NAME | VERSION NO. | FILE NAME | VERSION NO. |
| | FL1 | 3 | FL7 | 2 | FL10 | 5 |
| | FL5 | 5 | FL3 | 5 | FL12 | 3 |
| | | | | | FL20 | 19 |
| DOWNLOAD COMPLETION NOTICE FLAG | 1 | | 0 | | 1 | |

FIG. 22

| TERMINAL TYPE | M |
|---|---|
| IDENTIFICATION NO. | 12345 |

FIG. 25

| NAME OF COMPUTER SOFTWARE | CA | OS | DSMCC |
|---|---|---|---|
| VERSION NO. | 7 | 6 | 5 |
| TERMINAL TYPE | M | P | P |
| IDENTIFICATION NO. OF TERMINAL | 12345 | 23456 | 87694 |
| | 55555 | 77777 | 67832 |
| | 00001 | 00678 | 25367 |
| | ⋮ | ⋮ | ⋮ |

FIG. 21

| DATE | CHANNEL | TRANSMISSION START TIME | TRANSMISSION FINISH TIME | NAME OF BROADCASTING PROGRAM | ELEMENTS NAME | ELEMENTS VERSION NO. | NAME OF COMPUTER SOFTWARE | VERSION NO. OF SOFTWARE | TERMINAL TYPE | DOWNLOAD COMPLETION NOTICE FLAG |
|---|---|---|---|---|---|---|---|---|---|---|
| 6/25,'97 | CH1 | 6:00 | 7:00 | MORNING NEWS | Dv1<br>Da1 | | | | | |
| 6/25,'97 | CH1 | 7:00 | 7:30 | PING-PONG KIDS | Dv2<br>Da3 | | | | | |
| 6/25,'97 | CH1 | 7:30 | 8:00 | MORNING DOWNLOAD | Dv11<br>Da11<br>FL1<br>FL5 | <br><br>3<br>4 | CA | 7 | M | 1 |
| 6/25,'97 | CH2 | 6:00 | 7:00 | NEWS 6 | Dv5<br>Da7 | | | | | |
| 6/25,'97 | CH2 | 7:00 | 8:00 | LET'S PLAY WITH MOTHER | Dv3<br>Da2 | | | | | |
| 6/25,'97 | CH2 | 8:00 | 9:00 | DOWNLOAD A | Dv12<br>Da12<br>FL7<br>FL3 | <br><br>2<br>5 | OS | 6 | P | 0 |
| 6/25,'97 | CH2 | 9:00 | 9:45 | LET'S DOWNLOAD | Dv13<br>Da13<br>FL10<br>FL12<br>FL20 | <br><br>5<br>3<br>19 | DSMCC | 5 | P | 1 |

Dv: VISUAL DATA
Da: AUDIO DATA

FIG. 23

| CHANNEL | TRANSMISSION START TIME | TRANSMISSION FINISH TIME | NAME OF BROADCASTING PROGRAM | DOWNLOAD FILE | | NAME OF SOFTWARE | VERSION OF SOFTWARE | DOWNLOAD COMPLETION NOTICE FLAG |
|---|---|---|---|---|---|---|---|---|
| | | | | NAME | VERSION | | | |
| CH1 | 7:30 | 8:00 | MORNING DOWNLOAD | FL1 | 3 | CA | 7 | 1 |

FIG. 24

| CHANNEL | NAME OF BROADCASTING PROGRAM | DOWNLOAD FILE | | NAME OF SOFTWARE | VERSION OF SOFTWARE | DOWNLOAD COMPLETION NOTICE FLAG |
|---|---|---|---|---|---|---|
| | | NAME | VERSION | | | |
| CH1 | MORNING DOWNLOAD | FL1 | 3 | CA | 7 | 1 |

| NAME OF COMPUTER SOFTWARE | CA | | OS | | DSMCC | |
|---|---|---|---|---|---|---|
| VERSION NO. | 7 | | 6 | | 5 | |
| TERMINAL TYPE | M | | P | | P | |
| ELEMENTS | FILE NAME | VERSION NO. | FILE NAME | VERSION NO. | FILE NAME | VERSION NO. |
| | FL1 | 3 | FL7 | 2 | FL10 | 5 |
| | FL5 | 5 | FL3 | 5 | FL12 | 3 |
| | | | | | FL20 | 19 |
| SOFTWARE TYPE | USER APPLICATION (U.A.) | | SYSTEM APPLICATION (S.A.) | | USER APPLICATION (U.A.) | |

FIG. 28

| DATE | CHANNEL | TRANSMISSION START TIME | TRANSMISSION FINISH TIME | NAME OF BROADCASTING PROGRAM | ELEMENTS NAME | ELEMENTS VERSION NO. | NAME OF COMPUTER SOFTWARE | VERSION NO. OF SOFTWARE | TERMINAL TYPE | SOFTWARE TYPE |
|---|---|---|---|---|---|---|---|---|---|---|
| 6/25,'97 | CH1 | 6:00 | 7:00 | MORNING NEWS | Dv1 | | | | | |
| | | | | | Da1 | | | | | |
| 6/25,'97 | CH1 | 7:00 | 7:30 | PING-PONG KIDS | Dv2 | | | | | |
| | | | | | Da3 | | | | | |
| 6/25,'97 | CH1 | 7:30 | 8:00 | MORNING DOWNLOAD | Dv11 | | CA | 7 | M | U.A. |
| | | | | | Da11 | | | | | |
| | | | | | FL1 | 3 | | | | |
| | | | | | FL5 | 4 | | | | |
| 6/25,'97 | CH2 | 6:00 | 7:00 | NEWS 6 | Dv5 | | | | | |
| | | | | | Da7 | | | | | |
| 6/25,'97 | CH2 | 7:00 | 8:00 | LET'S PLAY WITH MOTHER | Dv3 | | | | | |
| | | | | | Da2 | | | | | |
| 6/25,'97 | CH2 | 8:00 | 9:00 | DOWNLOAD A | Dv12 | | OS | 6 | P | S.A. |
| | | | | | Da12 | | | | | |
| | | | | | FL7 | 2 | | | | |
| | | | | | FL3 | 5 | | | | |
| 6/25,'97 | CH2 | 9:00 | 9:45 | LET'S DOWNLOAD | Dv13 | | DSMCC | 5 | P | U.A. |
| | | | | | Da13 | | | | | |
| | | | | | FL10 | 5 | | | | |
| | | | | | FL12 | 3 | | | | |
| | | | | | FL20 | 19 | | | | |

Dv : VISUAL DATA
Da : AUDIO DATA

FIG. 29

| DATE | CHANNEL | TRANSMISSION START TIME | TRANSMISSION FINISH TIME | NAME OF BROADCASTING PROGRAM | ELEMENTS NAME | ELEMENTS VERSION NO. | NAME OF COMPUTER SOFTWARE | VERSION NO. OF SOFTWARE | TERMINAL TYPE | SOFTWARE TYPE |
|---|---|---|---|---|---|---|---|---|---|---|
| 6/25,'97 | CH1 | 6:00 | 7:00 | MORNING NEWS | Dv1 Da1 | | | | | |
| 6/25,'97 | CH1 | 7:00 | 7:30 | PING-PONG KIDS | Dv2 Da3 | | | | | |
| 6/25,'97 | CH1 | 7:30 | 8:00 | MORNING DOWNLOAD | Dv11 Da11 FL1 FL5 | 3 4 | CA | 7 | M | U.A. |
| 6/25,'97 | CH2 | 6:00 | 7:00 | NEWS 6 | Dv5 Da7 | | | | | |
| 6/25,'97 | CH2 | 7:00 | 8:00 | LET'S PLAY WITH MOTHER | Dv3 Da2 | | | | | |

Dv: VISUAL DATA
Da: AUDIO DATA

FIG. 31

| DATE | CHANNEL | TRANSMISSION START TIME | TRANSMISSION FINISH TIME | NAME OF BROADCASTING PROGRAM | ELEMENTS NAME | ELEMENTS VERSION NO. | NAME OF COMPUTER SOFTWARE | VERSION NO. OF SOFTWARE | TERMINAL TYPE | SOFTWARE TYPE |
|---|---|---|---|---|---|---|---|---|---|---|
| 6/25,'97 | CH1 | 7:30 | 8:00 | MORNING DOWNLOAD | FL1 | 3 | CA | 7 | M | U.A. |
|  |  |  |  |  | FL5 | 4 |  |  |  |  |

FIG. 32

| DATE | CHANNEL | TRANSMISSION START TIME | TRANSMISSION FINISH TIME | NAME OF BROADCASTING PROGRAM | ELEMENTS NAME | ELEMENTS VERSION NO. | NAME OF COMPUTER SOFTWARE | VERSION NO. OF SOFTWARE | TERMINAL TYPE | SOFTWARE TYPE |
|---|---|---|---|---|---|---|---|---|---|---|
| 6/25,'97 | CH2 | 8:00 | 9:00 | DOWNLOAD A | FL7 | 2 | OS | 6 | P | S.A. |
|  |  |  |  |  | FL3 | 5 |  |  |  |  |

FIG. 36

| DATE | CHANNEL | TRANSMISSION START TIME | TRANSMISSION FINISH TIME | NAME OF BROADCASTING PROGRAM | RESERVED ELEMENTS NAME | RESERVED ELEMENTS VERSION | NAME OF SOFTWARE | VERSION OF SOFTWARE | TERMINAL TYPE |
|---|---|---|---|---|---|---|---|---|---|
| 6/25,'97 | CH1 | 10:00 | 11:00 | DAYTIME DRAMA | Dv1<br>Da1 | | | | |
| 6/25,'97 | CH1 | 18:00 | 18:30 | NEWS | Dv2<br>Da2 | | | | |
| 6/25,'97 | CH1 | 21:00 | 23:30 | MOVIE | Dv3<br>Da3 | | | | |

FIG. 37

| | |
|---|---|
| CURRENT DATE | 6/25,'97 |
| CURRENT TIME | 8:15 |

FIG. 38

| DATE | CHANNEL | TRANSMISSION START TIME | TRANSMISSION FINISH TIME | NAME OF BROADCASTING PROGRAM | DOWNLOAD FILE NAME | VERSION | NAME OF SOFTWARE | VERSION OF SOFTWARE | TERMINAL TYPE |
|---|---|---|---|---|---|---|---|---|---|
| 6/25,'97 | CH1 | 7:30 | 8:00 | MORNING DOWNLOAD | FL1 | 3 | CA | 7 | M |
| 6/25,'97 | CH1 | 8:00 | 8:30 | WEATHER DATA | FL9 | 4 | DAT | 2 | M |
| 6/25,'97 | CH1 | 8:30 | 9:00 | MORNING DOWNLOAD | FL1 | 3 | CA | 7 | M |
| 6/25,'97 | CH1 | 9:00 | 9:30 | WEATHER DATA | FL9 | 4 | DAT | 2 | M |
| 6/25,'97 | CH1 | 9:30 | 10:00 | MORNING DOWNLOAD | FL1 | 3 | CA | 7 | M |
| 6/25,'97 | CH1 | 10:00 | 10:30 | SPECIAL DOWNLOAD | FL10 | 6 | GUI | 3 | M |
| 6/25,'97 | CH1 | 11:00 | 11:30 | WEATHER DATA | FL9 | 4 | DAT | 2 | M |

FIG. 43

| DATE | CHANNEL | TRANSMISSION START TIME | TRANSMISSION FINISH TIME | NAME OF BROADCASTING PROGRAM | DOWNLOAD FILE NAME | DOWNLOAD FILE VERSION | NAME OF SOFTWARE | VERSION OF SOFTWARE | TERMINAL TYPE |
|---|---|---|---|---|---|---|---|---|---|
| 6/25,'97 | CH1 | 7:30 | 8:00 | MORNING DOWNLOAD | FL1 | 3 | CA | 7 | M |
| 6/25,'97 | CH1 | 8:00 | 9:00 | MORNING DOWNLOAD | FL1 | 3 | CA | 7 | M |
| 6/25,'97 | CH1 | 9:30 | 10:00 | MORNING DOWNLOAD | FL1 | 3 | CA | 7 | M |

FIG. 44

| DATE | CHANNEL | TRANSMISSION START TIME | TRANSMISSION FINISH TIME | NAME OF BROADCASTING PROGRAM | DOWNLOAD FILE NAME | DOWNLOAD FILE VERSION | NAME OF SOFTWARE | VERSION OF SOFTWARE | TERMINAL TYPE |
|---|---|---|---|---|---|---|---|---|---|
| 6/25,'97 | CH1 | 8:00 | 8:30 | WEATHER DATA | FL9 | 4 | DAT | 2 | M |
| 6/25,'97 | CH1 | 9:00 | 9:30 | WEATHER DATA | FL9 | 4 | DAT | 2 | M |
| 6/25,'97 | CH1 | 11:00 | 10:30 | WEATHER DATA | FL9 | 4 | DAT | 2 | M |

FIG. 45

| DATE | CHANNEL | TRANSMISSION START TIME | TRANSMISSION FINISH TIME | NAME OF BROADCASTING PROGRAM | DOWNLOAD FILE NAME | DOWNLOAD FILE VERSION | NAME OF SOFTWARE | VERSION OF SOFTWARE | TERMINAL TYPE |
|---|---|---|---|---|---|---|---|---|---|
| 6/25,'97 | CH1 | 10:00 | 10:30 | SPECIAL DOWNLOAD | FL10 | 6 | GUI | 3 | M |

FIG. 46

| DATE | CHANNEL | TRANSMISSION START TIME | TRANSMISSION FINISH TIME | NAME OF BROADCASTING PROGRAM | DOWNLOAD FILE | | NAME OF SOFTWARE | VERSION OF SOFTWARE | TERMINAL TYPE |
|---|---|---|---|---|---|---|---|---|---|
| | | | | | NAME | VERSION | | | |
| 6/25,'97 | CH1 | 8:30 | 9:00 | MORNING DOWNLOAD | FL1 | 3 | CA | 7 | M |

FIG. 47

| DATE | CHANNEL | TRANSMISSION START TIME | TRANSMISSION FINISH TIME | NAME OF BROADCASTING PROGRAM | DOWNLOAD FILE | | NAME OF SOFTWARE | VERSION OF SOFTWARE | TERMINAL TYPE |
|---|---|---|---|---|---|---|---|---|---|
| | | | | | NAME | VERSION | | | |
| 6/25,'97 | CH1 | 8:30 | 9:00 | MORNING DOWNLOAD | FL1 | 3 | CA | 7 | M |
| 6/25,'97 | CH1 | 9:00 | 9:30 | WEATHER DATA | FL9 | 4 | DAT | 2 | M |

FIG. 48

| DATE | CHANNEL | TRANSMISSION START TIME | TRANSMISSION FINISH TIME | NAME OF BROADCASTING PROGRAM | DOWNLOAD FILE | | NAME OF SOFTWARE | VERSION OF SOFTWARE | TERMINAL TYPE |
|---|---|---|---|---|---|---|---|---|---|
| | | | | | NAME | VERSION | | | |
| 6/25,'97 | CH1 | 9:00 | 9:30 | WEATHER DATA | FL9 | 4 | DAT | 2 | M |

FIG. 49

| DATE | CHANNEL | TRANSMISSION START TIME | TRANSMISSION FINISH TIME | NAME OF BROADCASTING PROGRAM | RESERVED ELEMENT | | NAME OF SOFTWARE | VERSION OF SOFTWARE | TERMINAL TYPE |
|---|---|---|---|---|---|---|---|---|---|
| | | | | | NAME | VERSION | | | |
| 6/25,'97 | CH1 | 8:30 | 9:00 | MORNING DOWNLOAD | FL1 | 3 | CA | 7 | M |
| 6/25,'97 | CH1 | 9:00 | 9:30 | WEATHER DATA | FL9 | 4 | DAT | 2 | M |
| 6/25,'97 | CH1 | 10:00 | 11:00 | DAYTIME DRAMA | Dv1 Da1 | | | | |
| 6/25,'97 | CH1 | 18:00 | 18:30 | NEWS | Dv2 Da2 | | | | |
| 6/25,'97 | CH1 | 21:00 | 23:30 | MOVIE | Dv3 Da3 | | | | |

FIG. 51

| DATE | CHANNEL | TRANSMISSION START TIME | TRANSMISSION FINISH TIME | NAME OF BROADCASTING PROGRAM | ELEMENTS NAME | ELEMENTS VERSION | NAME OF SOFTWARE | VERSION OF SOFTWARE | TERMINAL TYPE |
|---|---|---|---|---|---|---|---|---|---|
| 6/25,'97 | CH1 | 7:30 | 8:00 | MORNING DOWNLOAD | FL1 | 3 | CA | 7 | M |
|  |  |  |  |  | FL5 | 4 |  |  |  |
| 6/25,'97 | CH1 | 8:00 | 8:30 | WEATHER DATA | FL9 | 4 | DAT | 2 | M |
| 6/25,'97 | CH1 | 8:30 | 9:00 | MORNING DOWNLOAD | FL1 | 3 | CA | 7 | M |
|  |  |  |  |  | FL5 | 4 |  |  |  |
| 6/25,'97 | CH1 | 9:00 | 9:30 | WEATHER DATA | FL9 | 4 | DAT | 2 | M |
| 6/25,'97 | CH1 | 9:30 | 10:00 | SPECIAL DOWNLOAD | FL10 | 6 | GUI | 3 | M |
| 6/25,'97 | CH2 | 8:00 | 9:00 | DOWNLOAD A | FL7 | 2 | OS | 6 | P |
|  |  |  |  |  | FL3 | 5 |  |  |  |

FIG. 54

| DATE | CHANNEL | TRANSMISSION START TIME | TRANSMISSION FINISH TIME | NAME OF BROADCASTING PROGRAM | ELEMENTS NAME | ELEMENTS VERSION | NAME OF SOFTWARE | VERSION OF SOFTWARE | TERMINAL TYPE |
|---|---|---|---|---|---|---|---|---|---|
| 6/25,'97 | CH1 | 7:30 | 8:00 | MORNING DOWNLOAD | FL1 | 3 | CA | 7 | M |
| | | | | | FL5 | 4 | | | |
| 6/25,'97 | CH1 | 8:30 | 9:00 | MORNING DOWNLOAD | FL1 | 3 | CA | 7 | M |
| | | | | | FL5 | 4 | | | |

FIG. 56

| NAME OF SOFTWARE | | | |
|---|---|---|---|
| CA | | | |

FIG. 57

LIST OF DOWNLOAD COMPUTER SOFTWARES

| NAME OF SOFTWARE |
|---|
| CA |
| DAT |
| GUI |
| OS |

PLEASE SELECT COMPUTER SOFTWARE (S)

FIG. 60

| DATE | CHANNEL | TRANSMISSION START TIME | TRANSMISSION FINISH TIME | NAME OF BROADCASTING PROGRAM | RESERVED ELEMENTS | | NAME OF SOFTWARE | VERSION OF SOFTWARE | TERMINAL TYPE |
|---|---|---|---|---|---|---|---|---|---|
| | | | | | NAME | VERSION | | | |
| 6/25,'97 | CH1 | 9:00 | 10:00 | MORNING WIDE SHOW | Dv4 | | | | |
| | | | | | Da4 | | | | |

FIG. 62

| DATE | CHANNEL | TRANSMISSION START TIME | TRANSMISSION FINISH TIME | NAME OF BROADCASTING PROGRAM | DOWNLOAD FILE | | NAME OF SOFTWARE | VERSION OF SOFTWARE | TERMINAL TYPE |
|---|---|---|---|---|---|---|---|---|---|
| | | | | | NAME | VERSION | | | |
| 6/25,'97 | CH1 | 9:00 | 9:30 | WEATHER DATA | FL9 | 4 | DAT | 2 | M |

FIG. 63

| DATE | CHANNEL | TRANSMISSION START TIME | TRANSMISSION FINISH TIME | NAME OF BROADCASTING PROGRAM | DOWNLOAD FILE NAME | DOWNLOAD FILE VERSION | NAME OF SOFTWARE | VERSION OF SOFTWARE | TERMINAL TYPE |
|---|---|---|---|---|---|---|---|---|---|
| 6/25,'97 | CH1 | 7:30 | 8:00 | MORNING DOWNLOAD | FL1 | 3 | CA | 7 | M |
| 6/25,'97 | CH1 | 8:00 | 8:30 | WEATHER DATA | FL9 | 4 | DAT | 2 | M |
| 6/25,'97 | CH1 | 8:30 | 9:00 | MORNING DOWNLOAD | FL1 | 3 | CA | 7 | M |
| 6/25,'97 | CH1 | 9:30 | 10:00 | MORNING DOWNLOAD | FL1 | 3 | CA | 7 | M |
| 6/25,'97 | CH1 | 10:00 | 10:30 | SPECIAL DOWNLOAD | FL10 | 6 | GUI | 3 | M |
| 6/25,'97 | CH1 | 11:00 | 11:30 | WEATHER DATA | FL9 | 4 | DAT | 2 | M |

FIG. 64

| DATE | CHANNEL | TRANSMISSION START TIME | TRANSMISSION FINISH TIME | NAME OF BROADCASTING PROGRAM | DOWNLOAD FILE NAME | DOWNLOAD FILE VERSION | NAME OF SOFTWARE | VERSION OF SOFTWARE | TERMINAL TYPE |
|---|---|---|---|---|---|---|---|---|---|
| 6/25,'97 | CH1 | 8:30 | 9:00 | MORNING DOWNLOAD | FL1 | 3 | CA | 7 | M |
| 6/25,'97 | CH1 | 11:00 | 11:30 | WEATHER DATA | FL9 | 4 | DAT | 2 | M |

FIG. 65

| DATE | CHANNEL | TRANSMISSION START TIME | TRANSMISSION FINISH TIME | NAME OF BROADCASTING PROGRAM | DOWNLOAD FILE NAME | DOWNLOAD FILE VERSION | NAME OF SOFTWARE | VERSION OF SOFTWARE | TERMINAL TYPE |
|---|---|---|---|---|---|---|---|---|---|
| 6/25,'97 | CH1 | 11:00 | 11:30 | WEATHER DATA | FL9 | 4 | DAT | 2 | M |

FIG. 67

| DATE | CHANNEL | TRANSMISSION START TIME | TRANSMISSION FINISH TIME | NAME OF BROADCASTING PROGRAM | RESERVED ELEMENTS NAME | RESERVED ELEMENTS VERSION | NAME OF SOFTWARE | VERSION OF SOFTWARE | TERMINAL TYPE |
|---|---|---|---|---|---|---|---|---|---|
| 6/25,'97 | CH1 | 8:30 | 9:00 | MORNING DOWNLOAD | FL1 | 3 | CA | 7 | M |
| 6/25,'97 | CH1 | 10:00 | 11:00 | DAYTIME DRAMA | Dv1 Da1 | | | | |
| 6/25,'97 | CH1 | 18:00 | 18:30 | NEWS | Dv2 Da2 | | | | |
| 6/25,'97 | CH1 | 21:00 | 23:30 | MOVIE | Dv3 Da3 | | | | |

FIG. 68

| DATE | CHANNEL | TRANSMISSION START TIME | TRANSMISSION FINISH TIME | NAME OF BROADCASTING PROGRAM | RESERVED ELEMENTS NAME | RESERVED ELEMENTS VERSION | NAME OF SOFTWARE | VERSION OF SOFTWARE | TERMINAL TYPE |
|---|---|---|---|---|---|---|---|---|---|
| 6/25,'97 | CH1 | 8:30 | 9:00 | MORNING DOWNLOAD | FL1 | 3 | CA | 7 | M |
| 6/25,'97 | CH1 | 9:00 | 10:00 | MORNING WIDE SHOW | Dv4 Da4 | | | | |
| 6/25,'97 | CH1 | 10:00 | 11:00 | DAYTIME DRAMA | Dv1 Da1 | | | | |
| 6/25,'97 | CH1 | 11:00 | 11:30 | WEATHER DATA | FL9 | 4 | DAT | 2 | M |
| 6/25,'97 | CH1 | 18:00 | 18:30 | NEWS | Dv2 Da2 | | | | |
| 6/25,'97 | CH1 | 21:00 | 23:30 | MOVIE | Dv3 Da3 | | | | |

FIG. 72

| DATE | CHANNEL | TRANSMISSION START TIME | TRANSMISSION FINISH TIME | NAME OF BROADCASTING PROGRAM | ELEMENTS NAME | ELEMENTS VERSION | NAME OF SOFTWARE | VERSION OF SOFTWARE | TERMINAL TYPE | NAME OF PROTOCOL |
|---|---|---|---|---|---|---|---|---|---|---|
| 6/25,'97 | CH1 | 6:00 | 7:00 | MORNING NEWS | Dv1 Da1 | | | | | |
| 6/25,'97 | CH1 | 7:00 | 7:30 | PING-PONG KIDS | Dv2 Da3 | | | | | |
| 6/25,'97 | CH1 | 7:30 | 8:00 | MORNING DOWNLOAD | Dv11 Da11 FL1 FL5 | 3 4 | CA | 7 | M | A |
| 6/25,'97 | CH2 | 6:00 | 7:00 | NEWS 6 | Dv5 Da7 | | | | | |
| 6/25,'97 | CH2 | 7:00 | 8:00 | LET'S PLAY WITH MOTHER | Dv3 Da2 | | | | | |
| 6/25,'97 | CH2 | 8:00 | 9:00 | DOWNLOAD A | Dv12 Da12 FL7 FL3 | 2 5 | OS | 6 | M | C |

FIG. 74

| PROTOCOL NAME | PROGRAM NAME |
|---|---|
| SOFTWARE COMMUNICATION PROTOCOL A | PROTOCOL PROCESSING PROGRAM A |
| SOFTWARE COMMUNICATION PROTOCOL B | PROTOCOL PROCESSING PROGRAM B |

FIG. 73

| DATE | CHANNEL | TRANSMISSION START TIME | TRANSMISSION FINISH TIME | NAME OF BROADCASTING PROGRAM | ELEMENTS | | NAME OF SOFTWARE | VERSION OF SOFTWARE | TERMINAL TYPE | NAME OF PROTOCOL |
|---|---|---|---|---|---|---|---|---|---|---|
| | | | | | NAME | VERSION | | | | |
| 6/25,'97 | CH1 | 7:30 | 8:00 | MORNING DOWNLOAD | FL1 | 3 | CA | 7 | M | A |
| | | | | | FL5 | 4 | | | | |
| 6/25,'97 | CH2 | 8:00 | 9:00 | DOWNLOAD A | FL7 | 2 | OS | 6 | M | C |
| | | | | | FL3 | 5 | | | | |

FIG. 75

| DATE | CHANNEL | TRANSMISSION START TIME | TRANSMISSION FINISH TIME | NAME OF BROADCASTING PROGRAM | DOWNLOAD FILE | | NAME OF SOFTWARE | VERSION OF SOFTWARE | TERMINAL TYPE | NAME OF PROTOCOL |
|---|---|---|---|---|---|---|---|---|---|---|
| | | | | | NAME | VERSION | | | | |
| 6/25,'97 | CH1 | 7:30 | 8:00 | MORNING DOWNLOAD | FL1 | 3 | CA | 7 | M | A |
| 6/25,'97 | CH | 8:00 | 9:00 | DOWNLOAD A | FL7 | 2 | OS | 6 | M | C |

FIG. 76

| DATE | CHANNEL | TRANSMISSION START TIME | TRANSMISSION FINISH TIME | NAME OF BROADCASTING PROGRAM | DOWNLOAD FILE | | NAME OF SOFTWARE | VERSION OF SOFTWARE | TERMINAL TYPE | NAME OF PROTOCOL |
|---|---|---|---|---|---|---|---|---|---|---|
| | | | | | NAME | VERSION | | | | |
| 6/25,'97 | CH1 | 7:30 | 8:00 | MORNING DOWNLOAD | FL1 | 3 | CA | 7 | M | A |

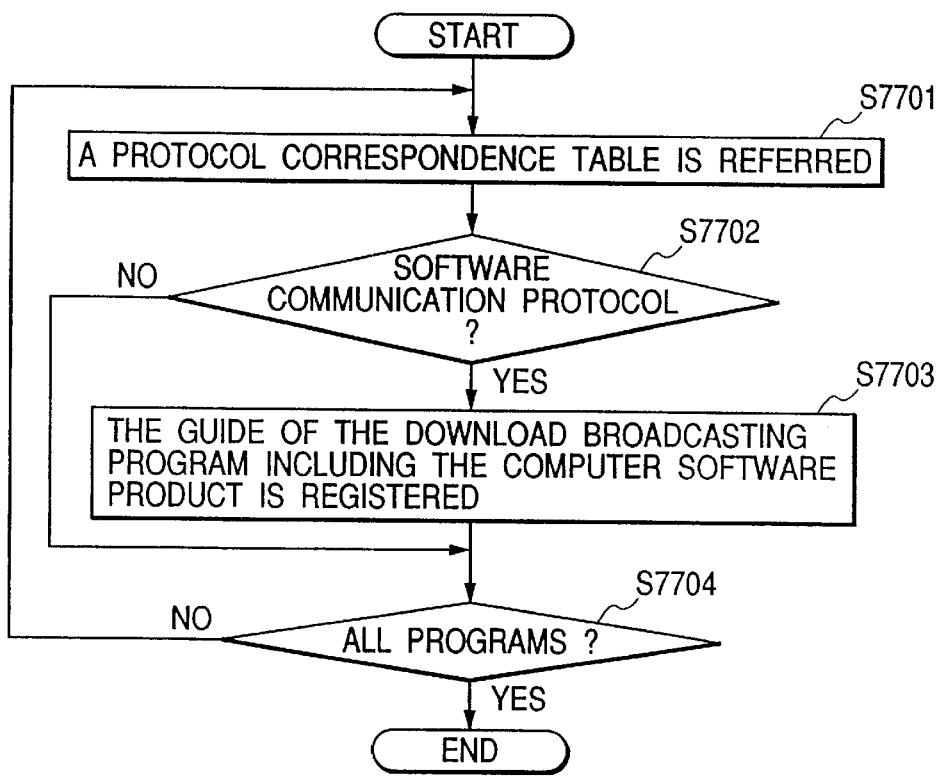

FIG. 79

| DATE | CHANNEL | TRANSMISSION START TIME | TRANSMISSION FINISH TIME | NAME OF BROADCASTING PROGRAM | ELEMENTS NAME | ELEMENTS VERSION NO. | NAME OF SOFTWARE | VERSION OF SOFTWARE | TERMINAL TYPE | NAME OF PROTOCOL | PROTOCOL NAME OF SOFTWARE |
|---|---|---|---|---|---|---|---|---|---|---|---|
| 6/25/'97 | CH1 | 6:00 | 7:00 | MORNING NEWS | Dv1<br>Da1 | | | | | | |
| 6/25/'97 | CH1 | 7:00 | 7:30 | PING-PONG KIDS | Dv2<br>Da3 | | | | | | |
| 6/25/'97 | CH1 | 7:30 | 8:00 | MORNING DOWNLOAD | Dv11<br>Da11<br>FL1<br>FL5 | 3<br>4 | CA | 7 | M | | |
| 6/25/'97 | CH2 | 6:00 | 7:00 | NEWS 6 | Dv5<br>Da7 | | | | | | |
| 6/25/'97 | CH2 | 7:00 | 8:00 | LET'S PLAY WITH MOTHER | Dv3<br>Da2 | | | | | | |
| 6/25/'97 | CH2 | 8:00 | 9:00 | DOWNLOAD A | Dv12<br>Da12<br>FL7<br>FL3 | 2<br>5 | OS | 6 | M | C | |
| 6/25/'97 | CH2 | 9:00 | 9:30 | THE DOWNLOAD | Dv20<br>Da20<br>FL8 | 3 | THIRD PROTOCOL PROGRAM | 5 | M | B | C |

FIG. 80

| CHANNEL | NAME OF BROADCASTING PROGRAM | ELEMENT | | NAME OF SOFTWARE | VERSION OF SOFTWARE | TERMINAL TYPE | NAME OF PROTOCOL | PROTOCOL NAME OF SOFTWARE |
|---|---|---|---|---|---|---|---|---|
| | | NAME | VERSION | | | | | |
| 2 | THE DOWNLOAD | FILE8 | 3 | THIRD PROTOCOL PROGRAM | 5 | M | B | C |

FIG. 82

| PROTOCOL NAME | PROGRAM NAME |
|---|---|
| SOFTWARE COMMUNICATION PROTOCOL A | PROTOCOL PROCESSING PROGRAM A |
| SOFTWARE COMMUNICATION PROTOCOL B | PROTOCOL PROCESSING PROGRAM B |
| SOFTWARE COMMUNICATION PROTOCOL C | PROTOCOL PROCESSING PROGRAM C |

FIG. 84

| CHANNEL | NAME OF BROADCASTING PROGRAM | AUDIENCE RATING |
|---|---|---|
| CH1 | MORNING NEWS | 10% |
| CH1 | PING-PONG KIDS | 40% |
| CH2 | LET'S PLAY WITH MOTHERS | 5% |
| ... | ... | ... |

FIG. 87

| DATE | CHANNEL | TRANSMISSION START TIME | TRANSMISSION FINISH TIME | NAME OF BROADCASTING PROGRAM | ELEMENTS | | NAME OF SOFTWARE | VERSION OF SOFTWARE | TERMINAL TYPE | TRANSPORT STREAM IDENTIFIER | PACKET IDENTIFIER |
|---|---|---|---|---|---|---|---|---|---|---|---|
| | | | | | NAME | VERSION | | | | | |
| 6/25,'97 | CH3 | 7:00 | 7:30 | THE DOWNLOAD | FL5 | 2 | SYSTEM | 3 | M | ID1 | P11 |
| | | | | | FL8 | 5 | | | | | P12 |

FIG. 85

| DATE | CHANNEL | TRANSMISSION START TIME | TRANSMISSION FINISH TIME | NAME OF BROADCASTING PROGRAM | ELEMENTS NAME | ELEMENTS VERSION NO. | NAME OF SOFTWARE | VERSION OF SOFTWARE | TERMINAL TYPE | TRANSPORT STREAM IDENTIFIER | PACKET IDENTIFIER |
|---|---|---|---|---|---|---|---|---|---|---|---|
| 6/25,'97 | CH1 | 6:00 | 7:00 | MORNING NEWS | Dv1 | | | | | IDt1 | P1 |
| | | | | | Da1 | | | | | | P2 |
| 6/25,'97 | CH1 | 7:00 | 7:30 | PING-PONG KIDS | Dv2 | | | | | IDt1 | P3 |
| | | | | | Da3 | | | | | | P4 |
| 6/25,'97 | CH1 | 7:30 | 8:00 | MORNING DOWNLOAD | Dv11 | | CA | 7 | M | IDt1 | P5 |
| | | | | | Da11 | | | | | | P6 |
| | | | | | FL1 | 3 | | | | | P7 |
| | | | | | FL5 | 4 | | | | | P8 |
| 6/25,'97 | CH2 | 6:00 | 7:00 | NEWS 6 | Dv5 | | | | | IDt2 | P1 |
| | | | | | Da7 | | | | | | P2 |
| 6/25,'97 | CH2 | 7:00 | 8:00 | LET'S PLAY WITH MOTHERS | Dv3 | | | | | IDt2 | P3 |
| | | | | | Da2 | | | | | | P4 |
| 6/25,'97 | CH2 | 8:00 | 9:00 | DOWNLOAD A | Dv12 | | OS | 6 | M | IDt2 | P5 |
| | | | | | Da12 | | | | | | P6 |
| | | | | | FL7 | 2 | | | | | P7 |
| | | | | | FL3 | 5 | | | | | P8 |

FIG. 86

| DATE | CHANNEL | TRANSMISSION START TIME | TRANSMISSION FINISH TIME | NAME OF BROADCASTING PROGRAM | ELEMENTS NAME | VERSION NO. | NAME OF SOFTWARE | VERSION OF SOFTWARE | TERMINAL TYPE | TRANSPORT STREAM IDENTIFIER | PACKET IDENTIFIER |
|---|---|---|---|---|---|---|---|---|---|---|---|
| 6/25,'97 | CH1 | 6:00 | 7:00 | MORNING NEWS | Dv1 | | | | | IDt1 | P1 |
| | | | | | Da1 | | | | | | P2 |
| 6/25,'97 | CH1 | 7:00 | 7:30 | PING-PONG KIDS | Dv2 | | | | | IDt1 | P3 |
| | | | | | Da3 | | | | | | P4 |
| 6/25,'97 | CH1 | 7:30 | 8:00 | MORNING DOWNLOAD | Dv11 | | | | | IDt1 | P5 |
| | | | | | Da11 | | CA | 7 | M | | P6 |
| | | | | | FL1 | 3 | | | | | P7 |
| | | | | | FL5 | 4 | | | | | P8 |
| 6/25,'97 | CH2 | 6:00 | 7:00 | NEWS 6 | Dv5 | | | | | IDt2 | P1 |
| | | | | | Da7 | | | | | | P2 |
| 6/25,'97 | CH2 | 7:00 | 8:00 | LET'S PLAY WITH MOTHERS | Dv3 | | | | | IDt2 | P3 |
| | | | | | Da2 | | | | | | P4 |
| 6/25,'97 | CH2 | 8:00 | 9:00 | DOWNLOAD A | Dv12 | | | | | IDt2 | P5 |
| | | | | | Da12 | | OS | 6 | M | | P6 |
| | | | | | FL7 | 2 | | | | | P7 |
| | | | | | FL3 | 5 | | | | | P8 |
| 6/25,'97 | CH3 | 7:00 | 7:30 | THE DOWNLOAD | Dv20 | | | | | IDt1 | P11 |
| | | | | | Da20 | | THIRD PROTOCOL PROGRAM | 3 | M | | P12 |
| | | | | | FL5 | 2 | | | | | P13 |
| | | | | | FL8 | 5 | | | | | P14 |

FIG. 91

| CHANNEL | NAME OF BROADCASTING PROGRAM | ELEMENT | | NAME OF SOFTWARE | VERSION OF SOFTWARE | TERMINAL TYPE | TRANSPORT STREAM IDENTIFIER | PACKET IDENTIFIER |
|---|---|---|---|---|---|---|---|---|
| | | NAME | VERSION | | | | | |
| 3 | THE DOWNLOAD | FL5 | 2 | SYSTEM | 3 | M | IDt1 | P11 |
| | | FL8 | 5 | | | | | P12 |

FIG. 93

| DATE | CHANNEL | TRANSMISSION START TIME | TRANSMISSION FINISH TIME | NAME OF BROADCASTING PROGRAM | ELEMENTS NAME | ELEMENTS VERSION NO. | NAME OF SOFTWARE | VERSION OF SOFTWARE | TERMINAL TYPE |
|---|---|---|---|---|---|---|---|---|---|
| 6/25,'97 | CH1 | 6:00 | 7:00 | MORNING NEWS | Dv1 Da1 | | | | |
| 6/25,'97 | CH1 | 7:00 | 7:30 | PING-PONG KIDS | Dv2 Da3 | | | | |
| 6/25,'97 | CH1 | 7:30 | 8:00 | MORNING DOWNLOAD | Dv11 Da11 FL1 FL5 | 3 4 | CA | 7 | M |
| 6/25,'97 | CH1 | 8:00 | 8:30 | WEATHER DATA | Dv31 Da31 FL9 | 4 | DAT | 2 | M |
| 6/25,'97 | CH1 | 9:30 | 10:00 | SPECIAL DOWNLOAD | Dv32 Da32 FL10 | 6 | GUI | 3 | M |
| 6/25,'97 | CH1 | 12:30 | 13:30 | DAYTIME DOWNLOAD | Dv33 Da33 FL1 FL5 | 2 4 | CA | 6 | M |
| 6/25,'97 | CH2 | 6:00 | 7:00 | NEWS 6 | Dv5 Da7 | | | | |
| 6/25,'97 | CH2 | 7:00 | 8:00 | LET'S PLAY WITH MOTHERS | Dv3 Da2 | | | | |
| 6/25,'97 | CH2 | 8:00 | 9:00 | DOWNLOAD A | Dv34 Da34 FL7 FL3 | 2 5 | OS | 6 | M |

| NAME OF SOFTWARE | FORMER VERSION | RENEWED VERSION | RENEWAL DATE |
|---|---|---|---|
| SYSTEM | 2 | 3 | 7/1,'97 |
| CA | 6 | 7 | 6/25,'97 |
| ⋮ | ⋮ | ⋮ | ⋮ |

| NAME OF COMPUTER SOFTWARE | CA | | OS | | DSMCC | |
|---|---|---|---|---|---|---|
| VERSION NO. | 7 | | 6 | | 5 | |
| ELEMENTS | FILE NAME | VERSION NO. | FILE NAME | VERSION NO. | FILE NAME | VERSION NO. |
|  | FL1 | 3 | FL7 | 2 | FL10 | 5 |
|  | FL5 | 4 | FL3 | 5 | FL12 | 3 |
|  |  |  |  |  | FL20 | 19 |

FIG. 97

| DATE | CHANNEL | TRANSMISSION START TIME | TRANSMISSION FINISH TIME | NAME OF BROADCASTING PROGRAM | ELEMENTS | | NAME OF SOFTWARE | VERSION OF SOFTWARE | TERMINAL TYPE |
|---|---|---|---|---|---|---|---|---|---|
| | | | | | NAME | VERSION | | | |
| 6/25,'97 | CH1 | 7:30 | 8:00 | MORNING DOWNLOAD | FL1 | 3 | CA | 7 | M |
| | | | | | FL5 | 4 | | | |
| 6/25,'97 | CH1 | 8:00 | 8:30 | WEATHER DATA | FL9 | 4 | DAT | 2 | M |
| 6/25,'97 | CH1 | 9:30 | 10:00 | SPECIAL DOWNLOAD | FL10 | 6 | GUI | 3 | M |
| 6/25,'97 | CH1 | 12:30 | 13:30 | DAYTIME DOWNLOAD | FL1 | 2 | CA | 6 | M |
| | | | | | FL5 | 4 | | | |
| 6/25,'97 | CH2 | 8:00 | 9:00 | DOWNLOAD A | FL7 | 2 | OS | 6 | M |
| | | | | | FL3 | 5 | | | |

FIG. 98

| DATE | CHANNEL | TRANSMISSION START TIME | TRANSMISSION FINISH TIME | NAME OF BROADCASTING PROGRAM | ELEMENTS | | NAME OF SOFTWARE | VERSION OF SOFTWARE | TERMINAL TYPE |
|---|---|---|---|---|---|---|---|---|---|
| | | | | | NAME | VERSION | | | |
| 6/25,'97 | CH1 | 12:30 | 13:30 | DAYTIME DOWNLOAD | FL1 | 2 | CA | 6 | M |

FIG. 100

| NAME OF SOFTWARE | FORMER VERSION | RENEWED VERSION | RENEWAL DATE &TIME |
|---|---|---|---|
| SYSTEM | 2 | 3 | 7/1,'97, 12:00 |
| CA | 6 | 7 | 6/25,'97, 7:45 |
| CA | 7 | 6 | 6/25,'97, 12:45 |
| ... | ... | ... | ... |

FIG. 102

| DATE | CHANNEL | TRANSMISSION START TIME | TRANSMISSION FINISH TIME | NAME OF BROADCASTING PROGRAM | ELEMENTS | NAME OF COMPUTER SOFTWARE |
|------|---------|------------------------|--------------------------|------------------------------|----------|---------------------------|
| 6/25,'97 | CH1 | 6:00 | 7:00 | MORNING DOWNLOAD | Dv1 / Da1 | |
| 6/25,'97 | CH1 | 7:00 | 7:30 | PING-PONG KIDS | Dv2 / Da3 | |
| 6/25,'97 | CH1 | 7:30 | 8:00 | | FL1 | CA |
| 6/25,'97 | CH2 | 6:00 | 7:00 | NEWS 6 | FL5 / Dv5 / Da7 | |
| 6/25,'97 | CH2 | 7:00 | 8:00 | LET'S PLAY WITH MOTHERS | Dv3 / Da2 | |
| 6/25,'97 | CH2 | 8:00 | 9:00 | | FL7 / FL3 | OS |

Dv : VISUAL DATA
Da : AUDIO DATA

FIG. 103

| DATE | CHANNEL | TRANSMISSION START TIME | TRANSMISSION FINISH TIME | NAME OF BROADCASTING PROGRAM | ELEMENTS NAME | ELEMENTS VERSION NO. | NAME OF COMPUTER SOFTWARE | VERSION NO. OF SOFTWARE | TERMINAL TYPE |
|---|---|---|---|---|---|---|---|---|---|
| 6/25,'97 | CH1 | 6:00 | 7:00 | MORNING NEWS | Dv1 / Da1 | | | | |
| 6/25,'97 | CH1 | 7:00 | 7:30 | PING-PONG KIDS | Dv2 / Da3 | | | | |
| 6/25,'97 | CH1 | 7:30 | 8:00 | | FL1 | 3 | CA | 7 | M |
| | | | | | FL5 | 4 | | | |
| 6/25,'97 | CH2 | 6:00 | 7:00 | NEWS 6 | Dv5 / Da7 | | | | |
| 6/25,'97 | CH2 | 7:00 | 8:00 | LET'S PLAY WITH MOTHER | Dv3 / Da2 | | | | |
| 6/25,'97 | CH2 | 8:00 | 9:00 | | FL7 | 2 | OS | 6 | P |
| | | | | | FL3 | 5 | | | |

Dv : VISUAL DATA
Da : AUDIO DATA

SYSTEM FOR DOWNLOADING COMPUTER SOFTWARE WITH BROADCASTING PROGRAM

BACKGROUND OF THE INVENTION

1. Field of the Invention

The present invention relates to a software download system in which a computer software product such as a computer program is downloaded with a broadcasting program from a center station to each terminal through a communication satellite, a broadcasting satellite or a terrestrial television broadcasting service in a digital broadcasting.

2. Description of the Related Art

A broadcasting system, in which a video signal and an audio signal composing a broadcasting program are digitized and the digital signals of the broadcasting program are transmitted from a transmitting station to a receiving apparatus through a broadcasting satellite, has been spread. Because digital data is transmitted through a satellite or a terrestrial television broadcasting service, it becomes possible that a digitized computer program is transmitted through a satellite or a terrestrial television broadcasting service in addition to the digital video signal and the digital audio signal and is stored in a storing unit of the receiving apparatus.

2.1. Previously Proposed Art

A broadcasting method, in which a computer program (or a computer software product) transmitted through a satellite is received in a receiving apparatus and is stored in a storing unit of the receiving apparatus, is disclosed in a Published Unexamined Japanese Patent Application No. H8-195952 (1996). The broadcasting method is described with reference to FIG. 1.

As shown in FIG. 1, in a digital data receiving and processing apparatus 2000 of a user, an electric wave indicating a broadcasting signal is transmitted through a satellite and is received in an antenna 2001, the electric wave received in the antenna 2001 is converted into the broadcasting signal in a converter 2002 by changing a frequency of the electric wave, the demodulation and error correction are performed for the broadcasting signal in a front end 2003 to obtain a digital signal, and the digital signal is transmitted to a transport block 2004. In the transport block 2004, the digital signal is divided into video data, audio data and conditional access data including a computer program. Because the broadcasting signal is enciphered, the conditional access data is transmitted to an IC card 2006 through an IC card interface 2005, and the judgement whether or not the user has an access right for the broadcasting signal is performed according to the conditional data by the IC card 2006. In cases where the user has an access right for the broadcasting signal, a cryptograph key used for the cryptanalysis is delivered from the IC card 2006 to the transport block 2004, and the video data, the audio data and the conditional access data are deciphered in the transport block 2004 by using the cryptograph key. The video data deciphered is decoded in a video decoder 2007 to produce decoded video data, the decoded video data is encoded in an NTSC encoder 2008 to produce an National Television System Committee (NTSC) type video signal, and the NTSC type video signal is output. The audio data deciphered is decoded in an audio decoder 2009 to produce audio signal, and the audio signal is output. Also, the computer program included in the deciphered conditional access data is stored in an electrically erasable and programmable read only memory (EEPROM) 2100 under control of a central processing unit (CPU) 2101. The processing of the CPU 2101 is performed according to a processing program stored in a ROM 2102, and data necessary for the processing of the CPU 2101 is stored in a RAM 2103.

2.2. Problems to be Solved by the Invention

However, because the computer program is included in the conditional access data and because the computer program included in the conditional access data is always broadcasted with the video and audio data, a special frequency band used only for the computer program is required. Therefore, there is a problem that a frequency band required for the transmission of the broadcasting signal is widened.

Also, because any computer program (or any computer software product) for presenting a broadcasting program guide including a broadcasting schedule and downloading one broadcasting program is not transmitted to the digital data receiving and processing apparatus 2000, the user cannot select a desired broadcasting program from a plurality of broadcasting programs by watching a plurality of broadcasting program guides displayed on an image screen.

SUMMARY OF THE INVENTION

An object of the present invention is to provide, with due consideration to the drawbacks of such a conventional broadcasting method, a software download system in which a software product such as a computer software product is downloaded to user's terminal without requiring a special frequency band used only for the software product.

The object of the present invention is achieved by the provision of a software download system, comprising:

broadcasting program guide preparing means of a center station for preparing a guide of a broadcasting program accompanied by a software product corresponding to a first version number, a version number of the software product being changed each time the software product is revised in the center station;

broadcasting program data storing means of the center station for storing data of the broadcasting program which is listed in the guide prepared by the broadcasting program guide preparing means;

software storing means of the center station for storing data of the software product which is listed in the guide prepared by the broadcasting program guide preparing means;

transmitting means of the center station for transmitting the guide of the broadcasting program with the software product prepared by the broadcasting program guide preparing means, and transmitting the data of the software product stored in the software storing means with the data of the broadcasting program stored in the broadcasting program data storing means during a transmission time period of the broadcasting program through the same transmission channel as that of the broadcasting program under the control of the broadcasting program guide preparing means;

receiving means of a terminal for receiving the guide of the broadcasting program with the software product from the transmitting means, and receiving the data of the software product with the data of the broadcasting program during the transmission time period from the transmitting means;

output means of the terminal for outputting the data of the broadcasting program received by the receiving means during the transmission time period;

version number managing means of the terminal for managing a second version number corresponding to the software product previously downloaded from the center station to the terminal;

download judging means of the terminal for checking whether or not the first version number of the software product of the guide received by the receiving means differs from the second version number of the software product managed by the version number managing means and judging to download the data of the software product received by the receiving means to the terminal in cases where the first version number of the software product listed in the guide differs from the second version number of the software product managed by the version number managing means; and downloading means of the terminal for extracting the data of the software product from the broadcasting program received by the receiving means during the transmission time period in cases where the downloading of the software product is judged by the download judging means and storing the data of the software product to download the software product received by the receiving means from the center station to the terminal and to use the software product on user's side.

In the above configuration, a guide of a broadcasting program is prepared in the broadcasting program guide preparing means. In the guide, a software product to be transmitted with the broadcasting program is listed, a first version number indicating the version of the software product is listed, and a transmission time period of the broadcasting program is listed. The guide is transmitted from the transmitting means to the receiving means.

Also, data of the software product stored in the software storing means is transmitted from the transmitting means to the receiving means with data of the broadcasting program stored in the broadcasting program data storing means during the transmission time period through the same transmission channel as that of the broadcasting program under the control of the broadcasting program guide preparing means.

In the terminal, a second version number indicating the version of the software product previously downloaded is managed in advance by the version managing means. When the guide is received by the receiving means, it is checked by the download judging means whether or not the first version number of the software product of the guide differs from the second version number of the software product managed by the version managing means. In cases where the first version number of the software product of the guide differs from the second version number of the software product, because the software product is renewed in the center station, it is judged to download the software product received by the receiving means to the terminal. Therefore, in the downloading means, the data of the software product is extracted from the broadcasting program received by the receiving means during the transmission time period, so that the software product is downloaded from the center station to the terminal and is stored. Therefore, the user can use the software product. For example, in cases where a computer software product representing the software product is downloaded to user's terminal, the user can execute the computer software product in user's computer.

Accordingly, because data of the software product is transmitted from the center station to the terminal with data of the broadcasting program, the software product can be downloaded to user's terminal without requiring a special frequency band (or a special transmission channel) used only for the software product.

Also, in cases where the software product is revised in the center station, because the first version number of the software product of the guide differs from the second version number of the software product already managed by the version managing means, the revision of the software product can be detected by the download judging means, so that the software product can be downloaded from the center station to the terminal. Therefore, the user can always use the updated software product.

It is preferred that the software download system further comprise:

set-up information storing means of the center station for storing set-up information indicating a download completion notification flag, the set-up information being included in the guide prepared by the broadcasting program guide preparing means;

download completion notification judging means of the terminal for judging whether or not the downloading of the software product performed by the downloading means is to be notified to the center station, the notification of the downloading of the software product being judged by the download completion notification judging means according to the download completion notification flag;

download completion notice transmitting means of the terminal for transmitting an identification number of the terminal and a name of the software product downloaded by the downloading means as a download completion notice to the center station in cases where the download completion notification judging means judges that the downloading of the software product performed by the downloading means is to be notified; and download record managing means of the center station for managing a record of the downloading of the software product performed in the terminal according to the identification number of the terminal and the name of the software product transmitted from the download completion notice transmitting means.

In this configuration corresponding to a second embodiment, in cases where a software product supplier wants to know that the software product transmitted with the broadcasting program is downloaded from the center station to the user's terminal, because a download completion notice flag corresponding to the software product is set in the set-up information, the request of a download completion notice can be recognized in the terminal by checking the download completion notice flag of the software product written in the guide of the broadcasting program.

Accordingly, in cases where the software product is actually downloaded from the center station to the terminal, the software product supplier can know the downloading of the software product by checking the identification number of the terminal.

It is also preferred that the software download system further comprise:

protocol processing means of the center station for processing the data of the software product stored in the software storing means according to each of a plurality of software communication protocols to produce a plurality of protocol-processed software products, each protocol-processed software product being communicable with a type of terminal according to one software communication protocol, the protocol-processed software products being transmitted from the transmitting means to the receiving means of the terminal, and a particular protocol-processed software product selected from the protocol-processed software products being received by the terminal on condition that a type of the terminal matches with a particular software communication protocol corresponding to the particular protocol-processed software product.

In this configuration corresponding to a seventh embodiment, even though a plurality of terminals are classified into a plurality of groups respectively corresponding to one software communication protocol, because a plurality of protocol-processed software products corresponding to a plurality of software communication protocol types are prepared from each software product and are transmitted to the terminals, one type protocol-processed software product can be reliably received in each terminal.

It is also preferred that the software download system further comprise:

protocol processing means of the center station for processing the data of the software product stored in the software storing means according to a particular software communication protocol to produce a particular protocol-processed software product communicable according to the particular software communication protocol, a name of the particular software communication protocol being listed in the guide of the broadcasting program prepared by the broadcasting program guide preparing means, the particular protocol-processed software product being transmitted from the transmitting means to the receiving means of the terminal, and the particular protocol-processed software product being received by the receiving means;

protocol processing program storing means of the terminal for storing one or more protocol processing programs respectively used for a protocol processing in which one protocol-processed software product communicable according to one software communication protocol is changed to data of one software product;

protocol correspondence table holding means of the terminal for holding a protocol correspondence table in which the correspondence of one software communication protocol and one protocol processing program is listed for each protocol processing program stored in the protocol processing program storing means;

software communication protocol judging means of the terminal for checking whether or not the particular software communication protocol, of which the name is listed in the guide of the broadcasting program received by the receiving means, is listed in the protocol correspondence table held by the protocol correspondence table holding means in cases where the download judging means judges to download the software product, and outputting the name of the particular software communication protocol in cases where the particular software communication protocol is listed in the protocol correspondence table; and protocol processing performing means of the terminal for receiving the name of the particular software communication protocol output from the software communication protocol judging means, extracting a particular protocol processing program corresponding to the particular software communication protocol from the protocol processing program storing means, performing a protocol processing for the particular protocol-processed software product received by the receiving means according to the particular protocol processing program to change the particular protocol-processed software product to the software product, the software product being downloaded by the downloading means.

In this configuration corresponding to an eighth embodiment, even though a particular protocol-processed software product communicable according to a particular software communication protocol is transmitted with one broadcasting program from the center station to the terminal, in cases where a particular protocol processing program for changing the particular protocol-processed software product to a software product is arranged in the terminal, the particular protocol-processed software product can be changed to the software product by executing the particular protocol processing program, and the software product can be downloaded to the terminal.

The object of the present invention is also achieved by the provision of a software download system, comprising:

broadcasting program guide preparing means of a center station for preparing guides of a first group of broadcasting programs and guides of a second group of broadcasting programs, each broadcasting program of the first group being accompanied by a software product corresponding to a first version number, each broadcasting program being not accompanied by any software product, and a version number of the software product being changed each time the software product is revised in the center station;

broadcasting program data storing means of the center station for storing data of each broadcasting program of which the guide is prepared by the broadcasting program guide preparing means;

software storing means of the center station for storing data of one software product corresponding to the first version number for each software product of which the guide is prepared by the broadcasting program guide preparing means;

transmitting means of the center station for transmitting the guides of the broadcasting programs prepared by the broadcasting program guide preparing means, transmitting the data of each broadcasting program stored in the broadcasting program data storing means during a transmission time period of the broadcasting program under the control of the broadcasting program guide preparing means, and transmitting the data of each software product stored in the software storing means with the data of one broadcasting program through the same transmission channel as that of the broadcasting program under the control of the broadcasting program guide preparing means;

receiving means of a terminal for receiving the guides of the broadcasting programs from the transmitting means, and receiving the data of the broadcasting programs and the data of the software products from the transmitting means;

output means of the terminal for outputting the data of each broadcasting program received by the receiving means during the transmission time period;

version number managing means of the terminal for managing a second version number corresponding to each software product previously downloaded from the center station to the terminal;

broadcasting software program extracting means of the terminal for extracting the guide of each broadcasting program of the first group from the guides received by the receiving means as a guide of one broadcasting software program;

download judging means of the terminal for checking whether or not the first version number of the software product of the broadcasting software program of each guide extracted by the broadcasting software program extracting means differs from the second version number of the software product managed by the version number managing means and judging to download the software product of each broadcasting software program received by the receiving means to the terminal in cases where the first version number of the software product differs from the second version number of the software product; and downloading means of the terminal for extracting the data of the software product from the broadcasting program received by the receiving means during the transmission time period in cases where the downloading of the software product is judged by the download judging means and storing the data of the software product to download the software product received by the receiving means from the center station to the terminal and to use the software product on user's side.

In the above configuration, guides of a plurality of broadcasting programs are prepared in the broadcasting program guide preparing means. The guides are transmitted from the transmitting means to the receiving means.

Also, data of each broadcasting program stored in the broadcasting program data storing means is transmitted from the transmitting means to the receiving means during its transmission time period, and data of each software product stored in the software storing means is transmitted with one broadcasting program from the transmitting means to the receiving means during the transmission time period of the broadcasting program through the same transmission channel as that of the broadcasting program under the control of the broadcasting program guide preparing means.

In the terminal, a second version number indicating the version of the software product previously downloaded is managed in advance by the version managing means. When the guides are received by the receiving means, the guide of each broadcasting program with one software product is extracted from all guides by the broadcasting software program extracting means as a guide of one broadcasting software program, and it is checked by the download judging means whether or not the first version number of one software product transmitted with each broadcasting software program differs from the second version number of the software product managed by the version managing means. In cases where the first version number of the software product differs from the second version number of the software product, because the software product is renewed in the center station, it is judged to download the software product received by the receiving means to the terminal. Therefore, in the downloading means, the data of the software product is extracted from the broadcasting program received by the receiving means during the transmission time period, so that the software product is downloaded from the center station to the terminal and is stored. Therefore, the user can use the software product. For example, in cases where a computer software product representing the software product is downloaded to user's terminal, the user can execute the computer software product in user's computer.

Accordingly, because data of each software product is transmitted from the center station to the terminal with data of the broadcasting program through the same transmission channel as that of the broadcasting program, the software product can be downloaded to user's terminal without requiring a special frequency band (or a special transmission channel) used only for the software product.

Also, in cases where one software product is revised in the center station, because the first version number of the software product of the guide differs from the second version number of the software product already managed by the version managing means, the revision of the software product can be detected by the download judging means, so that the software product can be downloaded from the center station to the terminal. Therefore, the user can always use the updated software product.

It is preferred that the software download system further comprise:

set-up information storing means of the center station for storing set-up information indicating a software type of one software product for each software product of the guides prepared by the broadcasting program guide preparing means, each software product being set to a first software type or a second software type, and the pieces of set-up information of the software products being added to the guides by the broadcasting program guide preparing means;

display broadcasting program extracting means of the terminal for extracting one or more guides of display broadcasting programs with software products set to the first software type from the guides of the broadcasting programs received by the receiving means;

display broadcasting program displaying means of the terminal for displaying the guides of the display broadcasting programs extracted by the display broadcasting program extracting means for a user to select one or more download-candidate display broadcasting programs from the display broadcasting programs, all guides of broadcasting programs with software products set to the second software type being extracted from the guides of the broadcasting programs received by the receiving means as one or more guides of broadcasting software programs by the broadcasting software program extracting means, the guides of the broadcasting software programs being added to the guides of the download-candidate display broadcasting programs, the downloading of the software product transmitted with each download-candidate broadcasting program being judged by the download judging means in cases where the first version number of the software product differs from the second version number of the software product, and the downloading of the software product transmitted with each download-candidate broadcasting program being performed by the downloading means.

In this configuration corresponding to a third embodiment, a software product supplier of the center station sets one software product to a first type in cases where the software product supplier desires a user to judge whether or not the downloading of the software product from the center station to user's terminal is to be performed. Accordingly, a guide of a broadcasting program with the software product can be displayed, and the user can judges the downloading of the software product.

It is also preferred that the software download system further comprise:

software download reservation managing means of the terminal for managing the recording reservation for one or more recording-reserved broadcasting programs selected from the second group of broadcasting programs, of which the guides are prepared by the broadcasting program guide preparing means; and download-reserved broadcasting program determining means of the terminal for selecting a guide of a download-reserved broadcasting program from guides of one or more broadcasting programs, of which the software products are judged by the download judging means to be downloaded to the terminal, on condition that a transmission time period of the download-reserved broadcasting program does not overlap with that of any recording-reserved broadcasting program managed by the software download reservation managing means, the software product transmitted with the download-reserved broadcasting program being downloaded by the downloading means.

In this configuration corresponding to a fourth embodiment, even though the recording of one or more broadcasting programs respectively accompanied by no software product is reserved, one or more download-reserved broadcasting programs can be selected from the broadcasting programs on condition that a transmission time period of each download-reserved broadcasting program does not overlap with that of any broadcasting program, and the download-reserved broadcasting programs can be downloaded to record the software product of each download-reserved broadcasting program during its transmission time period.

It is also preferred that the software download system further comprise:

software product displaying and selecting means of the terminal for displaying names of the software products of the broadcasting software programs, which are listed in the guides extracted by the broadcasting software program extracting means, and receiving names of one or more particular software products selected from the software products, the downloading of each particular software product being judged by the download judging means, and the particular software product being downloaded by the downloading means in cases where the download judging means judges to download the particular software product.

In this configuration corresponding to a fifth embodiment, names of software products transmitted with the broadcasting software programs are displayed. Accordingly, the user can select one or more particular software products in cases where the user desires to download the particular software products from the center station.

Also, because only the software name is displayed, the user can select each particular software product without considering the transmission time period.

It is also preferred that the software download system further comprise:

software download reservation managing means of the terminal for managing the recording reservation for one or more first recording-reserved broadcasting programs selected from the second group of broadcasting programs, of which the guides are prepared by the broadcasting program guide preparing means, and newly managing the recording reservation for a second recording-reserved broadcasting program selected from the second group of broadcasting programs, of which the guides are prepared by the broadcasting program guide preparing means;

download-reserved broadcasting program determining means of the terminal for selecting a guide of a first particular download-reserved broadcasting program from guides of one or more particular broadcasting programs, which include the same particular software product judged by the download judging means to be downloaded to the terminal, on condition that a transmission time period of the first download-reserved broadcasting program does not overlap with any of the first recording-reserved broadcasting program managed by the software download reservation managing means; and duplication reservation detecting means of the terminal for detecting that a transmission time period of the first particular download-reserved broadcasting program overlaps with that of the second recording-desired broadcasting program newly managed by the software download reservation managing means, transmitting information indicating the duplication reservation of the first particular download-reserved broadcasting program to the download-reserved broadcasting program determining means to select a guide of a second particular download-reserved broadcasting program relating to a specific transmission time period from the guides of the particular broadcasting programs in the download-reserved broadcasting program determining means on condition that the specific transmission time period of the second particular download-reserved broadcasting program does not overlap with that of any first recording-desired broadcasting program or the second recording-desired broadcasting program, and transmitting the guide of the second particular download-reserved broadcasting program relating to the specific transmission time period to the software download reservation managing means, the particular software product transmitted with the second particular download-reserved broadcasting program being downloaded by the downloading means at the specific transmission time period under the control of the software download reservation managing means.

In this configuration corresponding to a sixth embodiment, even though the user reserves the recording of a second recording-desired broadcasting program of which a transmission time period overlaps with a transmission time period of a first particular download-reserved broadcasting program registered in a reservation table, the first particular download-reserved broadcasting program relating to the transmission time period is removed, and a second particular download-reserved broadcasting program relating to a specific transmission time period is selected on condition that the specific transmission time period of the second particular download-reserved broadcasting program does not overlap with that of any recording-desired broadcasting program. Accordingly, the recording of the second recording-desired broadcasting program and the downloading of the second particular download-reserved broadcasting program can be performed.

It is also preferred that the data of each broadcasting program is transmitted by the transmitting means at a transmission channel, the data of each software product transmitted with one broadcasting program is transmitted by the transmitting means at the same transmission channel as that of the broadcasting program, the data of a group of broadcasting programs corresponding to a plurality of transmission channels and the data of one or more software products respectively transmitted with one broadcasting program of the group are transmitted as a transport stream, a plurality of transport streams are transmitted from the transmitting means to the receiving means, one of the transport streams is received by the receiving means, one transmission channel and a transport stream identifier are listed in the guide of each broadcasting program by the broadcasting program guide preparing means, and the software download system further comprise:

audience rating managing means of the center station for managing a broadcasting program audience rating table in which an audience rating of each broadcasting program, of which the guide is prepared by the broadcasting program guide preparing means, is listed, a broadcasting program of a high audience rating being set as a specific broadcasting program transmitted at a first transmission channel by the broadcasting program guide preparing means, and a transmission channel of a particular broadcasting program with a particular software product being set to a second transmission channel differing from the first transmission channel by the broadcasting program guide preparing means to transmit the particular broadcasting program with the specific broadcasting program as a specific transport stream;

channel setting means of the terminal for setting a transmission channel of one broadcasting program, of which the data is output to the output means, to the first transmission channel of the specific broadcasting program, the specific transport stream, in which the data of the specific broadcasting program transmitted at the first transmission channel is included, being specified by the receiving means; and transmission channel checking means of the terminal for receiving a specific transport stream identifier of the specific transport stream listed in a guide of the specific broadcasting program, of which the data is transmitted at the first transmission channel and is received by the receiving means to be output to the output means, from the receiving means, checking whether or not a particular transport stream identifier listed in the guide of the particular broadcasting program with the particular software product, which is transmitted at the second transmission channel and at the same transmission start time as that of the specific broadcasting program and is judged by the download judging means to be downloaded, agrees with the specific transport stream identifier of the specific transport stream, and transmitting a download-performable notice and the guide of the particular broadcasting program to the downloading means in cases where the particular transport stream identifier agrees with the specific transport stream identifier, the particular software product being downloaded by the downloading means according to the download-performable notice and the guide of the particular broadcasting program.

In this configuration corresponding to a ninth embodiment, the broadcasting of a particular broadcasting program with a particular software product is set to the same transmission time period as that of a specific broadcasting program not accompanied by any software product in the center station on condition that the transmission channel of the particular broadcasting program and the transmission channel of the specific broadcasting program differ from each other and are included in the same transport stream to simultaneously receive the particular broadcasting program and the specific broadcasting program in the terminal.

Accordingly, even though a user does not select the particular broadcasting program but select the specific broadcasting program, the particular software product transmitted with the particular broadcasting program can be downloaded to the terminal.

Also, because a broadcasting program expected to be watched by users at high audience rating is set as the specific broadcasting program, the specific broadcasting program is expected to be watched by users at high probability, so that the particular software product transmitted with the particular broadcasting program can be downloaded to the terminal at high probability.

It is also preferred that the software download system further comprise:

software product displaying and selecting means of the terminal for displaying names of the software products of the broadcasting software programs, which are listed in the guides extracted by the broadcasting software program extracting means, receiving a name of a particular software product selected from the software products and receiving a former-version selecting instruction, the name of the particular software product selected and the former-version selecting instruction being received by the download judging means; and software product renewal managing means for managing a software product renewal table in which a renewed version number of one software product currently downloaded by the downloading means and a former version number of the software product previously downloaded by the downloading means before the renewal to the software product of the renewed version number are listed for each software product of which the guide is prepared by the broadcasting program guide preparing means, the former version number of the particular software product being recognized by the download judging means according to the former-version number selecting instruction, a guide of the particular software product of the former version number being transmitted from the broadcasting software program extracting means to the download judging means, the downloading of the particular software product of the former version number being judged by the download judging means, and the particular software product of the former version number being downloaded by the downloading means.

In this configuration corresponding to a tenth embodiment, even though the user is not satisfied with an updated software product obtained by renewing a software product of the former version number, because the software product of the former version number is transmitted with one broadcasting program, the user can download the software product of the former version number to replace the updated software product with the software product of the former version number. Therefore, the user can again use the software product of the former version number. For example, in cases where a computer software product representing the software product is downloaded to user's terminal, the user can again execute the computer software product of the former version number in user's computer to perform a computer operation.

The object of the present invention is also achieved by the provision of a software download system, comprising:

broadcasting program guide preparing means of a center station for preparing a guide table in which guides of one or more broadcasting programs and a guide of a software product corresponding to a first version number are listed, a version number of the software product being changed each time the software product is revised in the center station;

broadcasting program data storing means of the center station for storing data of each broadcasting program which is listed in the guide table prepared by the broadcasting program guide preparing means;

software storing means of the center station for storing data of the software product of which the guide is listed in the guide table prepared by the broadcasting program guide preparing means;

transmitting means of the center station for transmitting the guide table prepared by the broadcasting program guide preparing means, transmitting the data of each broadcasting program stored in the broadcasting program data storing means during a transmission time period of the broadcasting program under the control of the broadcasting program guide preparing means and transmitting the data of the software product stored in the software storing means through the same transmission channel as that of one broadcasting program during a specific time period in which any broadcasting program is not transmitted through the transmission channel;

receiving means of a terminal for receiving the guide table from the transmitting means, receiving the data of each broadcasting program from the transmitting means during the transmission time period and receiving the data of the software product from the transmitting means during the specific time period;

output means of the terminal for outputting the data of each broadcasting program received by the receiving means during the transmission time period;

version number managing means of the terminal for managing a second version number corresponding to the software product previously downloaded from the center station to the terminal;

download judging means of the terminal for checking whether or not the first version number of the software product of the guide received by the receiving means differs from the second version number of the software product managed by the version number managing means and judging to download the data of the software product received by the receiving means to the terminal in cases where the first version number of the software product listed in the guide differs from the second version number of the software product managed by the version number managing means; and downloading means of the terminal for downloading the data of the software product received by the receiving means to the terminal during the specific time period in cases where the downloading of the software product is judged by the download judging means, the software product being used on user's side.

In the above configuration, a guide of a software product corresponding to a first version number are listed in the guide table prepared by the broadcasting program guide preparing means, and the data of the software product is transmitted from the center to the terminal through a transmission channel (or a frequency band) during a specific time period in which any broadcasting program is not transmitted through the transmission channel.

Accordingly, the software product can be downloaded from the center to the terminal without any private frequency band.

Also, in cases where the software product is revised in the center station, because the first version number of the software product of the guide differs from the second version number of the software product already managed by the version managing means, the revision of the software product can be detected by the download judging means, so that the software product can be downloaded from the center station to the terminal. Therefore, the user can always use the updated software product.

BRIEF DESCRIPTION OF THE DRAWINGS

The objects, features and advantages of the present invention will be apparent from the following description taken in conjunction with the accompanying drawings, in which:

FIG. 3 shows a table of pieces of set-up information of computer software products stored in a set-up information storing unit according to the first embodiment;

FIG. 4 shows a broadcasting program schedule table managed in a broadcasting program guide table preparing unit;

FIG. 5 shows a broadcasting program guide table prepared from the broadcasting program schedule table and the set-up information in the broadcasting program guide table preparing unit according to the first embodiment;

FIG. 6 shows a table of broadcasting software programs extracted from the broadcasting program guide table in a broadcasting software program extracting unit according to the first embodiment;

FIG. 7 shows a terminal management table managed in a terminal information managing unit according to the first embodiment;

FIG. 8 shows a version management table managed by a version managing unit according to the first embodiment;

FIG. 9 shows a download candidate table prepared in a download judging unit according to the first embodiment;

FIG. 10 shows a download table prepared in a download judging unit according to the first embodiment;

FIG. 11 shows a new version management table renewed by a download performing unit according to the first embodiment;

FIG. 12 shows pieces of video data managed in a video data server;

FIG. 13 shows pieces of audio data managed in an audio data server;

FIG. 14 shows a plurality of files managed in a computer software server;

FIG. 20 shows a table of pieces of set-up information of computer software products stored in a set-up information storing unit according to the second embodiment;

FIG. 21 shows a broadcasting program guide table prepared from the broadcasting program schedule table and the set-up information in a broadcasting program guide table preparing unit according to the second embodiment;

FIG. 22 shows a terminal management table managed in a terminal information managing unit according to the second embodiment;

FIG. 23 shows a download table prepared in a download judging unit according to the second embodiment;

FIG. 24 shows information of a download broadcasting program transmitted from a broadcasting program reservation managing unit to a download performing unit according to the second embodiment;

FIG. 25 shows a table of download records of a plurality of terminals prepared in a download records managing unit according to the second embodiment;

FIG. 28 shows a broadcasting program guide table prepared from a broadcasting program schedule table and the set-up information in a broadcasting program guide table preparing unit according to the third embodiment;

FIG. 29 shows a display broadcasting program guide table prepared in a display broadcasting program extracting unit according to the third embodiment;

FIG. 31 shows a guide table of download-candidate broadcasting programs selected by a user according to the third embodiment;;

FIG. 32 shows a broadcasting software program guide table prepared in a broadcasting software program extracting unit according to the third embodiment;

FIG. 36 shows a reservation table of recording-reserved broadcasting programs originally stored in a broadcasting program recording reservation managing unit;

FIG. 37 shows a current date and time managed in a download-reserved broadcasting program determining unit;

FIG. 38 shows a download table prepared in a download judging unit;

FIG. 43 shows a guide table of name-checked broadcasting programs prepared in the broadcasting program name checking process;

FIG. 44 shows another guide table of name-checked broadcasting programs prepared in the broadcasting program name checking process;

FIG. 45 shows another guide table of name-checked broadcasting programs prepared in the broadcasting program name checking process;

FIG. 46 shows a guide table of time-checked broadcasting programs prepared in the transmission start time checking process;

FIG. 47 shows a reservation table of download-reserved broadcasting programs prepared in the download-reserved broadcasting program determining unit;

FIG. 48 shows a time-checked broadcasting program guide table;

FIG. 49 shows a renewed reservation table of recording reserved broadcasting programs prepared in the download-reserved broadcasting program determining unit;

FIG. 51 shows a guide table of broadcasting software programs;

FIG. 54 shows a broadcasting software program output guide table prepared in the computer software selecting unit;

FIG. 56 shows a computer software name table prepared in the middle of the computer software name extracting process;

FIG. 57 shows an image of the computer software name table;

FIG. 60 shows a recording table of a recording-desired broadcasting program newly input by a user;

FIG. 62 shows a duplication-reserved broadcasting program table prepared in a duplication reservation detecting unit;

FIG. 63 shows a renewed download table;

FIG. 64 shows a renewed reservation table of download-reserved broadcasting programs prepared in a duplication reservation detecting unit;

FIG. 65 shows a revised reservation table of revised download-reserved broadcasting programs;

FIG. 67 shows a second renewed reservation table;

FIG. 68 shows a finally renewed reservation table;

FIG. 72 shows a broadcasting program guide table prepared in a broadcasting program guide table preparing unit according to the eighth embodiment;

FIG. 73 shows a broadcasting software program guide table prepared in a broadcasting software program extracting unit according to the eighth embodiment;

FIG. 74 shows a protocol correspondence table held in a protocol correspondence table holding unit according to the eighth embodiment;

FIG. 75 shows a download broadcasting program table prepared in a download judging unit according to the eighth embodiment;

FIG. 76 shows a new download broadcasting program table prepared in a software communication protocol judging unit according to the eighth embodiment;

FIG. 77 is a flow chart showing a download broadcasting program extracting process performed in a software communication protocol judging unit according to the eighth embodiment;

FIG. 78 shows information of a download broadcasting program prepared in a broadcasting program reservation managing unit according to the eighth embodiment;

FIG. 79 shows another broadcasting program guide table prepared in the broadcasting program guide table preparing unit according to the eighth embodiment;

FIG. 80 shows information of another download broadcasting program prepared in the broadcasting program reservation managing unit according to the eighth embodiment;

FIG. 82 shows a revised protocol correspondence table held in the protocol correspondence table holding unit according to the eighth embodiment;

FIG. 84 shows a broadcasting program audience rating table stored in an audience rating managing unit according to the ninth embodiment;

FIG. 85 shows a broadcasting program guide table stored in a broadcasting program guide table preparing unit according to the ninth embodiment;

FIG. 86 shows a revised broadcasting program guide table stored in a broadcasting program guide table preparing unit according to the ninth embodiment;

FIG. 87 shows a download broadcasting program table prepared in a download judging unit according to the ninth embodiment;

FIG. 91 shows information of a download broadcasting program transmitted to a download performing unit according to the ninth embodiment;

FIG. 93 shows a broadcasting program guide table prepared in a broadcasting program guide table preparing unit according to the tenth embodiment;

FIG. 97 shows a broadcasting software program guide table prepared in a broadcasting software program extracting unit according to the tenth embodiment;

FIG. 98 shows a download broadcasting program table prepared in a download judging unit according to the tenth embodiment;

FIG. 100 shows a computer software renewal log table renewed in a computer software renewal log managing unit according to the tenth embodiment;

FIG. 102 shows a broadcasting program schedule table managed in a broadcasting program guide table preparing unit according to the eleventh embodiment; and FIG. 103 shows a broadcasting program guide table prepared from the broadcasting program schedule table and the set-up information in the broadcasting program guide table preparing unit according to the eleventh embodiment.

DETAILED DESCRIPTION OF THE EMBODIMENTS

Preferred embodiments of a software download system according to the present invention are described with reference to the drawings.

In the present invention, a computer software product (or a piece of computer software) denotes a computer program executed in each user's terminal. Also, in cases where a volume of a computer software product executed to perform a certain function is too large, the computer software product is divided into a plurality of computer software products. Also, a broadcasting program (or a television program) is, for example, defined in accordance with the provisions of the moving Picture Experts Group 2 (MPEG 2) and is displayed on a screen during a prescribed time period.

(First Embodiment)

Figure 1:
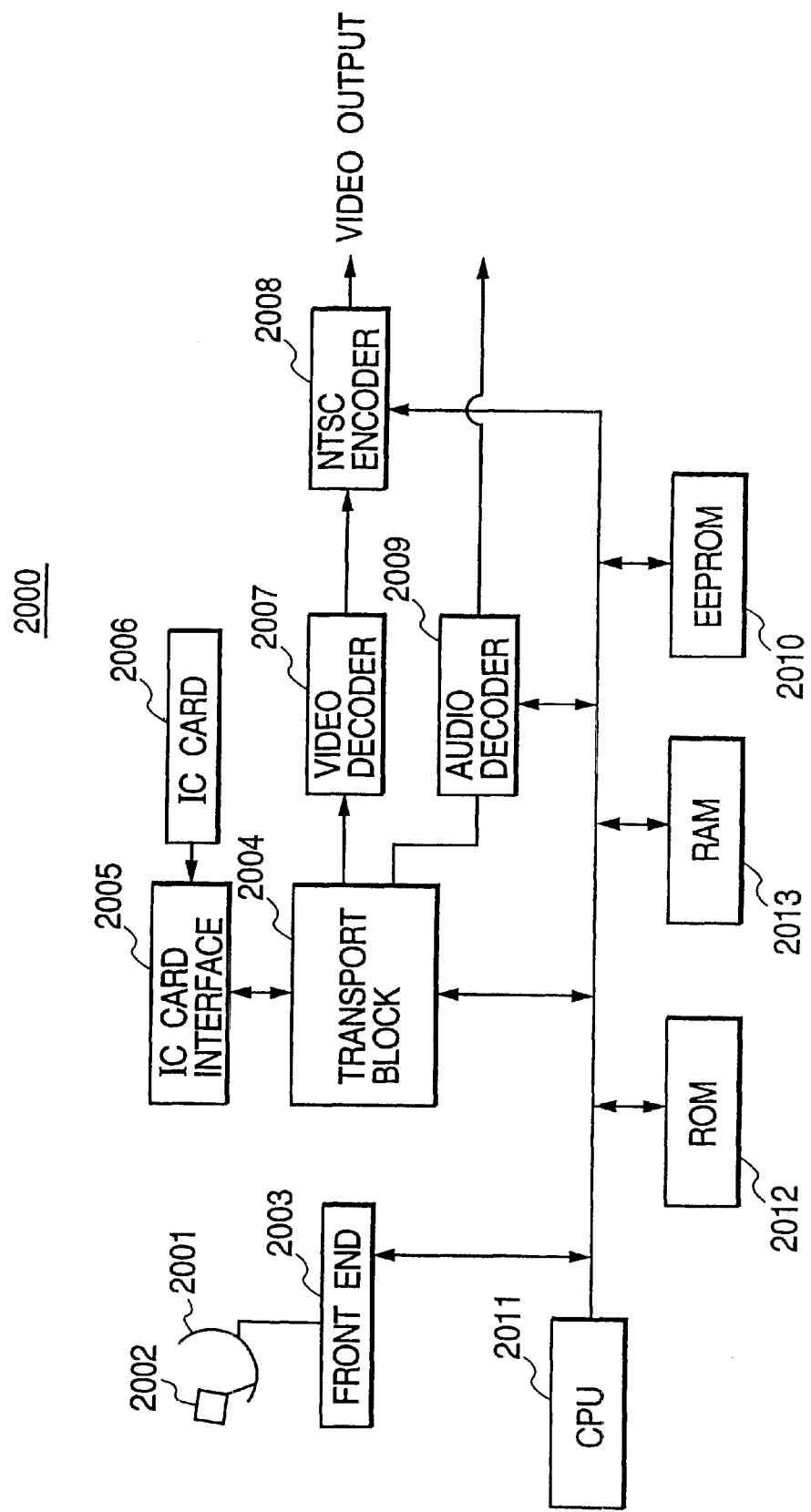
FIG. 1 is a block diagram of a conventional digital data receiving and processing apparatus used for a broadcasting method disclosed in the Published Unexamined Japanese Patent Application No. H8-195952 (1996)
Figure 2:
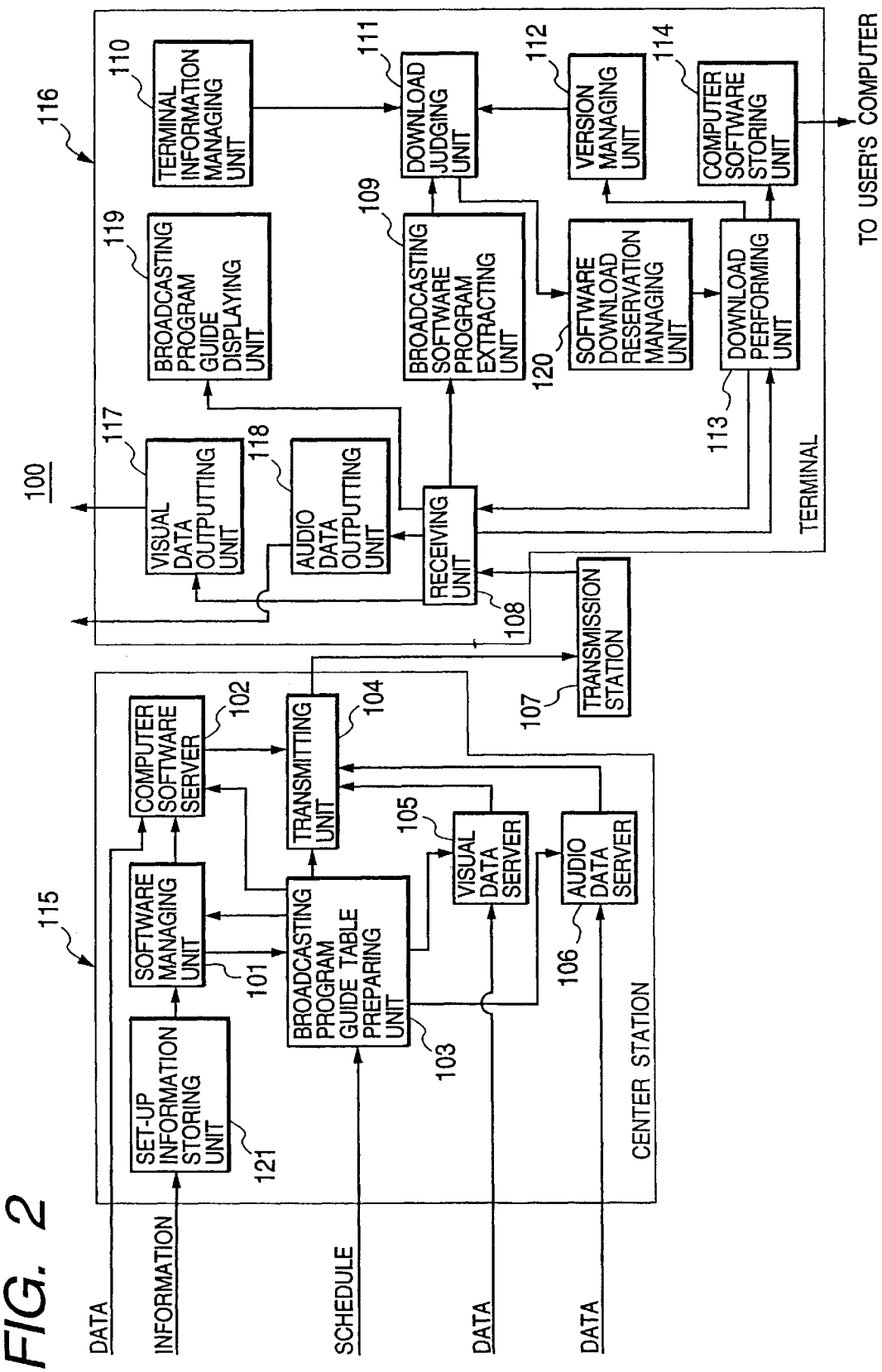
FIG. 2 is a block diagram of a software download system according to a first embodiment of the present invention.

FIG. 2 is a block diagram of a software download system according to a first embodiment of the present invention.

As shown in FIG. 2, a software download system 100 comprises a center station 115 for outputting a broadcasting program guide table (or television program information, a program guide for television service, channel guide information or an electronic program guide) in which guides of a first group of broadcasting programs respectively not accompanied by any computer software product and guides of a second group of broadcasting programs respectively accompanied by a computer software product are listed, outputting audio/video data of each broadcasting program during its transmission time period (from a transmission start time to a transmission finish time), and outputting each computer software product transmitted with one broadcasting program at the same transmission channel (corresponding to one frequency band) as that of the broadcasting program;

a plurality of terminals 116 for respectively receiving the audio/video data of the broadcasting programs, the broadcasting program guide table and the computer software products from the center station 115, outputting the audio/video data, and downloading updated computer software products selected from the computer software products, the terminals 116 being classified into a plurality of groups, and each group of terminals 116 being identified by a terminal type; and a transmission station 107, arranged in a broadcasting satellite or a communication satellite, for transmitting the audio/video data of the broadcasting programs, the broadcasting program guide table and the computer software products output from the center station 115 to the terminals 116.

The center station 115 comprises:

a computer software-server 102 for storing one or more files composing one computer software product for each of computer software products, each computer software product being transmitted to each terminal 116 with one broadcasting program;

a set-up information storing unit 121 for storing a table of pieces of set-up information (refer to FIG. 3) in which a name of one computer software product, a version number identifying a revised version of the computer software product, a terminal type fit for the computer software product, names of one or more files composing the computer software product and version numbers identifying revised versions of the files are listed for each computer software product stored in the computer software server 102;

a software managing unit 101 for managing the relationship between each computer software product stored in the computer software server 102 and the piece of set-up information of the computer software product stored in the set-up information storing unit 121;

a video data server 105 for storing video data of one broadcasting program for each broadcasting programs;

an audio data server 106 for storing audio data of one broadcasting program for each broadcasting programs;

a broadcasting program guide table preparing unit 103 for managing a broadcasting program schedule listed in a schedule table (refer to FIG. 4) in which a date, a transmission channel, a transmission start time of one broadcasting program, a transmission finish time of the broadcasting program, a name of the broadcasting program, elements of the broadcasting program and a name of a computer software product transmitted with the broadcasting program are listed for each broadcasting program, preparing a broadcasting program guide table (refer to FIG. 5) from the pieces of set-up information of the computer software products managed in the software managing unit 101 and the broadcasting program schedule, and controlling the computer software server 102, the video data server 105 and the audio data server 106 to output the audio/video data of one broadcasting program listed in the broadcasting program guide table during its transmission time period for each broadcasting program and to output the files of the computer software product listed in the broadcasting program guide table with one broadcasting program during its transmission time period for each computer software product; and a transmitting unit 104 for transmitting the broadcasting program guide table prepared in the broadcasting program guide table preparing unit 103 to each terminal 116 through the transmission station 107, transmitting the audio/video data of one broadcasting program output from the video data server 105 and the audio data server 106 to each terminal 116 through the transmission station 107 for each broadcasting program and transmitting the files of one computer software product output from the computer software server 102 with one broadcasting program to each terminal 116 through the transmission station 107 for each computer software product.

Each terminal 116 comprises:

a receiving unit 108 for receiving the broadcasting program guide table transmitted through the transmission station 107, receiving the audio/video data of one broadcasting program transmitted through the transmission station 107 during its transmission time period for each broadcasting program and the files of the computer software product transmitted with one broadcasting program during its transmission time period for each computer software product;

a broadcasting software program extracting unit 109 for extracting guides of one or more broadcasting programs respectively accompanied by a computer software product (called one or more broadcasting software programs) from the broadcasting program guide table received in the receiving unit 108, and preparing a broadcasting software program guide table (refer to FIG. 6) in which a date, a transmission channel, a transmission start time of one broadcasting software program, a transmission finish time of the broadcasting software program, a name of the broadcasting software program, a name of a computer software product corresponding to the broadcasting software program, names of one or more files composing the computer software product, version numbers of the files, a version number of the computer software product and a terminal type fit for the computer software product are listed for each broadcasting software program;

a terminal information managing unit 110 for managing a terminal management table (refer to FIG. 7) in which a particular terminal type of the terminal 116 is written;

a version managing unit 112 for managing a version management table (refer to FIG. 8) in which a version number of one computer software product and version numbers of all files composing the computer software product are listed for each computer software product;

a download judging unit 111 for receiving the terminal management table managed by the terminal information managing unit 110, the version management table managed by the version managing unit 112 and the broadcasting software program guide table prepared by the broadcasting software program extracting unit 109, extracting guides of one or more download-candidate broadcasting software programs from the guides of the broadcasting software programs listed in the broadcasting software program guide table on condition that the terminal types fit for computer software products transmitted with the download-candidate broadcasting software programs agree with a particular terminal type of the terminal 116 written in the terminal management table, preparing a download candidate table (refer to FIG. 9) in which information of one download-candidate broadcasting software program is listed for each download-candidate broadcasting software program, judging each download-candidate broadcasting software program as a download broadcasting program in cases where a version (refer to FIG. 9) of a computer software product corresponding to the download-candidate broadcasting software program in the download candidate table is newer (or the version number is higher) than that (refer to FIG. 8) of a computer software product corresponding to the same download-candidate broadcasting software program in the version management table already stored in the version managing unit 112, judging each file of a download computer software product corresponding to one download broadcasting program as a download file for each download broadcasting program in cases where a version of the file in the download candidate table is newer (or the version number is higher) than that (refer to FIG. 8) of a computer software product corresponding to the same download broadcasting program in the version management table, preparing a download broadcasting program table (refer to FIG. 10) in which a date, a transmission channel, a transmission start time of one download broadcasting program, a transmission finish time of the download broadcasting program, a name of the download broadcasting program, a name of the download computer software product corresponding to the download broadcasting program, names of one or more download files composing the download computer software product, version numbers of the download files and a version number of the download computer software product are listed for each download broadcasting program;

a software download reservation managing unit 120 for managing the download broadcasting program table from the download judging unit 111 to reserve the downloading of one download computer software product transmitted with one download broadcasting program during the transmission time period of the download broadcasting program for each download broadcasting program of the table, outputting information (a transmission channel, a name of one download broadcasting program, a name of the download computer software product corresponding to the download broadcasting program, names of one or more download files composing the download computer software product, version numbers of the download files and a version number of the download computer software product) of the download broadcasting program written in the download broadcasting program table during the transmission time period of the download broadcasting program for each download broadcasting program, and outputting a download instruction each time the information of the download broadcasting program is output;

a download performing unit 113 for receiving the information of each download broadcasting program and the download instruction from the software download reservation managing unit 120 during the transmission time period of the download broadcasting program, extracting the download files of one download computer software product from each download broadcasting program received in the receiving unit 108 according to the download instruction to download the download files of the download computer software product from the center station 115 to the terminal 116, and transmitting a name of the download computer software product corresponding to each download broadcasting program, a version number of the download computer software product, names of the download files composing the download computer software product and version numbers of the download files to the version managing unit 112 to prepare a new version management table (refer to FIG. 11) in which the version number of the download computer software product corresponding to one download broadcasting program and the version numbers of the download files composing the download computer software product are renewed for each download broadcasting program;

a computer software storing unit 114 for storing the download files of each download computer software product transmitted to the download performing unit 113, a user executing the download computer software product to perform a computer operation;

a video data outputting unit 117 for outputting the video data of the broadcasting program received by the receiving unit 108 as an image during its transmission time period for each broadcasting program to record the broadcasting programs;

an audio data outputting unit 118 for outputting the audio data of the broadcasting program received by the receiving unit 108 as a voice during its transmission time period for each broadcasting program to record the broadcasting programs; and a broadcasting program guide displaying unit 119 for displaying the broadcasting program guide table received by the receiving unit 108 on a screen.

In the above configuration, an operation of the software download system 100 is described.

The video data server 105 manages pieces of video data Dv1, Dv2, Dv3, - - - shown in FIG. 12, the audio data server 106 manages pieces of audio data Da1, Da2, Da3, - - - shown in FIG. 13, and the computer software server 102 manages a plurality of files Fl1, Fl2, Fl3, - - - shown in FIG. 14.

The broadcasting program guide table preparing unit 103 manages a broadcasting program schedule of a schedule table shown in FIG. 4. For example, in a broadcasting program having a name "morning news", a transmission channel is "CH1", a transmission start time is 6 o'clock (6:00) of June 25 in 1997, a transmission finish time is 7:00 of June 25 in 1997, elements composing the broadcasting program are the video data Dv1 managed by the video data server 105 and the audio data Da1 managed by the audio data server 106, and any computer software name is not registered because no computer software product is transmitted with the broadcasting program. Also, in a broadcasting program having a name "morning download", a transmission channel is 'CH1", a transmission start time is 7:30, a transmission finish time is 8:00, elements composing the broadcasting program are the files Fl1 and Fl5 managed by the computer software server 102, and a computer software name is "CA".

The software managing unit 101 manages the pieces of set-up information of the computer software products stored in the set-up information storing unit 121. As shown in FIG. 3, a version number of a computer software product having a name "CA" is 7, a terminal type corresponding to the computer software product is "M", the computer software product is composed of a file Fl1 and a file Fl5, a version number of the file Fl1 is 3, and a version number of the file Fl5 is 4. In cases where the version of a file of one computer software product is up (the version number is increased), the version of the computer software product is up.

In the broadcasting program guide table preparing unit 103, the pieces of set-up information managed by the software managing unit 101 are inserted into a broadcasting program schedule table shown in FIG. 4, and a broadcasting program guide table shown in FIG. 5 is prepared. In the broadcasting program schedule table, because each broadcasting program, to which one computer software name is attached, is one broadcasting software program corresponding to one computer software product, the set-up information corresponding to the computer software name "CA" is added to the broadcasting program "morning download", to which the computer software name "CA" is attached, and the set-up information corresponding to the computer software name "OS" is added to the broadcasting program "download A" to which the computer software name "OS" is attached. The broadcasting program guide table is output to the transmitting unit 104.

Also, the broadcasting program guide table preparing unit 103 instructs the computer software server 102, the video data server 105 and the audio data server 106 to output the video data of one broadcasting program, the audio data of the broadcasting program and the files of one software to the transmitting unit 104 according to the broadcasting program schedule. For example, because a transmission start time of the broadcasting program "morning news" is 6:00 of June 25 in 1997 and a transmission finish time of the broadcasting program "morning news" is 7:00 of June 25 in 1997, the broadcasting program guide table preparing unit 103 controls the video data server 105 and the audio data server 106 to output the video data Dv1 and the audio data Da1 to the transmitting unit 104 at the transmission channel CH1 between 6:00 to 7:00. Also, because a transmission start time of the broadcasting program "morning download" is 7:30 and a transmission finish time of the broadcasting program "morning download" is 8:00, the broadcasting program guide table preparing unit 103 controls the computer software server 102 to output the files Fl1 and Fl5 to the transmitting unit 104 at the transmission channel CH1 between 7:30 to 8:00.

Thereafter, the transmitting unit 104 transmits the broadcasting program guide table prepared in the broadcasting program guide table preparing unit 103, the files of the computer software product output from the computer software server 102 and the audio/video data of the broadcasting program output from the video data server 105 and the audio data server 106 to the receiving unit 108 of each terminal 116 through the transmission station 107.

Figure 15:
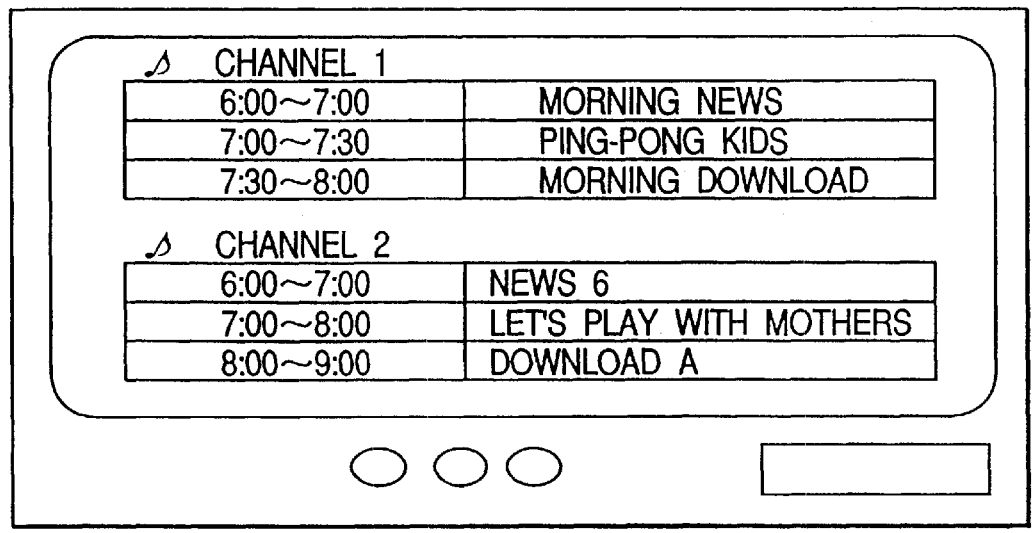
FIG. 15 shows an image of the broadcasting program guide table displayed in a broadcasting program guide displaying unit.

In the receiving unit 108, when the video data of one broadcasting program is received, the video data is transmitted to the video data outputting unit 117 and is output from the outputting unit 117 to a television set or a recording apparatus (not shown) as an image. When the audio data of one broadcasting program is received, the audio data is transmitted to the audio data outputting unit 118 and is output from the outputting unit 118 to the television set or the recording apparatus as a voice. Therefore, the user can watch the broadcasting program during its transmission time period, or the user can reproduce the image and voice of the broadcasting program at user's desired time. When the broadcasting program guide table is received, the broadcasting program guide table is transmitted to the broadcasting program guide displaying unit 119 and the broadcasting software program extracting unit 109, and the broadcasting program guide table is displayed on a screen as shown in FIG. 15 in the displaying unit 119. When the files of one computer software product are received with the audio/video data of one broadcasting program, the files of the computer software product are downloaded to the download performing unit 113 when the downloading operation is instructed by the software download reservation managing unit 120 at the transmission start time of the broadcasting program.

In the broadcasting software program extracting unit 109, one or more broadcasting software programs respectively accompanied by a computer software product are extracted from the broadcasting programs of the broadcasting program guide table, and a guide table of the broadcasting software programs (or a broadcasting software program guide table) is prepared. Because a computer soft name is attached to each broadcasting software program, the broadcasting software program can be distinguished from other broadcasting programs. For example, in cases where the broadcasting program guide table is shown in FIG. 5, the broadcasting software program guide table shown in FIG. 6 is prepared. Thereafter, the broadcasting software program guide table is transmitted to the download judging unit 111.

In the download judging unit 111, the terminal types fit for computer software products transmitted with the broadcasting software programs of the guide table is collated with a particular terminal type of the terminal 116 which is written in the terminal management table managed by the terminal information managing unit 110, and one or more download-candidate broadcasting software programs corresponding to one or more computer software products, which are fit for terminal types agreeing with the particular terminal type, are extracted from the broadcasting software programs of which the names are listed in the broadcasting software program guide table. This download-candidate broadcasting software program extracting process is described with reference to FIG. 16.

Figure 16:
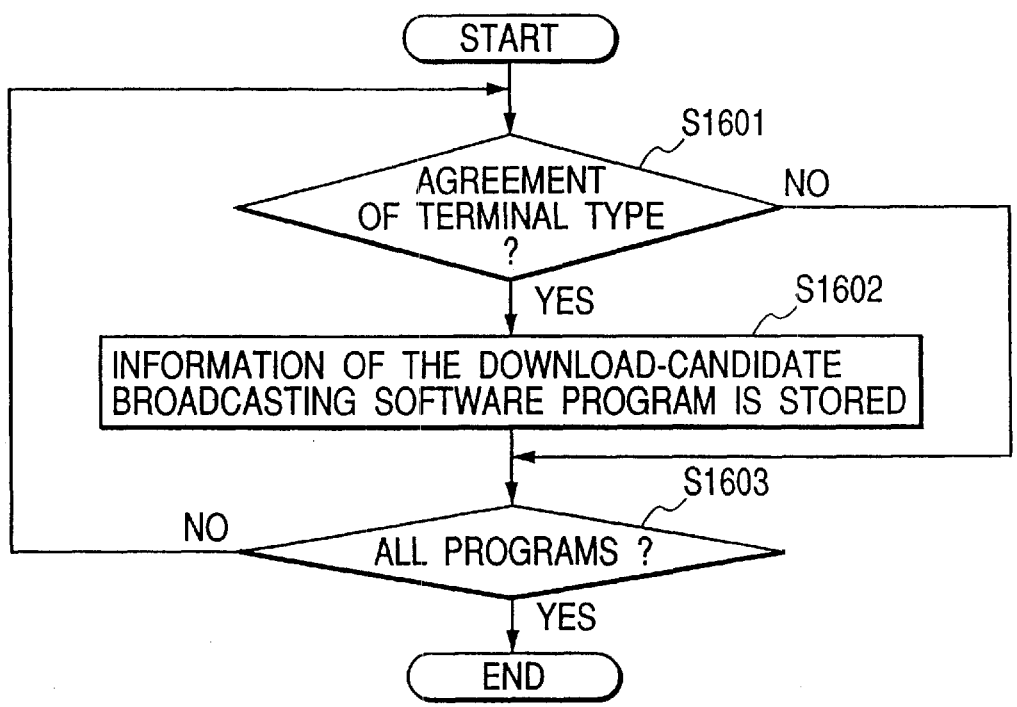
FIG. 16 shows a broadcasting software program extracting process performed in the download judging unit.

As shown in FIG. 16, it is checked whether or not one terminal type fit for one computer software product transmitted with one broadcasting software program agrees with the particular terminal type of the terminal 116 (step S1601). In the example of the broadcasting software program guide table shown in FIG. 6, because the particular terminal type of the terminal 116 is "M" as shown in FIG. 7, the terminal type fit for one computer software product transmitted with the broadcasting software program "morning download" agrees with the particular terminal type of the terminal 116, and the broadcasting software program "morning download" is set as a download-candidate broadcasting software program. Thereafter, information (a date, a transmission channel, a transmission start time of one broadcasting software program, a transmission finish time of the broadcasting software program, a name of the broadcasting software program, names of one or more files composing the broadcasting software program, version numbers of the files, a name of a computer software product corresponding to the broadcasting software program, a version number of the computer software product and a terminal type fit for the computer software product) of the download-candidate broadcasting software program is stored as a candidate for a broadcasting program downloaded (step S1602). In this example, though only one broadcasting software program is extracted as a download-candidate broadcasting software program, in cases where terminal types fit for computer software products transmitted with a plurality of broadcasting software programs agree with the particular terminal type of the terminal 116, the broadcasting software programs are extracted as a plurality of download-candidate broadcasting software programs. Therefore, the steps S1601 is performed for each broadcasting software program listed in the broadcasting software program guide table (step S1603).

Thereafter, as shown in FIG. 9, a download candidate table of information (a date, a transmission channel, a transmission start time of one broadcasting software program, a transmission finish time of the broadcasting software program, a name of the broadcasting software program, names of one or more files composing the broadcasting software program, version numbers of the files, a name of a computer software product corresponding to the broadcasting software program and a version number of the computer software product) of the download-candidate broadcasting software programs is prepared.

Thereafter, the download candidate table is collated with a version management table managed by the version managing unit 112, and a download broadcasting program table is prepared while judging whether or not a computer software product of each download-candidate broadcasting software program is to be downloaded from the receiving unit 108 to the download performing unit 113. This download broadcasting program table preparing process is described with reference to FIG. 17.

Figures 17, 18:
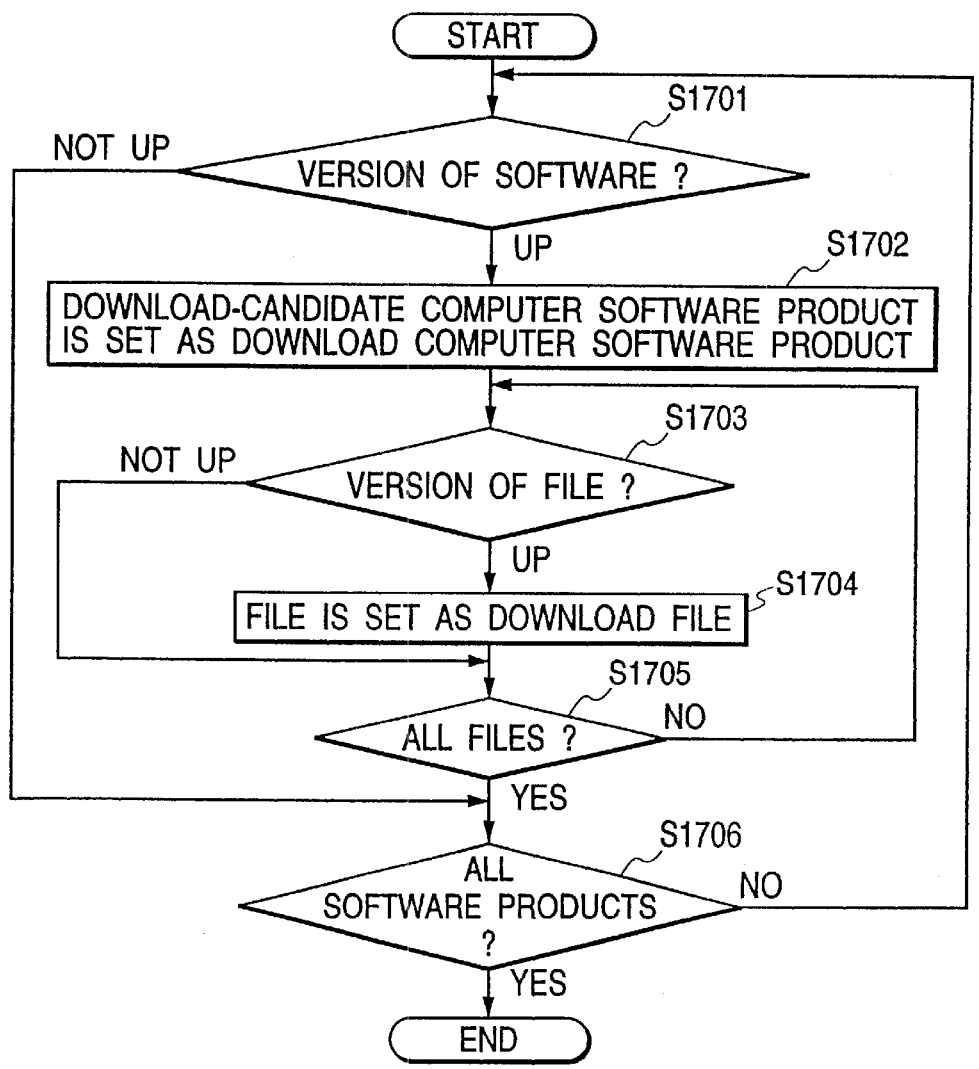
FIG. 17 shows a download table preparing process performed in the download judging unit.
FIG. 18 shows information of a download broadcasting program transmitted from a broadcasting program reservation managing unit to the download performing unit according to the first embodiment.

As shown in FIG. 17, it is judged whether or not a version number of a download-candidate computer software product corresponding to one download-candidate broadcasting software program in the download candidate table is higher than a version number of a computer software product corresponding to the same download-candidate broadcasting software program in the version management table already stored in the version managing unit 112 (step S1701). In cases where the version number of the download-candidate. computer software product in the download candidate table is higher than that in the version management table, the download-candidate broadcasting software program is set as a download broadcasting program, and the download-candidate computer software product is set as a download computer software product (S1702). FIG. 8 shows a version management table managed by the version managing unit 112. In this example, the computer software names "CA", "OS" and "DSMCC" are listed, and the version numbers of the computer software products "CA", "OS" and "DSMCC" are 6, 6 and 5. Also, names of files composing each computer software product and version numbers of the files are listed. Because the version number "7" of a computer software product "CA" corresponding to the download-candidate broadcasting software program "morning down-load" is higher than the version number "6" of the computer software product "CA" corresponding to the same download-candidate broadcasting software program "morning down-load" listed in the version management table of the version managing unit 112, the download-candidate broadcasting software program "morning down-load" is set as a download broadcasting program, and the computer software product "CA" is set as a download computer software product.

Thereafter, it is judged whether or not a version number of one file of the download computer software product in the download candidate table is higher than that of the file of the same computer software product in the version management table (step S1703). In cases where the version number of the file in the download candidate table is higher than that of the file in the version management table, the file is set as a download file (step S1704). In this example, the version number "3" of the file Fl1 of the download computer software product "CA" shown in FIG. 9 is higher than the version number "2" of the file Fl1 of the download computer software product "CA" shown in FIG. 8, the file Fl1 is set as a download file Fl1. In contrast, because the version number "4" of the file Fl5 of the download computer software product "CA" shown in FIG. 9 is not higher than the version number "4" of the file Fl5 of the download computer software product "CA" shown in FIG. 8, the file Fl5 is not set as a download file Fl5.

The step S1703 is performed for all files of the download computer software product (step S1705). Also, the step S1701 is performed for all download-candidate computer software products (step S1706). Thereafter, a download broadcasting program table, in which a date, a transmission channel, a transmission start time of one download broadcasting program, a transmission finish time of the download broadcasting program, a name of the download broadcasting program, a name of the download computer software product corresponding to the download broadcasting program, names of one or more download files composing the download computer software product, version numbers of the download files and a version number of the download computer software product are listed for each download broadcasting program, is prepared from the download broadcasting programs and the download files (step S1706). In this example, a download broadcasting program table shown in FIG. 10 is prepared.

Thereafter, the download broadcasting program table is transmitted to the software download reservation managing unit 120, and information (a transmission channel, a name of one download broadcasting program, a name of the download computer software product corresponding to the download broadcasting program, names of one or more download files composing the download computer software product, version numbers of the download files and a version number of the download computer software product) of the download broadcasting program written in the download broadcasting program table is output from the reservation managing unit 120 to the download performing unit 113 during the transmission time period of the download broadcasting program for each download broadcasting program. For example, in cases where the download broadcasting program table shown in FIG. 10 is transmitted to the software download reservation managing unit 120, information of the download broadcasting program shown in FIG. 18 is transmitted to the download performing unit 113 at 7:30 of June 25 in 1997.

Also, a download instruction is transmitted from the reservation managing unit 120 to the download performing unit 113 each time the information of one download broadcasting program is transmitted from the reservation managing unit 120 to the download performing unit 113.

In the download performing unit 113, the download files of the download computer software product are extracted from one download broadcasting program received in the receiving unit 108 according to the download instruction for each download broadcasting program. Therefore, the download computer software product can be downloaded from the center station 115 to the terminal 116. Thereafter, the download files of the download computer software product are stored in the computer software storing unit 114 as an updated computer software product for each download broadcasting program. Therefore, the user can execute the download computer software product by using user's computer to perform a computer operation.

Thereafter, a name of the download computer software product corresponding to one download broadcasting program, a version number of the download computer software product, names of the download files composing the download computer software product and version numbers of the download files are transmitted from the performing unit 113 to the version managing unit 112 for each download broadcasting program, and the version management table managed by the unit 112 is renewed to a new version management table in which the version number of the download computer software product corresponding to one download broadcasting program and the version numbers of the download files composing the download computer software product are renewed for each download broadcasting program. In this example, the version number "6" of the download computer software product "CA" shown in FIG. 8 is renewed to the version number "7" of the download computer software product "CA" shown in FIG. 11, and the version number "2" of the download file Fl1 shown in FIG. 8 is renewed to the version number "3" of the download file Fl1 shown in FIG. 11.

Accordingly, because each computer software product is transmitted with one broadcasting software program from the center station 115 to each user's terminal 116, any private channel (or any private frequency band) for the transmission of the computer software product is not required, and the computer software product can transmitted through the same transmission channel as that for the broadcasting software program. That is, a frequency band for the data transmission can be effectively utilized.

Also, because the broadcasting program guide table, in which a name of each computer software product is listed, is displayed on a screen under the control of the broadcasting program guide displaying unit 119, the user can easily recognize the existence of the computer software product.

Also, because the update set-up information of each computer software product is included in a broadcasting program guide table in the broadcasting program guide table preparing unit 103 and is automatically transmitted to the terminal 116, the version of each computer software product listed in the version management table can be automatically updated regardless of the operation of the user.

Also, when a plurality of computer software products are transmitted with a plurality of broadcasting software programs to the terminal 116, because the version of each computer software product listed in the version management table is automatically updated, an updated computer software product can be automatically extracted from the computer software products, the updated computer software product can be automatically downloaded to the download performing unit 113, and the updated computer software product is stored in the computer software storing unit 114. Therefore, even though the user is unconscious of the version-up of the computer software product, the user can reliably use the updated computer software product stored in the computer software storing unit 114.

Also, even though an updated computer software product is extracted, because a file of the updated computer software product is not extracted in cases where the file transmitted from the center station 115 is not updated, the file is not stored in the computer software storing unit 114, and a version number of the file is not renewed in the version management table. Therefore, the downloading operation for files of updated computer software products can be efficiently performed.

In this embodiment, one computer software product is transmitted with one broadcasting program from the center station 115 to the terminal 116. However, the present invention (the first embodiment and following embodiments) is not limited to the computer software product. For example, a difference file, decoded music data, a logotype table, a nonstandard character table, a genre table, a driver module or virtual machine data can be transmitted with one broadcasting program. The difference file is used to increase a version number of an operation system used in user's computer, the user can entertain with a music, the user can use many logotypes listed in the logotype table for the broadcasting program guide table, the user can use many nonstandard characters listed in the nonstandard character table for the broadcasting program guide table, the user can lists a genre of the genre table for each broadcasting program in the broadcasting program guide table, or the user can receive the broadcasting programs by using the driver module even though a broadcasting method of the MPEG2 is changed to another. Therefore, in the present invention, a software product such as a computer software product, a difference file, decoded music data, a logotype table, a nonstandard character table, a genre table, a driver module or virtual machine data can be transmitted with one broadcasting program.

Also, in this embodiment, a satellite communication is performed between the center station 115 and each terminal 116. However, the present invention (the first embodiment and following embodiments) is not limited to the satellite communication. For example, a terrestrial-wave communication (or a ground-wave communication) can be performed in a television broadcasting between the center station 115 and each terminal 116.

(Second Embodiment)

Figure 19:
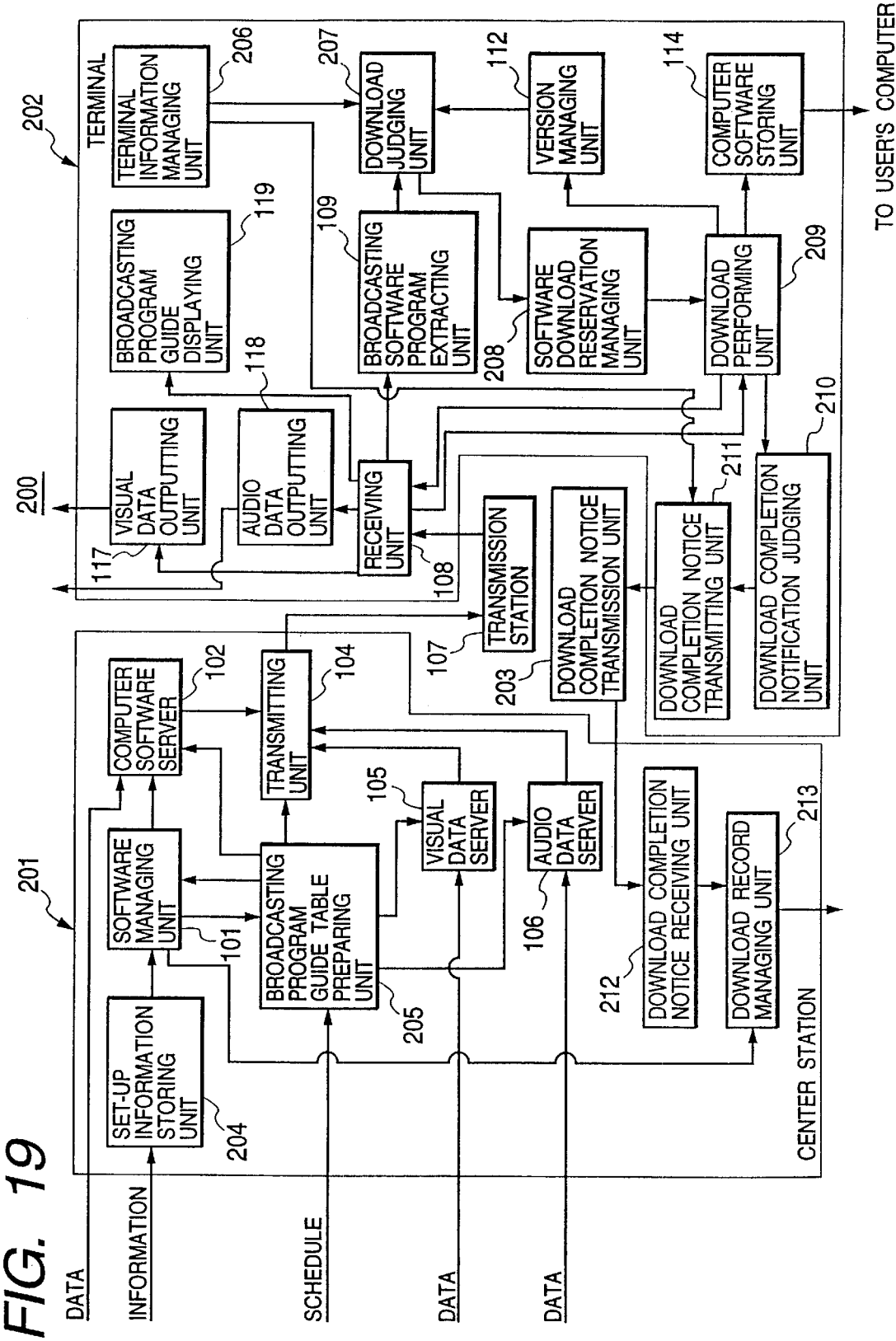
FIG. 19 is a block diagram of a software download system according to a second embodiment of the present invention.

FIG. 19 is a block diagram of a software download system according to a second embodiment of the present invention.

As shown in FIG. 19, a software download system 200 comprises:

- a center station 201 for outputting a broadcasting program guide table of a plurality of broadcasting programs and computer software products representing software products, outputting audio/video data of each broadcasting program during its transmission time period, outputting the computer software products respectively transmitted with one broadcasting program at the same transmission channel as that of the broadcasting program and managing download records of a plurality of terminals to which one computer software product is downloaded, for each computer software product;
- a plurality of terminals 202 for respectively receiving the audio/video data of the broadcasting programs, the broadcasting program guide table and the computer software products from the center station 201, outputting the audio/video data, downloading updated computer software products selected from the computer software products, and outputting a name of a computer software product and an identification number of each terminal as a download completion notice, the terminals 202 being classified into a plurality of groups, and each group of terminals 202 being identified by a terminal type;
- the transmission station 107; and
- a download completion notice transmission station 203, arranged in a broadcasting satellite or a communication satellite, for transmitting the download completion notice output from each terminal 202 to the center station 201, the download records being prepared in the center station 201 according to the download completion notice.

The center station 201 comprises:

- the computer software server 102;
- a set-up information storing unit 204 for storing a table of pieces of set-up information (refer to FIG. 20) in which a name of one computer software product, a version number identifying a version of the computer software product, a terminal type fit for the computer software product, names of one or more files composing the computer software product, version numbers identifying versions of the files and a download completion notice flag are listed for each computer software product stored in the computer software server 102;
- the software managing unit 101; the video data server 105; the audio data server 106;
- a broadcasting program guide table preparing unit 205 for managing a broadcasting program schedule listed in a schedule table (refer to FIG. 4) in which a date, a transmission channel, a transmission start time of one broadcasting program, a transmission finish time of the broadcasting program, a name of the broadcasting program, elements of the broadcasting program and a name of a computer software product transmitted with the broadcasting program are listed for each broadcasting program, preparing a broadcasting program guide table (refer to FIG. 21) from the pieces of set-up information of the computer software products managed in the software managing unit 101 and the broadcasting program schedule, and controlling the computer software server 102, the video data server 105 and the audio data server 106 to output the video data of the broadcasting programs listed in the broadcasting program schedule, the audio data of the broadcasting programs listed in the broadcasting program guide table and the files of the computer software products listed in the broadcasting program guide table;
- the transmitting unit 104;
- a download completion notice receiving unit 212 for receiving the download completion notice from each terminal 202 through the download completion notice transmission station 203; and
- a download record managing unit 213 for preparing a table of the download records (refer to FIG. 25) of a plurality of terminals 202 from the download completion notices of the terminals 202 transmitted from the download completion notice receiving unit 212 and managing the table of the download records to inform the user of the download records.

Each terminal 202 comprises:

- the receiving unit 108; the broadcasting software program extracting unit 109;
- a terminal information managing unit 206 for managing a terminal management table (refer to FIG. 22) in which a terminal type of the terminal 202 and an identification number of the terminal 202 are written;
- the version managing unit 112;
- a download judging unit 207 for receiving the terminal management table managed by the terminal information managing unit 206, the version management table managed by the version managing unit 112 and the broadcasting software program guide table prepared by the broadcasting software program extracting unit 109, extracting one or more download-candidate broadcasting software programs from the broadcasting software programs listed in the broadcasting software program guide table on condition that the terminal types fit for computer software products transmitted with the download-candidate broadcasting software programs agree with a particular terminal type of the terminal 202 written in the terminal management table, preparing a download candidate table (refer to FIG. 9) in which information of one download-candidate broadcasting software program is listed for each download-candidate broadcasting software program, judging each download-candidate broadcasting software program as a download broadcasting program in cases where a version (refer to FIG. 9) of a computer software product corresponding to the download-candidate broadcasting software program in the download candidate table is newer (or the version number is higher) than that (refer to FIG. 8) of a computer software product corresponding to the same download-candidate broadcasting software program in the version management table already stored in the version managing unit 112, judging each file of a download computer software product corresponding to one download broadcasting program as a download file for each download broadcasting program in cases where a version of the file in the download candidate table is newer (or the version number is higher) than that (refer to FIG. 8) of a computer software product corresponding to the same download broadcasting program in the version management table, preparing a download broadcasting program table (refer to FIG. 23) in which a date, a transmission channel, a transmission start time of one download broadcasting program, a transmission finish time of the download broadcasting program, a name of the download broadcasting program, a name of the download computer software product corresponding to the download broadcasting program, names of one or more download files composing the download computer software product, version numbers of the download files, a version number of the download computer software product and a download completion notice flag are listed for each download broadcasting program;

a software download reservation managing unit 208 for managing the download broadcasting program table transmitted from the download judging unit 111 to reserve the downloading of one download computer software product transmitted with one download broadcasting program during the transmission time period of the download broadcasting program for each download broadcasting program of the table, outputting information (a transmission channel, a name of one download broadcasting program, a name of the download computer software product corresponding to the download broadcasting program, names of one or more download files composing the download computer software product, version numbers of the download files, a version number of the download computer software product and a download completion notice flag) of the download broadcasting program written in the download broadcasting program table during the transmission time period of the download broadcasting program for each download broadcasting program, and outputting a download instruction each time the information of the download broadcasting program is output;

a download performing unit 209 for receiving the information of each download broadcasting program and the download instruction from the software download reservation managing unit 208 during the transmission time period of the download broadcasting program, downloading the download files of the download computer software product corresponding to each download broadcasting program from the receiving unit 108 according to the download instruction, and transmitting a name of the download computer software product corresponding to each download broadcasting program, a version number of the download computer software product, names of the download files composing the download computer software product and version numbers of the download files to the version managing unit 112 to prepare a new version management table (refer to FIG. 11) in which the version number of the download computer software product corresponding to one download broadcasting program and the version numbers of the download files composing the download computer software product are renewed for each download broadcasting program;

the computer software storing unit 114; the video data outputting unit 117; the audio data outputting unit 118; the broadcasting program guide displaying unit 119;

a download completion notification judging unit 210 for receiving the information (refer to FIG. 24) of one download broadcasting program from the download performing unit 209, judging to perform the notification of the downloading of the download computer software product corresponding to the download broadcasting program in cases where the download completion notice flag included in the information of the download broadcasting program is set to "1", judging not to perform the notification of the downloading of the download computer software product corresponding to the download broadcasting program in cases where the download completion notice flag included in the information of the download broadcasting program is set to "0", and outputting a download completion notifying instruction and the name of the download computer software product in cases where the notification of the downloading of the download computer software product is; judged;

a download completion notice transmitting unit 211 for receiving the download completion notifying instruction and the name of the download computer software product from the download completion notification judging unit 210, receiving the identification number of the terminal 202 from the terminal information managing unit 206 in cases where the download completion notifying instruction is received, and outputting the name of the download computer software product and the identification number of the terminal 202 to the download completion notice transmission station 133.

In the above configuration, an operation of the software download system 200 is described.

As shown in FIG. 20, a download completion notice flag is attached to one piece of set-up information of each computer software product. The download completion notice flag set to "1" denotes that the center station 201 requests a download completion notice of the computer software product from one terminal 202 in which the downloading of the computer software product from the center station 201 is completed. Also, the download completion notice flag set to "0" denotes that the center station 201 does not request a download completion notice of the computer software product from one terminal 202 in which the downloading of the computer software product from the center station 201 is completed. The pieces of set-up information with the download completion notice flags are inserted into the broadcasting program schedule in the broadcasting program guide table preparing unit 205, so that a broadcasting program guide table shown in FIG. 21 is prepared. Thereafter, the broadcasting program guide table, in which one download completion notice flag is listed for each computer software product, is transmitted to the broadcasting program guide displaying unit 110 and the broadcasting software program extracting unit 109 of each terminal 202.

Thereafter, a download broadcasting program table, in which one download completion notice flag is listed for each download computer software product, is prepared in the download judging unit 207 and is transmitted to the software download reservation managing unit 208. In the example shown in FIG. 23, the download completion notice flag indicating the request of a download completion notice is attached to the download computer software product "CA". Thereafter, information of the download broadcasting program written in the download broadcasting program table is transmitted from the software download reservation managing unit 208 to the download performing unit 209 during the transmission time period of the download broadcasting program for each download broadcasting program, and the files of the download computer software product are transmitted from the receiving unit 108 to the performing unit 209 for each download computer software product. Therefore, the download computer software product can be downloaded from the center station 201 to the terminal 202. Thereafter, the version management table is renewed, and the download computer software product is stored in the storing unit 114 in the same manner as in the first embodiment. In the example shown in FIG. 24, information (a transmission channel "CH1", a name "morning download" of one download broadcasting program, a name "CA" of the download computer software product corresponding to the download broadcasting program, a name Fl1 of the download file composing the download computer software product, a version number "3" of the download file, a version number "7" of the download computer software product and a download completion notice flag "1") is transmitted to the download performing unit 209.

After the downloading of the download computer software product is completed, the information of the download broadcasting program is transmitted from the download performing unit 209 to the download completion notification judging unit 210, and the download completion notice flag included in the information is checked.

In cases where the download completion notice flag is set to "1", because the download completion notice flag requests a download completion notice of the computer software product, a download completion notifying instruction and the name of the download computer software product are transmitted to the download completion notice transmitting unit 211, the identification number of the terminal 202 is received from the terminal information managing unit 206 according to the download completion notifying instruction. The identification numbers of the terminals 202 are serially set, so that each terminal 202 can be identified by its identification number. Thereafter, the name of the download computer software product and the identification number of the terminal 202 are output to the center station 201 through the download completion notice transmission station 133. In the example of FIGS. 22 and 24, because the download completion notice flag of the download computer software product "CA" is set to "1", the name "CA" of the download computer software product and the identification number "12345" of the terminal 202 are transmitted to the center station 201.

In contrast, in cases where the download completion notice flag is set to "0", because the download completion notice flag does not requests a download completion notice of the computer software product, any download completion notifying instruction is not transmitted to the download completion notice transmitting unit 211. Therefore, any download completion notifying operation is not performed.

Thereafter, the name of the download computer software product and the identification number of the terminal 202 are received in the download completion notice receiving unit 212 of the center station 201, and the identification number of the terminal 202 is recorded in a block corresponding to the download computer software product in the download record managing unit 213. Therefore, the download records of a plurality of terminals 202 are obtained, and a computer software product supplier of the center station 201 can know that one computer software product is downloaded to one terminal 202 by checking the identification number of the terminal 202 recorded in a block corresponding to the computer software product. In the example of FIG. 25, the download computer software product "CA" is downloaded in the terminals "12345", "55555", "00001".

Accordingly, in cases where a computer software product supplier wants to know that a computer software product transmitted with one broadcasting program is downloaded from the center station 201 to each terminal 202, because a download completion notice flag corresponding to the computer software product is set to "1" in the set-up information stored in the storing unit 204 of the center station 202, the request of a download completion notice can be recognized in each terminal 202 by checking the download completion notice flag of the computer software product included in the information of the download broadcasting program corresponding to the computer software product. Therefore, in cases where the computer software product is actually downloaded from the center station 201 to the download performing unit 209 of one terminal 202, an identification number of the terminal 202 and a name of the computer software product are transmitted from the download completion notice transmitting unit 211 to the download completion notice receiving unit 212 of the center station 201, the identification number of the terminal 202 is recorded in a block corresponding to the computer software product, so that the computer software product supplier can know that the computer software product is downloaded to the terminal 202 by checking the identification number of the terminal 202.

In contrast, in cases where a computer software product supplier does not want to know that a computer software product transmitted with one broadcasting program is downloaded from the center station 201 to each terminal 202, because a download completion notice flag corresponding to the computer software product is set to "0" in the set-up information stored in the storing unit 204 of the center station 202, the no-necessity of a download completion notice can be recognized in each terminal 202 by checking the download completion notice flag of the computer software product included in the information of the download broadcasting program corresponding to the computer software product. Therefore, even though the computer software product is actually downloaded from the center station 201 to the download performing unit 209 of one terminal 202, any download completion notice is not transmitted from the terminal 202 to the center station 201. Accordingly, a no-necessity download completion notice can be omitted, and a traffic volume of the download completion notice transmitted through the download completion notice transmission station 203 can be reduced.

In the second embodiment, in cases where a download completion notice flag corresponding to one computer software product is set to "1" in the set-up information, a download completion notice is returned to the center station 201 from each of all terminals 202 to which the computer software product is actually downloaded from the center station 201. However, it is applicable that a download completion notice be returned to the center station 201 from each of a first group of terminals 202 to which the computer software product is actually downloaded from the center station 201 and any download completion notice be not returned to the center station 201 from each of a second group of terminals 202 to which the computer software product is actually downloaded from the center station 201. For example, a plurality of terminals of identification numbers ranging from 1 to 1000 is set as the fist group of terminals, and a plurality of terminals of identification numbers higher than 1000 is set as the second group of terminals. In this case, though the computer software product supplier cannot know all terminals to which the computer software product is actually downloaded from the center station 201, a traffic volume of the download completion notice transmitted through the download completion notice transmission station 203 can be considerably reduced, and the computer software product supplier can know a ratio of the number of terminals, to which the computer software product is actually downloaded from the center station 201, to the number of terminals to which the computer software product is not downloaded from the center station 201.

(Third Embodiment)

In this embodiment, in cases where a computer software product supplier of a center station desires a user to judge whether or not a computer software product is to be downloaded from the center station to a terminal of the user, the computer software product supplier sets a type of the computer software product to "user application", and a guide of a broadcasting program transmitted with the computer software product set to the type "user application" is displayed for the user's download judgement.

In contrast, in cases where the computer software product supplier desires a user not to judge about the downloading of a computer software product and desires that the downloading of the computer software product is automatically judged according to a terminal type, a version number of the computer software product transmitted from the center station and a version number of the computer software product already stored in the user's terminal, the computer software product supplier sets a type of the computer software product to "system application". The computer software product set to the type "user application" is, for example, a user program (or an application program), and the computer software product set to the type "system application" is, for example, a system program.

Figure 26:
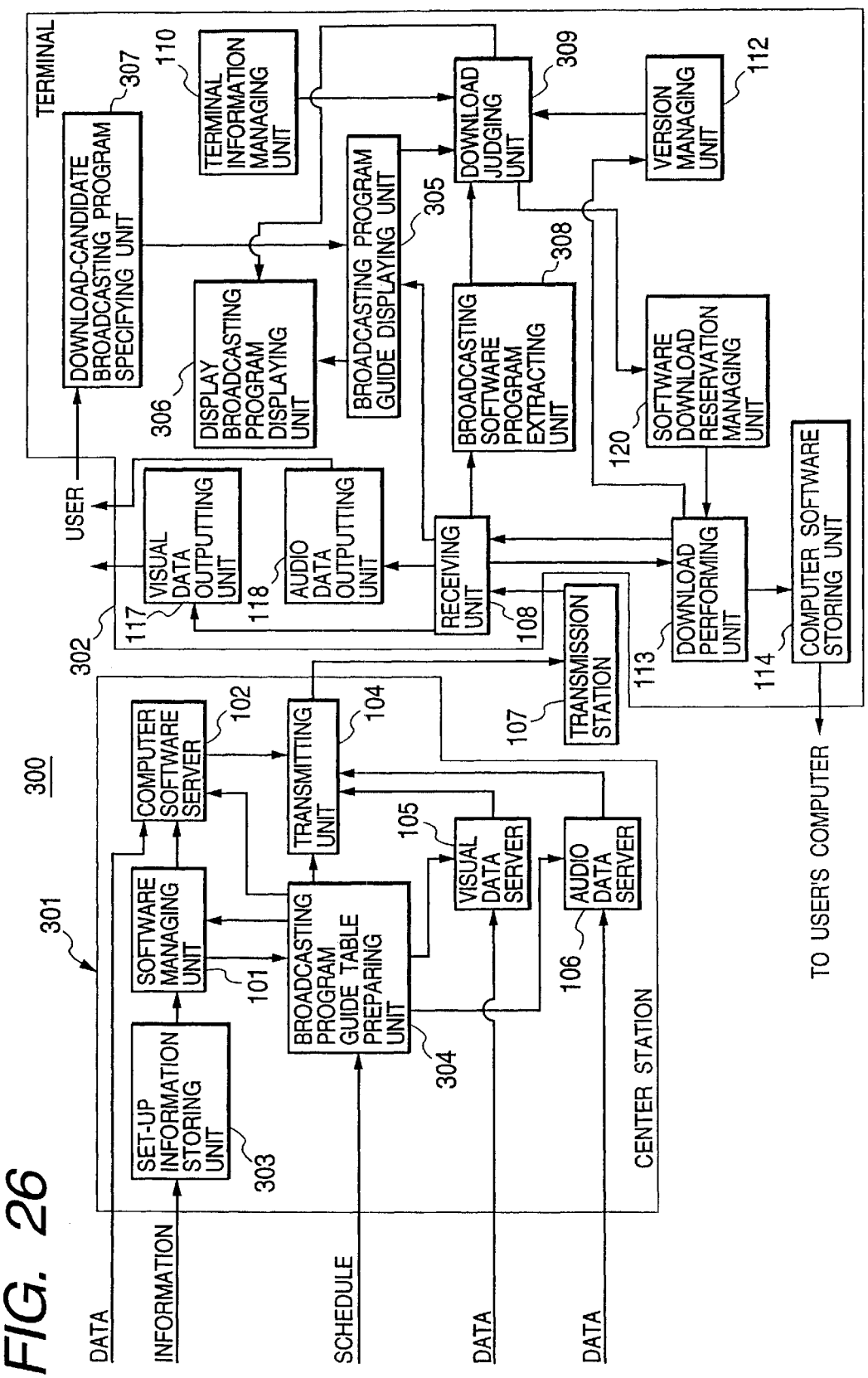
FIG. 26 is a block diagram of a software download system according to a third embodiment of the present invention.

FIG. 26 is a block diagram of a software download system according to a third embodiment of the present invention.

As shown in FIG. 26, a software download system 300 comprises:

a center station 301 for outputting a broadcasting program guide table of a plurality of broadcasting programs and computer software products representing software products, outputting audio/video data of each broadcasting program during its transmission time period, and outputting the computer software products respectively transmitted with one broadcasting program at the same transmission channel as that of the broadcasting program, a type of each computer software product being set to "user application" or "system application";

a plurality of terminals 302 for respectively receiving the audio/video data of the broadcasting programs, the broadcasting program guide table and the computer software products from the center station 301, outputting the audio/video data, and downloading updated computer software products selected from the computer software products, the terminals 302 being classified into a plurality of groups, and each group of terminals 302 being identified by a terminal type; and the transmission station 107.

The center station 301 comprises:

the computer software server 102;

a set-up information storing unit 303 for storing a table of pieces of set-up information (refer to FIG. 27) in which a name of one computer software product, a version number identifying a version of the computer software product, a terminal type fit for the computer software product, names of one or more files composing the computer software product, version numbers identifying versions of the files and a type ("user application" or "system application") of the computer software product are listed for each computer software product stored in the computer software server 102;

the software managing unit 101; the video data server 105; the audio data server 106;

a broadcasting program guide table preparing unit 304 for managing a broadcasting program schedule listed in a schedule table (refer to FIG. 4), preparing a broadcasting program guide table (refer to FIG. 28) from the pieces of set-up information of the computer software products managed in the software managing unit 101 and the broadcasting program schedule, and controlling the computer software server 102, the video data server 105 and the audio data server 106 to output the video data of the broadcasting programs listed in the broadcasting program guide table, the audio data of the broadcasting programs listed in the broadcasting program guide table and the files of the computer software products listed in the broadcasting program guide table; and the transmitting unit 104.

Each terminal 302 comprises:

the receiving unit 108; the video data outputting unit 117; the audio data outputting unit 118; the terminal information managing unit 110; the version managing unit 112;

a display broadcasting program extracting unit 305 for receiving the broadcasting program guide table from the receiving unit 108, extracting guides of broadcasting programs (called display broadcasting programs), which each are accompanied with no computer software product or a computer software product set to a type "user application", from the guides of the broadcasting programs listed in the broadcasting program guide table by removing a guide of one broadcasting program, in which a type of one computer software product corresponding to the broadcasting program is set to "system application", from the guides of the broadcasting programs listed in the broadcasting program guide table for each broadcasting program and removing a guide of one broadcasting program, in which the terminal type fit for a computer software product transmitted with the broadcasting program differs from a particular terminal type of the terminal 302 written in the terminal management table of the terminal information managing unit 110, from the guides of the broadcasting programs listed in the broadcasting program guide table for each broadcasting program, and preparing a guide table (refer to FIG. 29) of the display broadcasting programs;

a display broadcasting program displaying unit 306 for displaying an image (refer to FIG. 30) of the display broadcasting program guide table prepared by the display broadcasting program extracting unit 305 for a user to select one or more display broadcasting programs respectively accompanied by one computer software product of the type "user application" as one or more download-candidate broadcasting programs;

a download-candidate broadcasting program specifying unit 307 for specifying one or more download-candidate broadcasting programs, which are selected by the user from the display broadcasting programs of the guide table displayed by the display broadcasting program displaying unit 306, and controlling the display broadcasting program extracting unit 305 to output a guide table (refer to FIG. 31) of the download-candidate broadcasting programs;

a broadcasting software program extracting unit 308 for extracting guides of all broadcasting software programs, which each are accompanied by a computer software product set to "system application", from the broadcasting program guide table received in the receiving unit 108, and preparing a broadcasting software program guide table (refer to FIG. 32) in which a date, a transmission channel, a transmission start time of one broadcasting software program, a transmission finish time of the broadcasting software program, a name of the broadcasting software program, a name of a computer software product corresponding to the broadcasting software program, names of one or more files composing the computer software product, version numbers of the files, a version number of the computer software product, a terminal type corresponding to the computer software product and a type "system application" of the computer software product are listed for each broadcasting software program;

a download judging unit 309 for receiving the broadcasting software program guide table from the broadcasting software program extracting unit 308, receiving the guide table of the download-candidate broadcasting programs from the display broadcasting program extracting unit 305 under the control of the download-candidate broadcasting program specifying unit 307, receiving the terminal management table managed by the terminal information managing unit 110, receiving the version management table managed by the version managing unit 112, inserting one or more broadcasting software programs of the guide table into the guide table of the download-candidate broadcasting programs as one or more download-candidate broadcasting programs on condition that terminal types fit for computer software products transmitted with the broadcasting software programs agree with a particular terminal type of the terminal 302 written in the terminal management table, judging each download-candidate broadcasting program as a download broadcasting program in cases where a version of a computer software product corresponding to the download-candidate broadcasting program in the download candidate table is newer (or the version number is higher) than that (refer to FIG. 8) of a computer software product corresponding to the same download-candidate broadcasting program in the version management table already stored in the version managing unit 112, judging each file of a download computer software product corresponding to one download broadcasting program as a download file for each download broadcasting program in cases where a version of the file in the download candidate table is newer (or the version number is higher) than that of a computer software product corresponding to the same download broadcasting program in the version management table, preparing a download broadcasting program table in which a date, a transmission channel, a transmission start time of one download broadcasting program, a transmission finish time of the download broadcasting program, a name of the download broadcasting program, a name of the download computer software product corresponding to the download broadcasting program, names of one or more download files composing the download computer software product, version numbers of the download files, a version number of the download computer software product and a type of the download computer software product are listed for each download broadcasting program, transmitting a download reservation notice to the display broadcasting program displaying unit 306 to display a message (refer to FIG. 33) expressing the completion of a download reservation of one computer software product transmitted with one download-candidate broadcasting program for each download-candidate broadcasting program in cases where the download-candidate broadcasting program is set in the download broadcasting program table as one download broadcasting program, and transmitting a download no-reservation notice to the display broadcasting program displaying unit 306 to display a message (refer to FIG. 34) expressing no download reservation of one computer software product transmitted with one download-candidate broadcasting program for each download-candidate broadcasting program in cases where the download-candidate broadcasting program is not set in the download broadcasting program table as one download broadcasting program;

the software download reservation managing unit 120; the download performing unit 113; and the computer software storing unit 114.

In the above configuration, an operation of the software download system 300 is described.

Figures 27, 30:
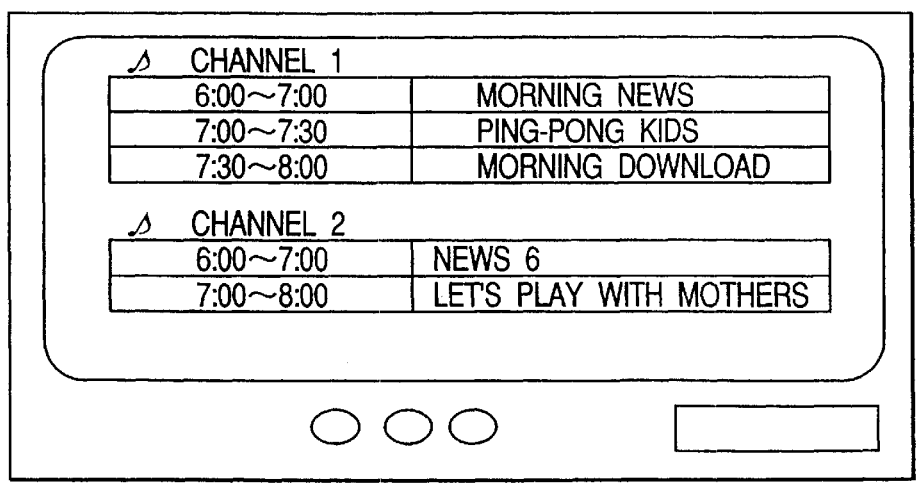
FIG. 27 shows a table of pieces of set-up information of computer software products stored in a set-up information storing unit according to the third embodiment.
FIG. 30 shows an image of the broadcasting program guide table displayed in a broadcasting program guide displaying unit according to the third embodiment.

As shown in FIG. 27, one piece of set-up information, to which a type "user application" or "system application" of one computer software product is attached, is stored in the set-up information storing unit 303 for each computer software product. The pieces of set-up information of the computer software products having the types are inserted into the broadcasting program schedule table in the guide table preparing unit 304, so that a broadcasting program guide table shown in FIG. 28 is prepared. Thereafter, the broadcasting program guide table, in which the type of one computer software product is listed for each computer software product, is transmitted with the computer software products and the audio/video data of a plurality of broadcasting programs to each terminal 302.

In each terminal 302, the broadcasting program guide table is received in the display broadcasting program extracting unit 305 and the broadcasting software program extracting unit 308.

In the extracting unit 305, because the computer software product supplier desires a user to judge about the downloading of one or more computer software products set to a type "user application", a guide of each broadcasting program with a computer software product set to a type "system application" is removed from the broadcasting program guide table. In the example of FIG. 28, a guide of the broadcasting program "download A", of which a computer software product is set to a type "system application", is removed. Also, guides of one or more broadcasting programs with one or more computer software products set to the same type "user application" are removed from the broadcasting program guide table on condition that terminal types fit for the computer software products differ from a particular terminal type of the terminal 302 written in the terminal management table of the terminal information managing unit 110. Therefore, a guide table of display broadcasting programs which each are accompanied by no computer software product or a computer software product set to a type "user application", is prepared from the broadcasting programs not removed. In the example of FIG. 28, because the terminal type "P" fit for the computer soft "DSMCC" transmitted with the broadcasting program "Let's download" differs from the particular terminal type "M" of the terminal 302, the broadcasting program "Let's download" is removed. Therefore, a display broadcasting program guide table shown in FIG. 29 is obtained.

Thereafter, a display broadcasting program guide produced from the guide table of display broadcasting programs is displayed in the broadcasting program guide displaying unit 306. Thereafter, a user specifies one or more display broadcasting programs, for which the user desires the downloading, as one or more download-candidate broadcasting programs in the download-candidate broadcasting program specifying unit 307. In the example of FIG. 29, a display broadcasting program guide shown in FIG. 30 is displayed, and the user specifies the display broadcasting program "morning download". For example, a remote controller is used as the specifying unit 307, the user operates an arrow button of the remote controller to select one display broadcasting program, and the selection of the display broadcasting program is determined by pushing a determination button. Thereafter, the guide table of the download-candidate broadcasting programs is transmitted from the display broadcasting program extracting unit 305 to the download judging unit 309 under the control of the download-candidate broadcasting program specifying unit 307. In this example, a guide table shown in FIG. 31 is transmitted to the download judging unit 309.

Also, in the broadcasting software program extracting unit 308, because a guide of each broadcasting program with a computer software product set to "system application" is removed in the extracting unit 305, guides of all broadcasting programs with computer software products set to "system application" are extracted as broadcasting software programs from the broadcasting program guide table, and a guide table of broadcasting software programs with computer software products set to "system application" is prepared. In the example of FIG. 32, a guide table of the broadcasting software program "download All with a computer software product set to "system application" is prepared.

Thereafter, the broadcasting software program guide table is transmitted from the broadcasting software program extracting unit 308 to the download judging unit 309.

In the download judging unit 309, because the collation of a terminal type fit for a computer software product of each broadcasting software program with a particular terminal type of the terminal management table is not yet performed, one or more broadcasting software programs of the guide table is inserted into the guide table of the download-candidate broadcasting programs as one or more download-candidate broadcasting programs on condition that terminal types fit for computer software products of the broadcasting software programs agree with a particular terminal type of the terminal 302. Thereafter, each download-candidate broadcasting program is judged as a download broadcasting program in cases where the version number of a computer software product corresponding to the download-candidate broadcasting program in the download candidate table is higher than that of a computer software product corresponding to the same download-candidate broadcasting program in the version management table already stored in the version managing unit 112, each file of a download computer software product corresponding to one download broadcasting program is judged as a download file for each download broadcasting program in cases where a version number of the file in the download candidate table is higher than that of a computer software product corresponding to the same download broadcasting program in the version management table, a download table of the download broadcasting program is prepared, and the download broadcasting program table is transmitted to the software download reservation managing unit 120 in the same manner as in the first embodiment to reserve the downloading of the computer software products transmitted with the download broadcasting programs.

Figure 33:
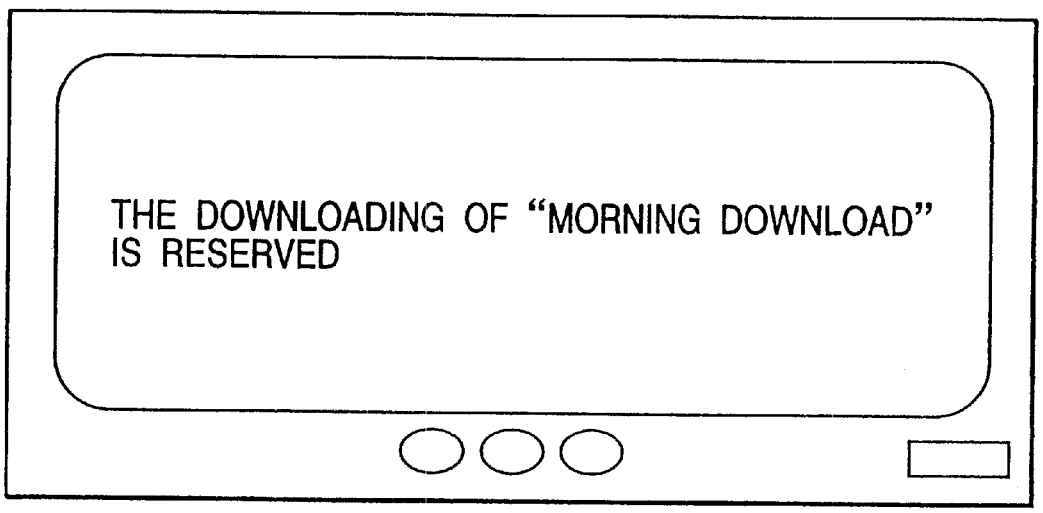
FIG. 33 shows a message expressing the completion of a download reservation according to a download reservation notice.
Figure 34:
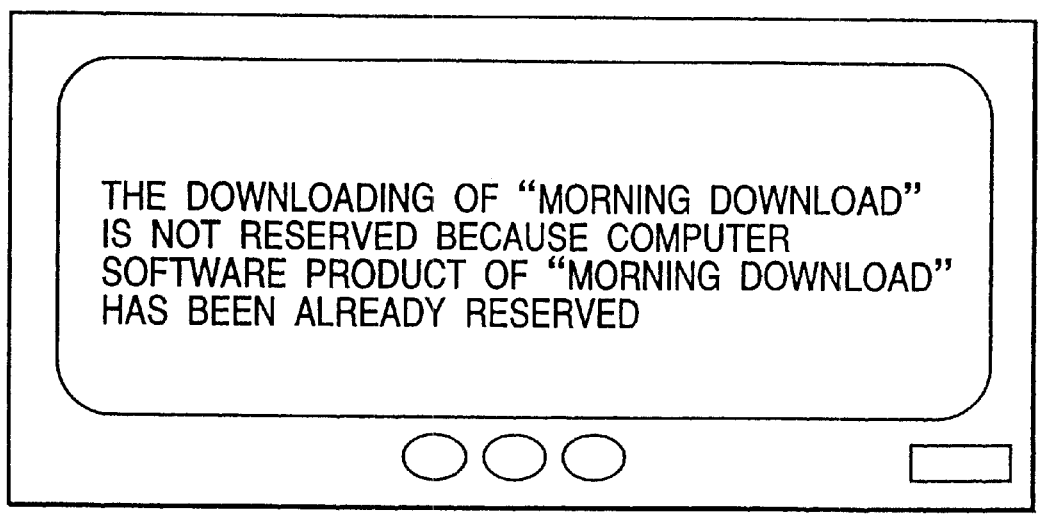
FIG. 34 shows a message expressing no download reservation according to a download no-reservation notice.

Thereafter, each time one download-candidate broadcasting program is set in the download broadcasting program table as one download broadcasting program, a download reservation notice is transmitted to the display broadcasting program displaying unit 306 to display a message expressing the completion of a download reservation of the computer software product transmitted with the download-candidate broadcasting program. Also, in cases where one download-candidate broadcasting program is not set in the download broadcasting program table as one download broadcasting program, a download no-reservation notice is transmitted to the display broadcasting program displaying unit 306 to display a message expressing no download reservation of the computer software product transmitted with the download-candidate broadcasting program. The download reservation notice or the download no-reservation notice is transmitted to the display broadcasting program displaying unit 306 for each download-candidate broadcasting program. In the example of FIG. 33, the message "download of broadcasting program "morning download" is reserved now" is displayed in response to the download reservation notice, and the message "the download reservation of broadcasting program "morning download" is not performed because the broadcasting program "morning download" has been already reserved" is displayed in response to the download reservation notice.

Thereafter, the download operation is performed in the units 120, 113, 112 and 114 in the same manner as in the first embodiment.

Accordingly, because a computer software product supplier of the center station 301 sets a type of a computer software product to "user application" in cases where the computer software product supplier desires a user to judge whether or not the downloading of the computer software product from the center station to user's terminal is to be performed, a guide of a broadcasting program with the computer software product can be displayed, and the user can judges the downloading of the computer software product. Therefore, in cases where the user judges to download the computer software product, the files of the computer software product is downloaded and stored in the computer software storing unit 114 on condition that the version of the computer software product is newer than that already stored in the version managing unit 112. In addition, in cases where the downloading of one computer software product is reserved in the reservation managing unit 120, because a download reservation notice is transmitted to the display broadcasting program displaying unit 306, the user can confirm the completion of a download reservation of the computer software product. In contrast, in cases where the downloading reservation of one computer software product is not performed, because a download no-reservation notice is transmitted to the display broadcasting program displaying unit 306, the user can confirm no download reservation of the computer software product.

Also, because guides of one or more broadcasting programs with one or more computer software products set to the same type "user application" are removed from the broadcasting program guide table on condition that terminal types fit for the computer software products differ from a particular terminal type of the terminal 302 written in the terminal management table of the terminal information managing unit 110, the user's selection of one broadcasting program with one computer software product not operable in this terminal 302 can be avoided.

In the third embodiment, a version number of a computer software product of each display broadcasting program displayed in the displaying unit 306 is not collated with a version number of the computer software product of the same broadcasting program stored in the version managing unit 112. However, it is applicable that a guide of each display broadcasting program with a computer software product set to the type "user application" be displayed in the displaying unit 306 on condition that a version number of the computer software product is higher than that already stored in the version managing unit 112. In this case, the user's selection of one broadcasting program with one updated computer software product, which has been already stored in the computer software storing unit 114, can be avoided.

(Fourth Embodiment)

In this embodiment, a broadcasting program recording reservation for one or more broadcasting programs respectively not accompanied by any computer software product is performed by a user in advance, and a recording reservation table of the broadcasting programs is prepared. When one or more download broadcasting programs respectively accompanied by a computer software product are determined in a download judging unit, a broadcasting program download reservation for each download broadcasting program is performed on condition that a transmission time period (from a transmission start time to a transmission finish time) of the download broadcasting program does not overlap with that of each broadcasting program already recording-reserved.

Figure 35:
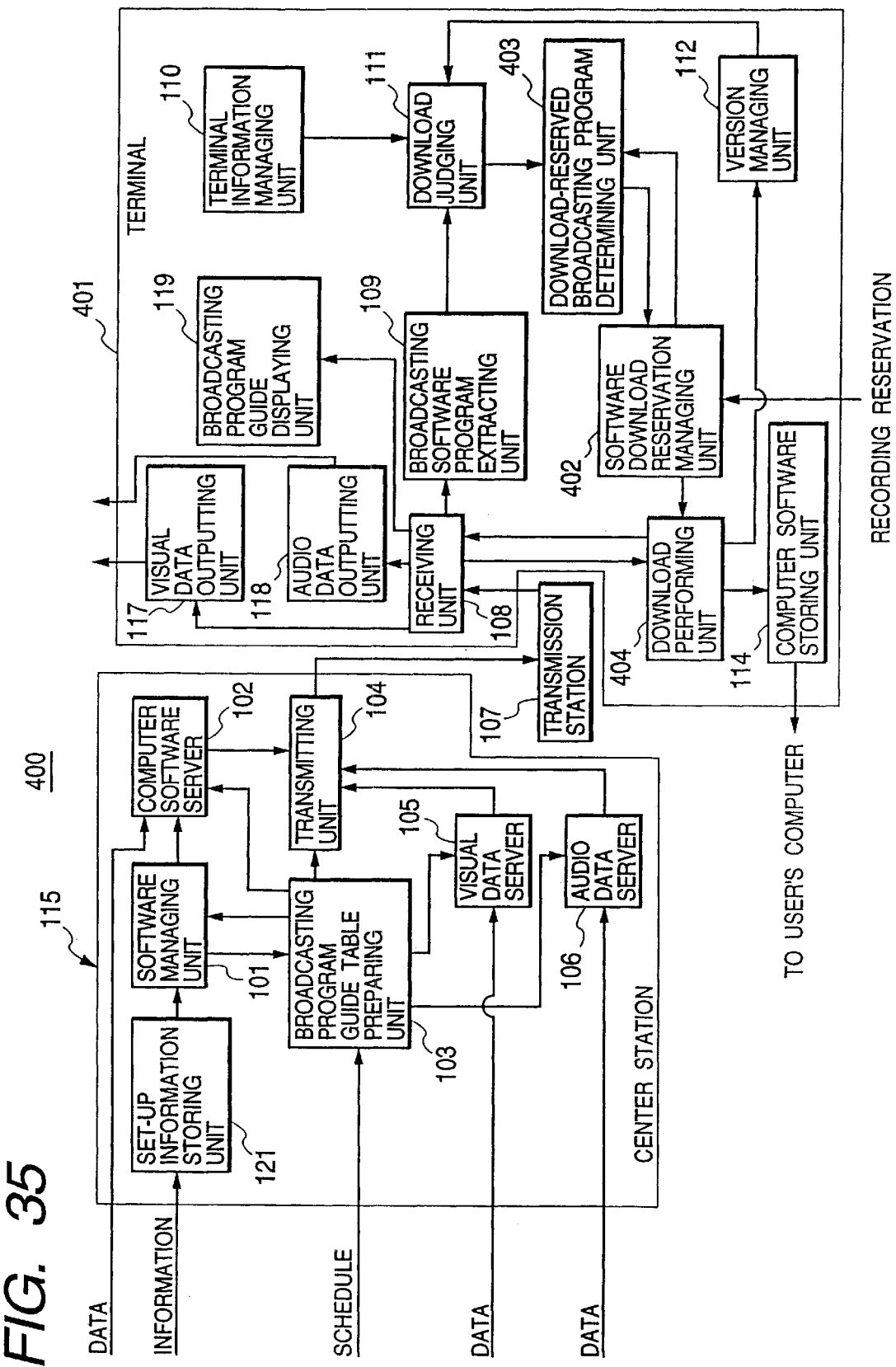
FIG. 35 is a block diagram of a software download system according to a fifth embodiment of the present invention.

FIG. 35 is a block diagram of a software download system according to a fourth embodiment of the present invention.

As shown in FIG. 35, a software download system 400 comprises:

the center station 115, the transmission station 107, and a plurality of terminals 401 for respectively receiving the audio/video data of the broadcasting programs, the broadcasting program guide table and the computer software products representing software products from the center station 115, outputting the audio/video data, and reserving the recording of one or more updated computer software products selected from the computer software products on condition that a transmission time period of each broadcasting program with one updated computer software product does not overlap with any of transmission time periods of broadcasting programs already reserved, the terminals 401 being classified into a plurality of groups, and each group of terminals 401 being identified by a terminal type.

Each terminal 401 comprises:

the receiving unit 108; the video data outputting unit 117; the audio data outputting unit 118; the broadcasting program guide displaying unit 119; the terminal information managing unit 110; the broadcasting software program extracting unit 109, the download judging unit 111; the version managing unit 112;

a software download reservation managing unit 402 for managing the recording reservation for one or more recording-reserved broadcasting programs respectively not accompanied by any computer software product in advance in a form of a reservation table (refer to FIG. 36) of the recording-reserved broadcasting programs and managing a renewed reservation table (refer to FIG. 49) of the recording-reserved broadcasting programs and one or more download-reserved broadcasting programs with computer software products;

a download-reserved broadcasting program determining unit 403 for managing a current data and time (refer to FIG. 37), referring the reservation table of the recording-reserved broadcasting programs managed by the software download reservation managing unit 402, receiving the download table of the download broadcasting programs from the download judging unit 111, selecting a guide of a download-reserved broadcasting program with a computer software product from guides of a group of download broadcasting programs, which include the same computer software product and have the same name and different transmission time periods in the download table, on condition that a transmission time period of the download-reserved broadcasting program does not overlap with that of any recording-reserved broadcasting program and a transmission start time of the download-reserved broadcasting program is placed after the current data and time, and adding a download reservation of the download-reserved broadcasting program to the reservation table of the recording-reserved broadcasting programs managed by the managing unit 402 for each group of download broadcasting programs having the same name listed in the download table to prepare the renewed reservation table (FIG. 49), the renewed reservation table being transmitted to the managing unit 402, and a download instruction being transmitted from the managing unit 402 to the receiving unit 108 during the transmission time period of each download-reserved broadcasting program to download the files of the computer software product of the download-reserve d broadcasting program from the transmitting unit 108;

a download performing unit 404 for receiving the information of each download-reserved broadcasting program of the renewed reservation table from the managing unit 402 during the transmission time period of the download-reserved broadcasting program, downloading the download files of the computer software product corresponding to each download-reserved broadcasting program from the receiving unit 108 according to the download instruction, and transmitting a name of the computer software product corresponding to each download-reserved broadcasting program, a version number of the download computer software product, names of the files composing the computer software product and version numbers of the files to the version managing unit 112 to prepare a new version management table in which the version number of the computer software product corresponding to one download-reserved broadcasting program and the version numbers of the files composing the computer software product are renewed for each download-reserved broadcasting program; and the computer software storing unit 114 for storing the files of the computer software product of one download-reserved broadcasting program downloaded to the download performing unit 404 during the transmission time period of the download-reserved broadcasting program for each download-reserved broadcasting program.

In the above configuration, an operation of the software download system 400 is described.

The download broadcasting program table is prepared in the download judging unit 111 in the same manner as in the first embodiment. In the download broadcasting program table shown in FIG. 38, a guide of each download broadcasting program is listed many times. For example, the download broadcasting program table indicates that the download broadcasting program "morning download" with the software "CA" is transmitted from the center station 115 to the terminal 401 during a first transmission time period from 7:30 to 8:00, a second transmission time period from 8:30 to 9:00 and a third transmission time period from 9:30 to 10:00 and the download broadcasting program "weather data" with the software "DAT" is transmitted from the center station 115 to the terminal 401 during a first transmission time period from 8:00 to 8:30, a second transmission time period from 9:00 to 9:30 and a third transmission time period from 11:00 to 11:30. Therefore, even though one computer software product transmitted with one download broadcasting program cannot be recorded at one transmission time period because the recording of one broadcasting program not accompanied by any computer software product overlaps with the recording of the computer software product, the computer software product transmitted with the download broadcasting program can be recorded at another transmission time period.

Also, a broadcasting program recording reservation for one or more recording-reserved broadcasting programs respectively not accompanied by any computer software product is managed in the software download reservation managing unit 402 in advance. In this example, a reservation table of the recording-reserved broadcasting programs is shown in FIG. 36. As shown in FIG. 36, for example, because the recording of the broadcasting program "daytime drama, is reserved during the transmission time period (from 10:00 to 11:00) of June 25 in 1997, any computer software product transmitted with one download broadcasting program cannot be recorded in cases where the transmission time period of the download broadcasting program overlaps with that of the broadcasting program "daytime drama".

The download table of the download broadcasting programs is transmitted from the download judging unit 111 to the download-reserved broadcasting program determining unit 403. In the determining unit 403, a current data and time is managed, and one or more download-reserved broadcasting programs are selected from the download broadcasting programs of the download table on condition that a transmission time period of each download-reserved broadcasting program does not overlap with that of any recording-reserved broadcasting program and a transmission start time of each download-reserve d broadcasting program is placed after the current data and time. This download-reserved broadcasting program determining process is described with reference to FIGS. 39 to 42.

Figure 39:
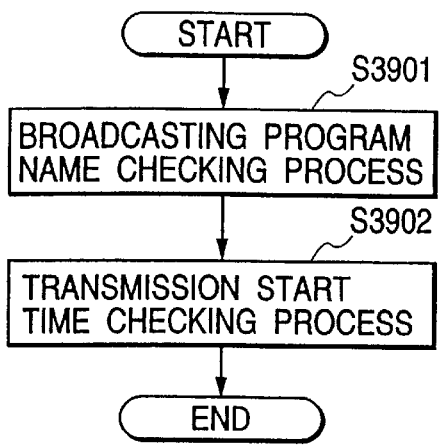
FIG. 39 is a flow chart showing a download-reserved broadcasting program determining process.
Figure 40:
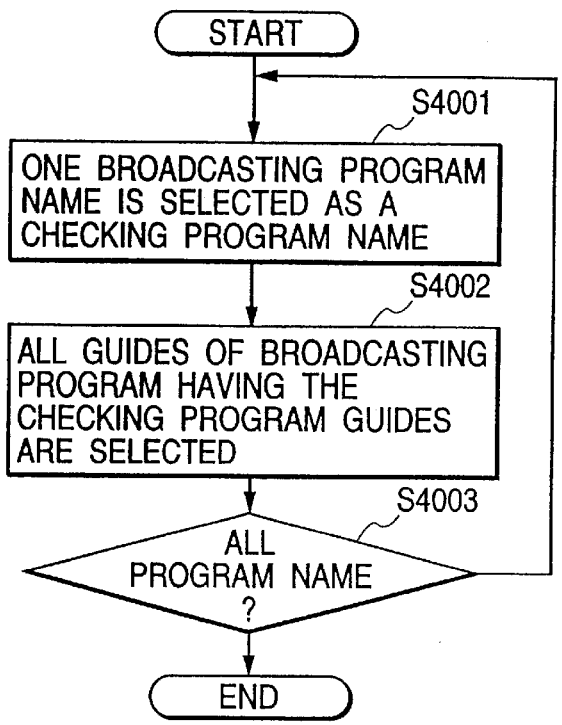
FIG. 40 is a flow chart showing a broadcasting program name checking process performed in the download-reserved broadcasting program determining process.
Figure 42:
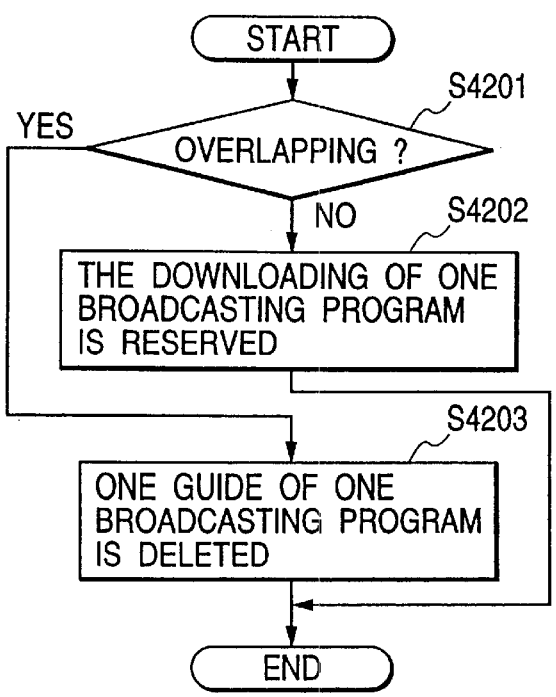
FIG. 42 is a flow chart showing a duplication checking process performed in the transmission start time checking process.
Figure 41:
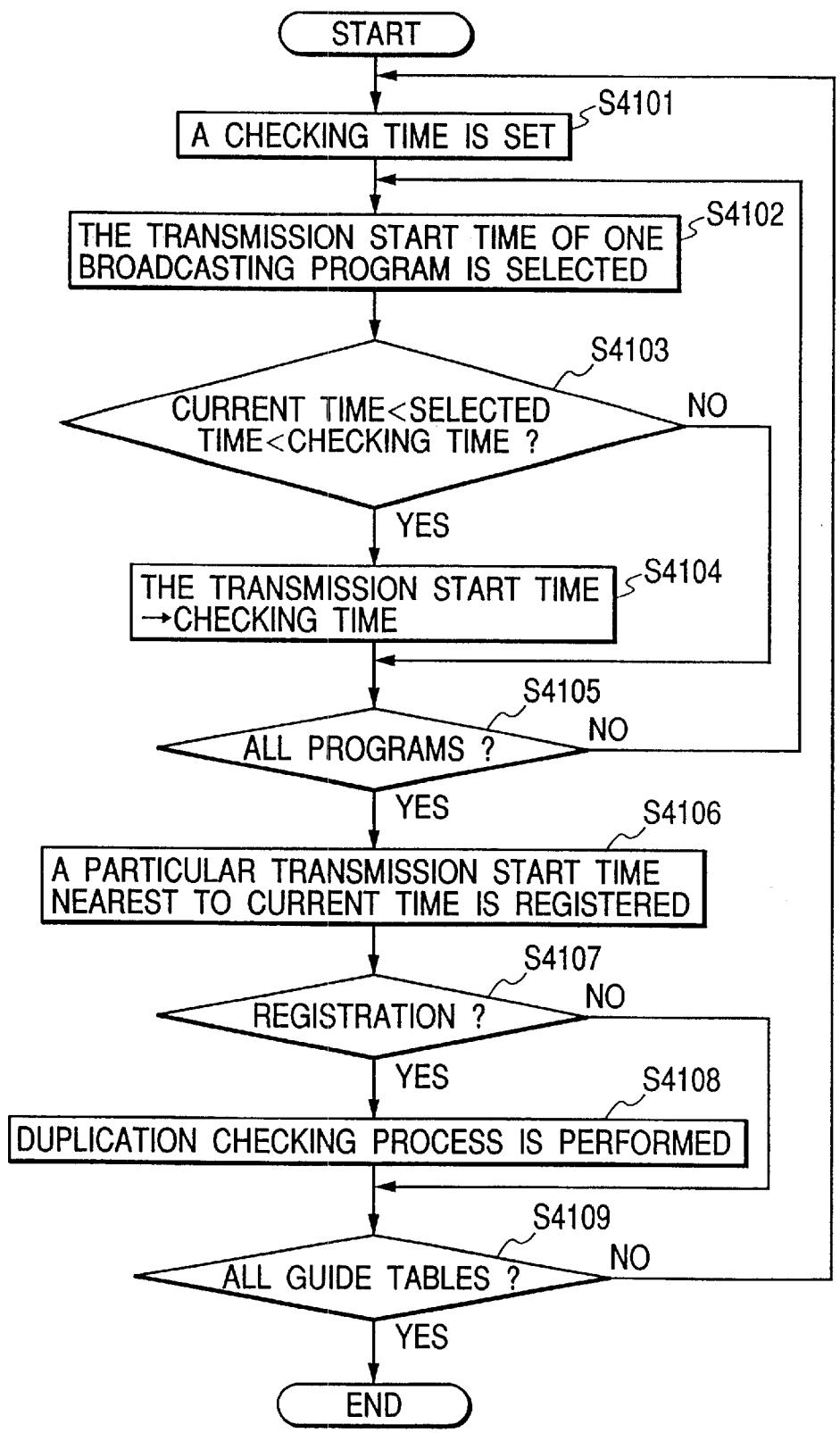
FIG. 41 is a flow chart showing a transmission start time checking process performed in the download-reserved broadcasting program determining process.

FIG. 39 is a flow chart showing the download-reserved broadcasting program determining process, FIG. 40 is a flow chart showing a broadcasting program name checking process performed in the download-reserved broadcasting program determining process, FIG. 41 is a flow chart showing a transmission start time checking process performed in the download-reserved broadcasting program determining process, and FIG. 42 is a flow chart showing a duplication checking process performed in the transmission start time checking process.

As shown in FIG. 39, a broadcasting program name checking process for preparing a guide table of one or more broadcasting programs corresponding to the same broadcasting program name is performed for each broadcasting program name in a step S3901, and a transmission start time checking process for checking whether or not one transmission start time of each download broadcasting program having a particular name is placed after the current data and time and is nearest to the current data and time among a plurality of transmission start times of the download broadcasting programs having the same particular name and checking whether or not a transmission time period of each download broadcasting program does not overlap with that of any recording-reserved broadcasting program is performed in a step S3902.

In the broadcasting program name checking process (the step S3901), as shown in FIG. 40, one broadcasting program name is selected from the download table as a checking program name (step S4001). In the example of FIG. 38, the broadcasting program name "morning download" is selected as a checking program name. Thereafter, all guides of the download broadcasting programs having the checking program name are extracted from the download broadcasting program table and are registered in a guide table of name-checked broadcasting programs (step S4002). The steps S4001 and S4002 are performed for all broadcasting program names listed in the download broadcasting program table (step S4003). In this example, when the broadcasting program name "morning download" is selected as a checking program name, a guide table of three name-checked broadcasting programs shown in FIG. 43 is prepared. When the broadcasting program name "weather data" is selected as a checking program name, a guide table of three name-checked broadcasting programs shown in FIG. 44 is prepared. When the broadcasting program name "special download" is selected as a checking program name, a guide table of a name-checked broadcasting program shown in FIG. 45 is prepared.

Thereafter, the transmission start time checking process (the step S3902) is performed.

In the checking process, an allowable upper date and time, which is capable to be set as a checking time, is initially set (step S4101). In this example, because the latest transmission start time in the guide tables shown in FIGS. 43 to 45 is 11:30 of June 25 in 1997, the checking time is initially set to 0:00 of June 26 in 1997. Thereafter, the transmission start time of one broadcasting program in one name-checked broadcasting program guide table is selected from one or more transmission start times of the broadcasting program (step S4102), and it is checked whether or not the selected transmission start time is placed after the current data and time and is placed before the checking time (step S4103). In cases where the transmission start time is placed after the current data and time and is placed before the checking time, the checking time is set to the selected transmission start time (step S4104). The steps S4102 to S4104 are performed for the transmission start times of the broadcasting programs of all guides listed in the name-checked broadcasting program guide table (step S4105). Therefore, a guide of the broadcasting program corresponding to a particular transmission start time, which is placed after the current date and time and is nearest to the current date and time among all transmission start times in the name-checked broadcasting program guide table, is determined. The particular transmission start time of the broadcasting program is registered in a time-checked broadcasting program guide table (step S4106).

In the example of FIG. 43, because the transmission start time 7:30 of the broadcasting program "morning download" is placed before the current date and time 8:15 of June 25 in 1977 (FIG. 37), the transmission start time 7:30 is not selected. Also, because the transmission start time 8:30 of the broadcasting program "morning download" is placed before the transmission start time 9:30 of the broadcasting program "morning download", the transmission start time 8:30 is selected and is registered in a time-checked broadcasting program guide table shown in FIG. 46.

Thereafter, it is checked whether or not one transmission start time is registered in the time-checked broadcasting program guide table (step S4107). In cases where any transmission start time is not registered in the time-checked broadcasting program guide table, because any duplication checking process is not needed, a transmission start time checking process for a next name-checked broadcasting program guide table is performed. In contrast, in cases where one transmission start time is registered in the time-checked broadcasting program guide table, a duplication checking process is performed for the transmission start time registered in the time-checked broadcasting program guide table (step S4108).

As shown in FIG. 42, in the duplication checking process, it is checked whether or not a particular transmission time period relating to the particular transmission start time registered in the time-checked broadcasting program guide table overlaps with one of the transmission time periods of the recording-reserved broadcasting programs registered in the recording-reserved software download reservation table (step S4201). In cases where the particular transmission time period relating to the particular transmission start time does not overlap with any transmission time period of the recording-reserved broadcasting program registered in the recording-reserved software download reservation table, the guide of the broadcasting program registered in the time-checked broadcasting program guide table is registered in a download-reserved software download reservation table as a download reservation of one download-reserved broadcasting program (step S4202), the duplication checking process for the name-checked broadcasting program guide table is successfully completed, and the procedure proceeds to a step S4109.

In contrast, in cases where the particular transmission time period relating to the particular transmission start time overlaps with one of the transmission time periods of the recording-reserved broadcasting programs, the guide of the broadcasting program relating to the particular transmission start time is deleted from the name-checked broadcasting program guide table (step S4203), and the steps S4101 to S4108 are repeated to determine another particular transmission start time of the broadcasting program. In this example, because the particular transmission time period (8:30 to 9:00) relating to the transmission start time 8:30 of the broadcasting program "morning download" shown in FIG. 46 does not overlap with any transmission time period of the recording-reserved broadcasting program registered in the recording-reserved software download reservation table (FIG. 36), the guide of the broadcasting program "morning download" shown in FIG. 46 is registered in a download-reserved software download reservation table shown in FIG. 47 as a guide of one download-reserved broadcasting program.

The transmission start time checking process is performed for each name-checked broadcasting program guide table (step S4109), and the download-reserved broadcasting program determining process is completed. In this example, the transmission start time 9:00 of a broadcasting program "weather data" shown in FIG. 44 is selected and is registered in a time-checked broadcasting program guide table shown in FIG. 48, and the guide of the broadcasting program "weather data" is registered in the download-reserved software download reservation table shown in FIG. 47 as a guide of another download-reserved broadcasting program. However, though the transmission start time 10:00 of a broadcasting program "special download" shown in FIG. 45 is selected and is registered in a time-checked broadcasting program guide table (not shown), because the transmission time period of the broadcasting program "special download" overlaps with that of the recording-reserved broadcasting program "daytime drama", the guide of the broadcasting program "daytime drama" is not registered in the download-reserved software download reservation table shown in FIG. 47.

Thereafter, the download-reserved software download reservation table prepared in the download-reserved broadcasting program determining unit 403 is transmitted to the software download reservation managing unit 402 to add one or more guides of download-reserved broadcasting programs listed in the reservation table to the recording-reserved software download reservation table, so that the reservation table is renewed. In this example, a reservation table shown in FIG. 49 is prepared in the managing unit 402.

Thereafter, the operation for the renewed reservation table is performed in the download performing unit 404 in the same manner as in the operation of the performing unit 113, one or more computer software products downloaded from the receiving unit 108 to the download performing unit 404 are stored in the computer software storing unit 114, and version numbers of the computer software products are recorded in the version managing unit 112.

Accordingly, even though the recording of one or more broadcasting programs respectively accompanied by no computer software product is reserved, one or more download-reserved broadcasting programs can be selected from the download broadcasting programs of the download table on condition that a transmission time period of each download-reserved broadcasting program does not overlap with that of any broadcasting program and a transmission start time of each download-reserved broadcasting program is placed after the current data and time, and the download-reserved broadcasting programs can be downloaded to record the computer software product of each download-reserved broadcasting program during its transmission time period.

(Fifth Embodiment)

In this embodiment, names of a plurality of computer software products corresponding to the broadcasting software programs of the guide table prepared in the broadcasting software program extracting unit 109 are displayed, a user selects names of one or more particular computer software products from the names of the computer software products, and the particular computer software products are downloaded from the receiving unit 108 to the download performing unit 113.

Figure 50:
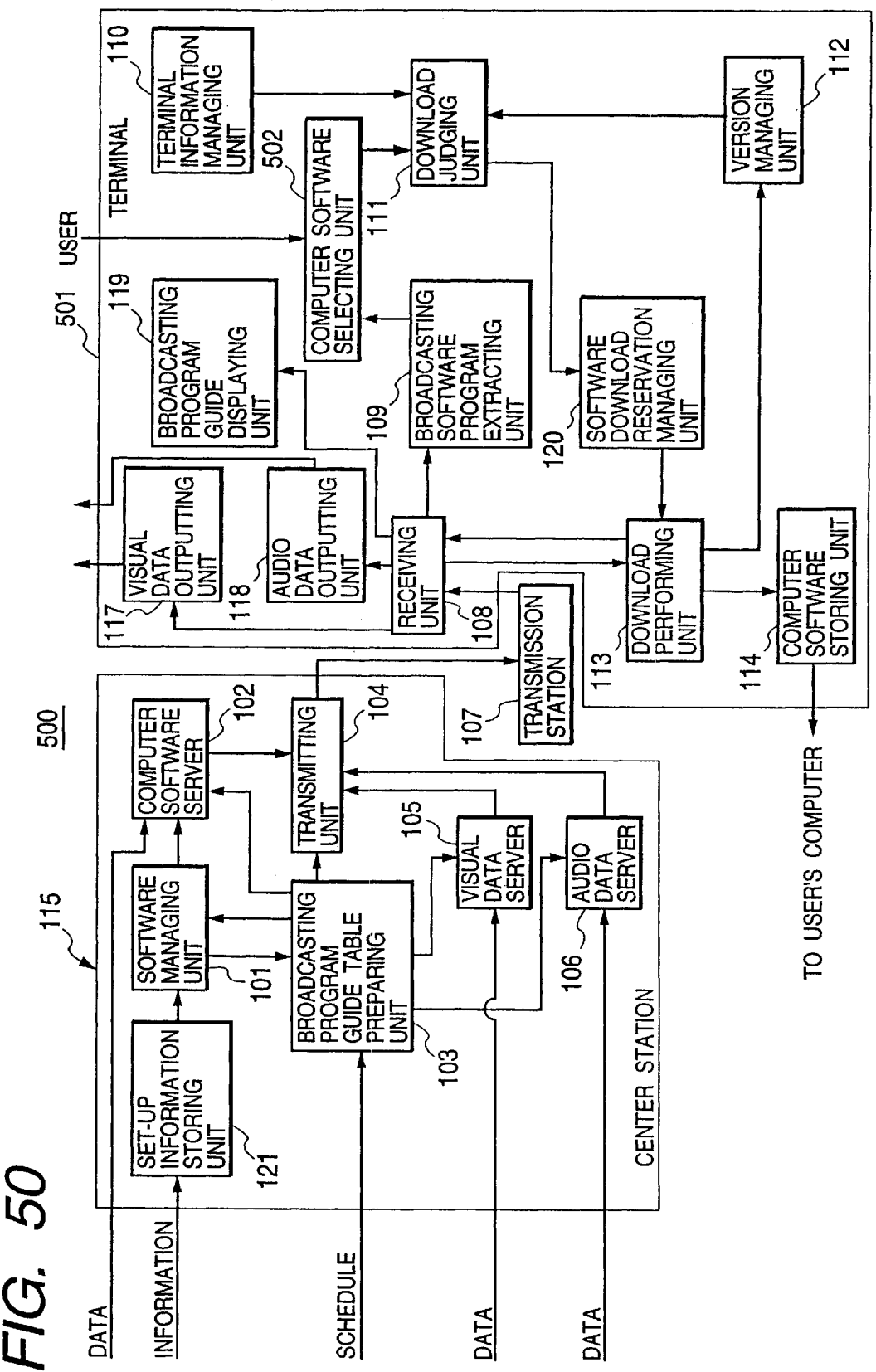
FIG. 50 is a block diagram of a software download system according to a fifth embodiment of the present invention.

FIG. 50 is a block diagram of a software download system according to a fifth embodiment of the present invention.

As shown in FIG. 50, a software download system 500 comprises:

the center station 115, the transmission station 107, and a plurality of terminals 501 for respectively receiving the audio/video data of the broadcasting programs, the broadcasting program guide table and the computer software products representing software products from the center station 115, outputting the audio/video data, displaying a plurality of names of computer software products, downloading one or more particular computer software products selected by a user, the terminals 401 being classified into a plurality of groups, and each group of terminals 401 being identified by a terminal type.

Each terminal 501 comprises:

the receiving unit 108; the video data outputting unit 117; the audio data outputting unit 118; the broadcasting program guide displaying unit 119; the terminal information managing unit 110; the broadcasting software program extracting unit 109, the version managing unit 112;

a computer software selecting unit 502 for displaying names of a plurality of computer software products corresponding to the broadcasting software programs of the guide table prepared in the broadcasting software program extracting unit 109 and receiving names of one or more particular computer software products input by a user;

the down load judging unit 111; the software download reservation managing unit 120; the download performing unit 113; and the computer software storing unit 114.

In the above configuration, an operation of the software download system 500 is described.

A broadcasting software program guide table is prepared in the broadcasting software program extracting unit 109 in the same manner as in the first embodiment. For example, a guide table of broadcasting software programs shown in FIG. 51 is prepared in the extracting unit 109. In this example, a guide of each broadcasting software program is listed many times. For example, the broadcasting software program "morning download" with the computer software product "CA" is transmitted from the center station 115 to the terminal 501 at a first transmission start time 7:30 and a second transmission start time 8:30. Therefore, even though the computer software product "CA" of the broadcasting software program "morning download" cannot be downloaded at the first transmission start time 7:30, the computer software product "CA" can be downloaded at the second transmission start time 8:30.

The broadcasting software program guide table is transmitted to the computer software selecting unit 502. In the selecting unit 502, a computer software selecting process shown in FIG. 52 is performed.

Figures 52, 53:
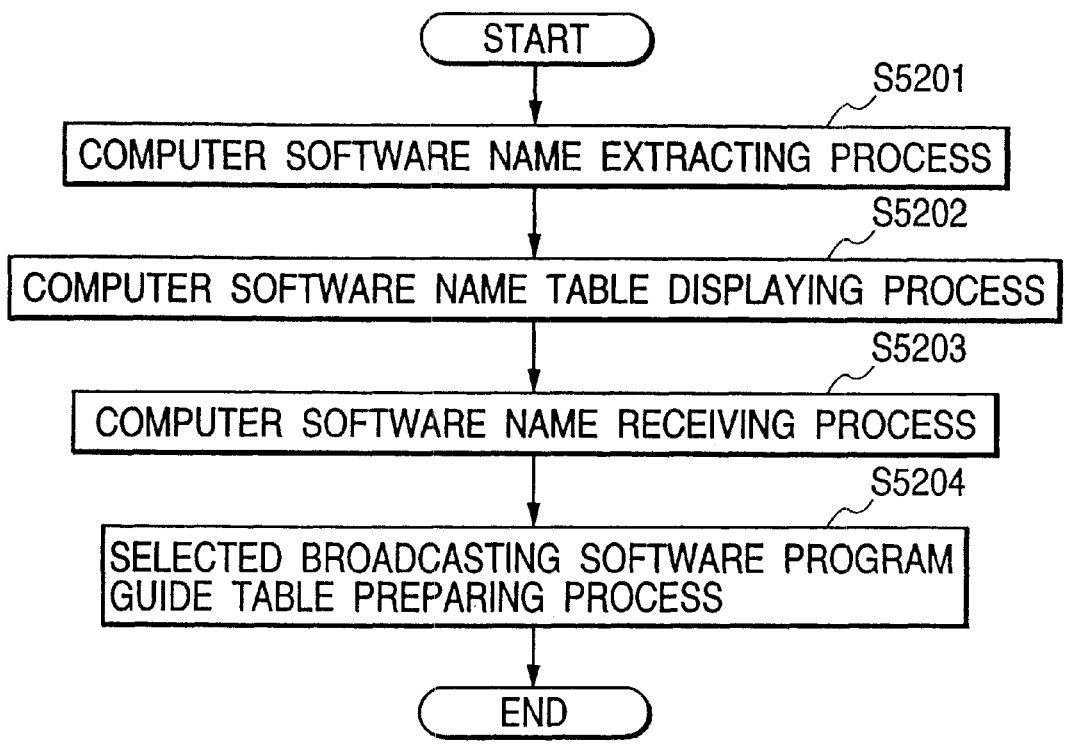
FIG. 52 is a flow chart showing a computer software selecting process performed in a computer software selecting unit.
FIG. 53 shows a computer software name table prepared in a computer software name extracting process.

As shown in FIG. 52, a computer software name extracting process for extracting names of all computer software products listed in the broadcasting software program guide table is performed to prepare a table of computer software names (FIG. 53) in a step S5201, a computer software name table displaying process for displaying the names of the computer software products listed in the computer software name table on a screen is performed in a step S5202, a computer software name receiving process, in which one or more particular computer software names selected by a user is received while the user watches the displayed computer software name table, is performed in a step S5203, and a selected broadcasting software program guide table preparing process for preparing an output guide table (FIG. 54) of one or more selected broadcasting software programs relating to one or more particular computer software products selected by the user is performed in a step S5204.

Figure 55:
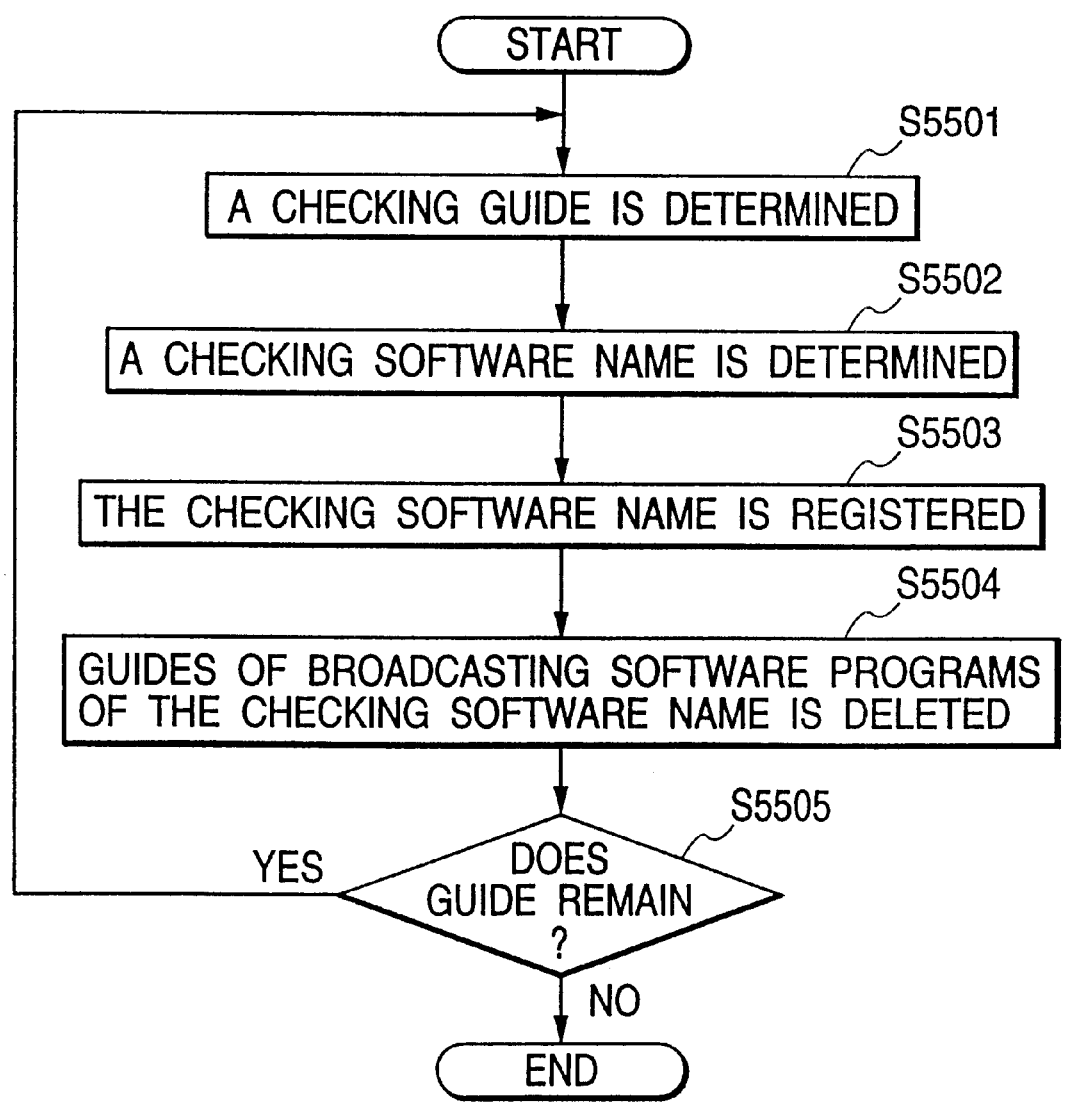
FIG. 55 is a flow chart showing a computer software name extracting process of the computer software selecting process.

As shown in FIG. 55, in the computer software name extracting process (the step S5201), a guide of one broadcasting software program listed in the broadcasting software program guide table is set as a checking guide (step S5501). Thereafter, the name of the computer software product of the checking guide is set as a checking software name (step S5502), and the checking software name is registered in a computer software name table (step S5503). In this example, the computer software name "CA" is first set as a checking software name, and the checking software name "CA" is registered in a computer software name table (FIG. 56). Thereafter, because guides of one or more broadcasting software programs with the same computer software product are listed in the broadcasting software program guide table, guides of one or more broadcasting software programs relating to the same computer software name as the checking software name are deleted from the broadcasting software program guide table (step S5504). Thereafter, it is checked whether or not at least one guide of one broadcasting software program remains in the broadcasting software program guide table (step S5505). In cases where at least one guide of one broadcasting software program remains in the broadcasting software program guide table, the steps S5201 to S5504 are repeated. Therefore, names of all computer software products are registered in the computer software name table (FIG. 53). In the example of the guide table shown in FIG. 51, six guides of the broadcasting software programs are listed in the guide table, and four computer software names "DAT", "GUI" and "OS" are registered in the computer software name table (FIG. 53).

Thereafter, in the computer software product table displaying process (the step S5202), the computer software name table is displayed on a screen to request a user to select names of one or more particular computer software products. In this example, an image shown in FIG. 57 is displayed in the terminal 501. In this embodiment, because any program transmission time period is not displayed, the user can select the particular computer software products without considering the program transmission time period.

Figure 58:
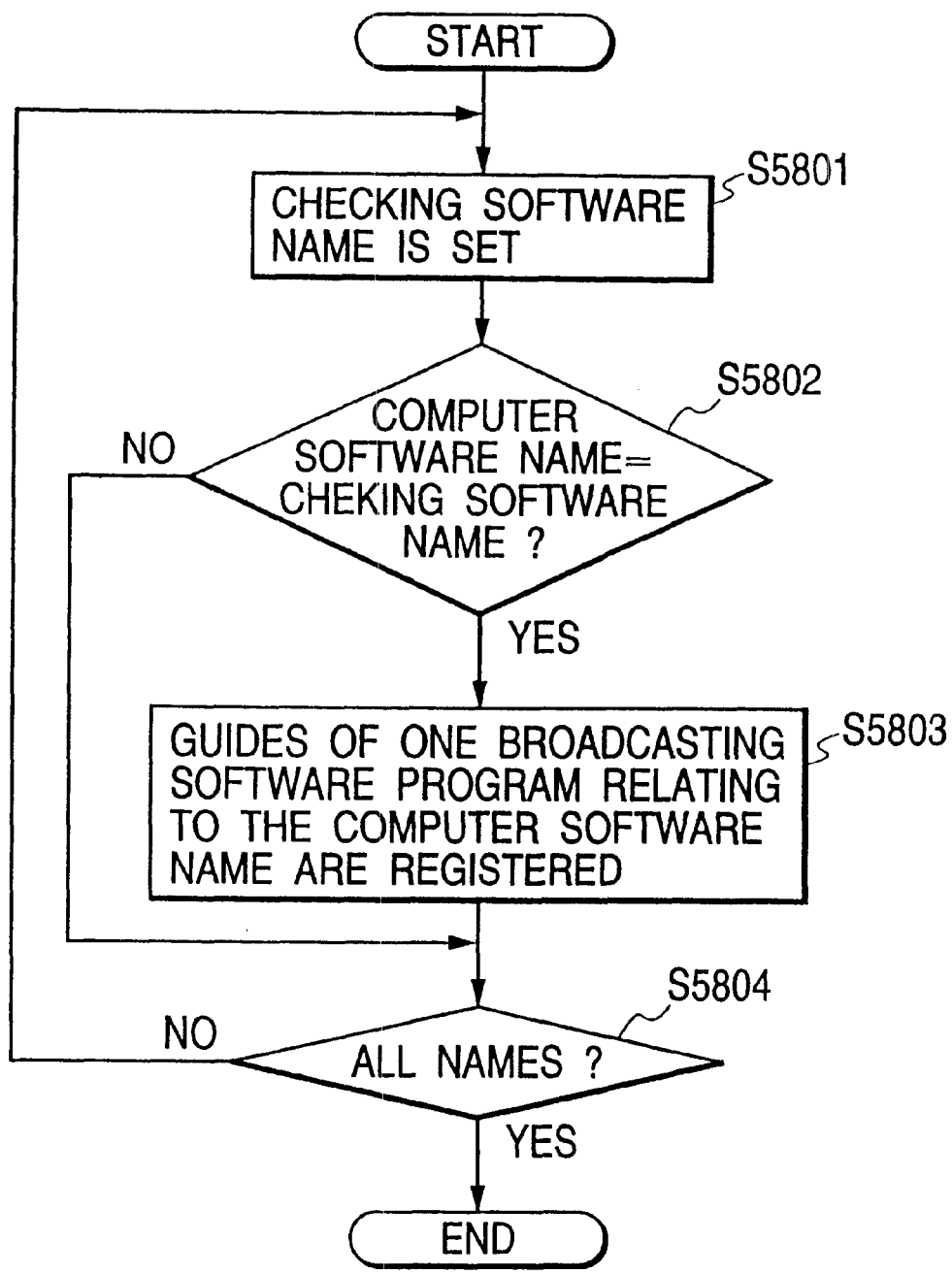
FIG. 58 is a flow chart showing a computer software name receiving process.

Thereafter, the computer software name receiving process (the step S5203) shown in FIG. 58 is performed.

As shown in FIG. 58, one name of one particular computer software product is set as a checking software name in a step S5801. In this example, the user-selects the computer software product "CA", so that the name "CA" is set as one checking software name. Thereafter, it is checked whether or not each computer software name listed in the broadcasting software program guide table agrees with the checking software name (step S5802). In cases where the computer software name agreeing with the checking software name is listed in one or more guides, one or more guides of one broadcasting software program relating to the computer software name are registered in an output guide table (step S5803). The steps S5801 to S5803 are performed for each of the particular computer software names (step S5804). In this example, two guides of the broadcasting software program "morning download" are registered in an output guide table, so that a broadcasting software program output guide table shown in FIG. 54 is prepared.

Thereafter, the broadcasting software program output guide table is transmitted to the download judging unit 111, and one or more download broadcasting programs are determined according to the output guide table in the same manner as in the first embodiment.

Accordingly, because names of computer software products transmitted with the broadcasting software programs are displayed, the user can select one or more particular computer software products in cases where the user desires to download the particular computer software products from the center station 115.

Also, because only the computer software name is displayed, the user can select one or more particular computer software products without considering the transmission time period.

(Sixth Embodiment)

When a user newly desires to record a recording-desired broadcasting program not accompanied by any computer software product, the user inputs the recording reservation of the recording-desired broadcasting program to user's terminal. Therefore, a download-reserved broadcasting program, of which a transmission time period overlaps with that of the recording-desired broadcasting program, cannot be downloaded even though the download-reserved broadcasting program is determined according to the fourth embodiment.

In this embodiment, a transmission time period of the recording-desired broadcasting program is compared with those of download-reserved broadcasting programs listed in the renewed reservation table (FIG. 49). In cases where a particular transmission time period of a particular download-reserved broadcasting program listed in the renewed reservation table overlaps with that of the recording-desired broadcasting program, a guide of the particular download-reserved broadcasting program relating to the particular transmission time period is deleted from the renewed reservation table, and the download broadcasting program table (FIG. 38) is searched for a guide of the particular download-reserved broadcasting program relating to another transmission time period according to the fourth embodiment. In cases where a specific guide of the particular download-reserved broadcasting program relating to a specific transmission time period is found out, the specific guide of the particular download-reserved broadcasting program is added to the renewed reservation table on condition that the specific transmission time period of the particular download-reserved broadcasting program does not overlap with that of the recording-desired broadcasting program, and the particular download-reserved broadcasting program is downloaded from a center station to user's terminal during the specific transmission time period.

Figure 59:
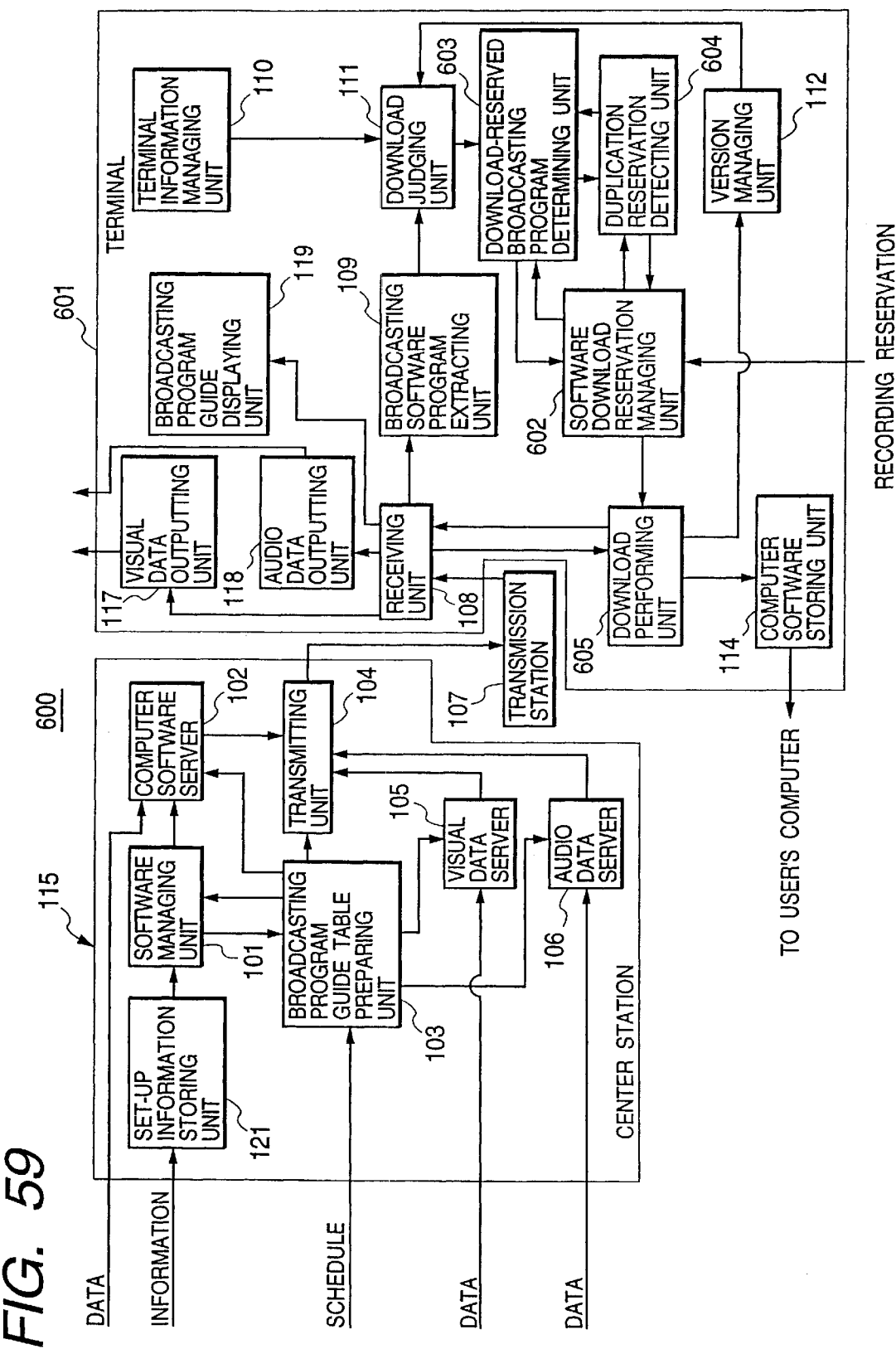
FIG. 59 is a block diagram of a software download system according to a sixth embodiment of the present invention.

FIG. 59 is a block diagram of a software download system according to a sixth embodiment of the present invention.

As shown in FIG. 59, a software download system 600 comprises:

the center station 115, the transmission station 107, and a plurality of terminals 601 for respectively receiving the audio/video data of the broadcasting programs, the broadcasting program guide table and the computer software products representing software products from the center station 115, outputting the audio/video data, and reserving the download of a particular broadcasting program of which a transmission time period does not overlaps with any broadcasting program already recording-reserved or a recording broadcasting program, the terminals 601 being classified into a plurality of groups, and each group of terminals 601 being identified by a terminal type.

Each terminal 601 comprises:

the receiving unit 108; the video data outputting unit 117; the audio data outputting unit 118; the broadcasting program guide displaying unit 119; the terminal information managing unit 110; the broadcasting software program extracting unit 109, the download judging unit 111; the version managing unit 112;

a software download reservation managing unit 602 for managing the recording reservation for one or more recording-reserved broadcasting programs respectively not accompanied by any computer software product in advance in a form of a reservation table (refer to FIG. 36) of the recording-reserved broadcasting programs and preparing and managing a recording table of one or more recording-desired broadcasting programs, of which the recording reservation is newly desired by a user;

a download-reserved broadcasting program determining unit 603 for managing a current data and time (refer to FIG. 37), referring the reservation table of the recording-reserved broadcasting programs managed by the software download reservation managing unit 602, receiving the download table of the download broadcasting programs from the download judging unit 111, selecting a guide of a download-reserved broadcasting program with a computer software product from guides of a group of download broadcasting programs, which include the same computer software product and have the same name and different transmission time periods in the download table, on condition that a transmission time period of the download-reserved broadcasting program does not overlap with that of any recording-reserved broadcasting program and a transmission start time of the download-reserved broadcasting program is placed after the current data and time, and adding a download reservation of the download-reserved broadcasting program to the reservation table of the recording-reserved broadcasting programs managed by the managing unit 402 for each group of download broadcasting programs having the same name listed in the download table to prepare a first renewed reservation table (FIG. 49) in the managing unit 602, a download instruction being transmitted from the managing unit 602 to the receiving unit 108 during the transmission time period of each download-reserved broadcasting program to download the files of the computer software product of the download-reserved broadcasting program from the transmitting unit 108;

a duplication reservation detecting unit 604 for referring the download-reserved broadcasting programs of the first renewed reservation table prepared by the download-reserved broadcasting program determining unit 603 and the recording-desired broadcasting program table managed by the software download reservation managing unit 602, comparing a transmission time period of each recording-desired broadcasting program with those of the download-reserved broadcasting programs to detect a particular download-reserved broadcasting program, of which a particular transmission time period overlaps with that of one recording-desired broadcasting program, transmitting a particular guide of the particular download-reserved broadcasting program relating to the particular transmission time period to the download-reserved broadcasting program determining unit 603 to delete a guide of one download broadcasting program agreeing with the particular guide of the particular download-reserved broadcasting program from the download broadcasting program table in the determining unit 603 and to select a specific guide of the particular download-reserved broadcasting program relating to a specific transmission time period from the guides of each download broadcasting program of the download broadcasting program table in the determining unit 603 on condition that the specific transmission time period of the particular download-reserved broadcasting program does not overlap with that of any recording-desired broadcasting program, and transmitting the particular guide of the download-reserved broadcasting program relating to the particular transmission time period and the specific guide of the particular download-reserved broadcasting program relating to the specific transmission time period to the managing unit 602 through the detecting unit 604, a second renewed reservation table being prepared from the first renewed reservation table in the managing unit 602 by deleting a guide of a broadcasting program agreeing with the particular guide of the download-reserved broadcasting program from the first renewed reservation table, and a finally renewed reservation table being prepared from the second renewed reservation table in the managing unit 602 by adding the specific guide of the particular download-reserved broadcasting program and the guides of the recording-desired broadcasting programs in the recording table to the second renewed reservation table;

a download performing unit 605 for receiving the information of each download-reserved broadcasting program of the finally renewed reservation table from the managing unit 602 during the transmission time period of the download-reserved broadcasting program, downloading the download files of the computer software product corresponding to each download-reserved broadcasting program from the receiving unit 108 according to the download instruction, and transmitting a name of the computer software product corresponding to each download-reserved broadcasting program, a version number of the download computer software product, names of the files composing the computer software product and version numbers of the files to the version managing unit 112 to prepare a new version management table in which the version number of the computer software product corresponding to one download-reserved broadcasting program and the version numbers of the files composing the computer software product are renewed for each download-reserved broadcasting program; and the computer software storing unit 114 for storing the files of the computer software product of one download-reserved broadcasting program downloaded to the download performing unit 605 during the transmission time period of the download-reserved broadcasting program for each download-reserved broadcasting program.

In the above configuration, an operation of the software download system 600 is described.

A download table of one or more download broadcasting programs is prepared in the download judging unit 111 in the same manner as in the first and fourth embodiments. An example of the download broadcasting program table is shown in FIG. 38. Thereafter, a download-reserved software download reservation table (FIG. 47) is prepared in the download-reserved broadcasting program determining unit 603 in the same manner as in the fourth embodiment, and a first renewed reservation table (FIG. 49) in which one or more download-reserved broadcasting programs are registered with one or more recording-reserved broadcasting programs, is prepared in the determining unit 603 and is managed in the managing unit 602 in the same manner as in the fourth embodiment.

Also, when a user newly desires to record one or more recording-desired broadcasting programs respectively accompanied by no computer software product, the user inputs the recording reservation of the recording-desired broadcasting programs to a broadcasting program recording requesting means (not shown). Therefore, the recording reservation is transmitted to the software download reservation managing unit 602, and a recording table of the recording-desired broadcasting programs is prepared and managed in the managing unit 602. In this example, as shown in FIG. 60, a recording table of a recording-desired broadcasting program "morning wide show" relating to a transmission time period from 9:00 to 10:00 is managed in the managing unit 602, and an information format of the table is the same as that of the first renewed reservation table.

Figure 61:
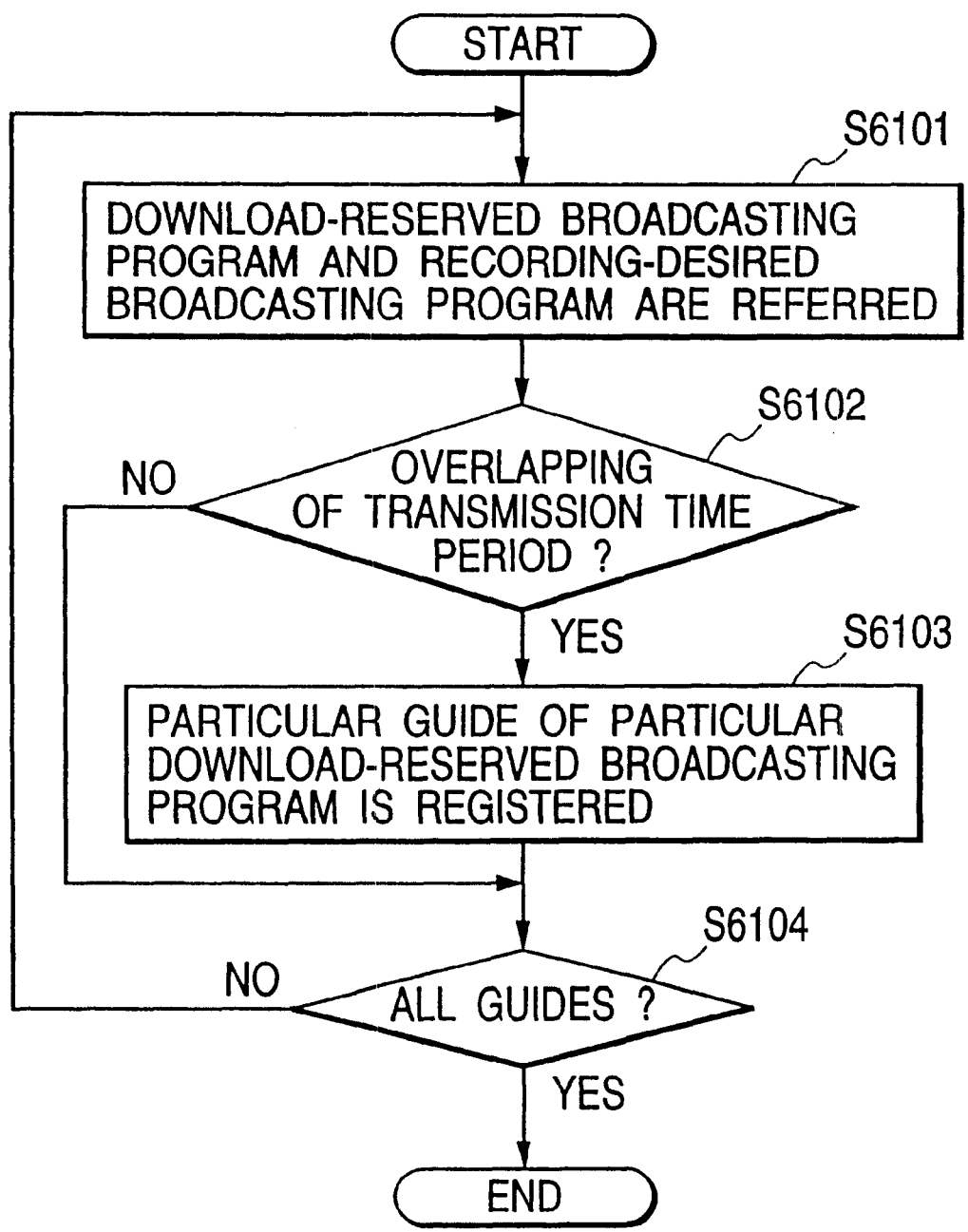
FIG. 61 is a flow chart showing a duplication reservation detecting process performed in a duplication reservation detecting unit.

Thereafter, a duplication reservation detecting process is performed in the duplication reservation detecting unit 604. The duplication reservation detecting process is described with reference to FIG. 61.

In a step S6101, the download-reserved broadcasting programs of the first renewed reservation table and the recording-desired broadcasting programs of the recording table are referred. Thereafter, one transmission time period of one recording-desired broadcasting program is compared with those of the download-reserved broadcasting programs, and it is checked whether or not one transmission time period of one download-reserved broadcasting program in one guide overlaps with that of one recording-desired broadcasting program (step S6102). In cases where a particular download-reserved broadcasting program, of which a particular transmission time period overlaps with that of one recording-desired broadcasting program, is detected, the particular guide of the particular download-reserved broadcasting program relating to the particular transmission time period is registered in a duplication-reserved broadcasting program table as one guide of one duplication-reserved broadcasting program (step S6103). The steps S6101 to S6103 are performed for all guides of the first renewed reservation table (step S6104). Therefore, one or more guides of duplication-reserved broadcasting programs are registered in the duplication-reserved broadcasting program table.

In this example, because the transmission time period (9:00 to 9:30 of June 25 in 1997) of the broadcasting program "weather data" registered in the first renewed reservation table of FIG. 49 overlaps with that (9:00 to 10:00) of the recording-desired broadcasting program "morning wide show" of FIG. 60, the guide of the broadcasting program "weather data" relating to the transmission time period (9:00 to 9:30) is registered in a duplication-reserved broadcasting program table shown in FIG. 62.

Thereafter, the duplication-reserved broadcasting program table is transmitted from the detecting unit 604 to the download-reserved broadcasting program determining unit 603. In the determining unit 603, one or more guides of download broadcasting programs agreeing with the guides of the duplication-reserved broadcasting programs are deleted from the download broadcasting program table, so that a renewed download broadcasting program table is prepared. In this example, the guide of the broadcasting program "weather data" relating to the transmission time period (9:00 to 9:30) is deleted from the download broadcasting program table of FIG. 38, and a renewed download broadcasting program table of FIG. 63 is prepared.

Thereafter, the download-reserved broadcasting program determining process shown in FIG. 39 is performed in the same manner as in the fourth embodiment according to all download broadcasting programs of the renewed download broadcasting program table, all recording-reserved broadcasting programs of the first renewed reservation table managed by the managing unit 602 and all recording-desired broadcasting programs of the recording table, and a renewed reservation table of one or more download-reserved broadcasting programs is prepared in the determining unit 603. Because the download-reserved broadcasting program determining process is performed by considering the recording table, a transmission time period of each download-reserved broadcasting program of the renewed reservation table does not overlaps with that of any recording-desired broadcasting program. In this example, as shown in FIG. 64, a renewed reservation table, in which the guide of the broadcasting program "weather data" relating to the transmission time period (11:00 to 11:30) is registered with the guide of the broadcasting program "morning download" relating to the transmission time period (8:30 to 9:00), is prepared.

Thereafter, one guide of one download-reserved broadcasting program, of which the name agrees with that of one duplication-reserved broadcasting program of the duplication-reserved broadcasting program table is extracted as one guide of one revised download-reserved broadcasting program from the renewed reservation table of the download-reserved broadcasting programs for each duplication-reserved broadcasting program, and a revised reservation table of one or more revised download-reserved broadcasting programs is prepared. Each revised download-reserved broadcasting program is planned to be downloaded in place of the corresponding duplication-reserved broadcasting program. In this example, as shown in FIG. 65, because the guide of the broadcasting program "weather data" relating to the transmission time period (11:00 to 11:30) is extracted as one guide of one revised download-reserved broadcasting program, the guide of the broadcasting program "morning download" having no relationship with any duplication-reserved broadcasting program is not registered in the revised reservation table.

Thereafter, the revised reservation table of the revised download-reserved broadcasting programs and the duplication-reserved broadcasting program table are transmitted from the determining unit 603 to the software download reservation managing unit 602 though the detecting unit 604.

Figure 66:
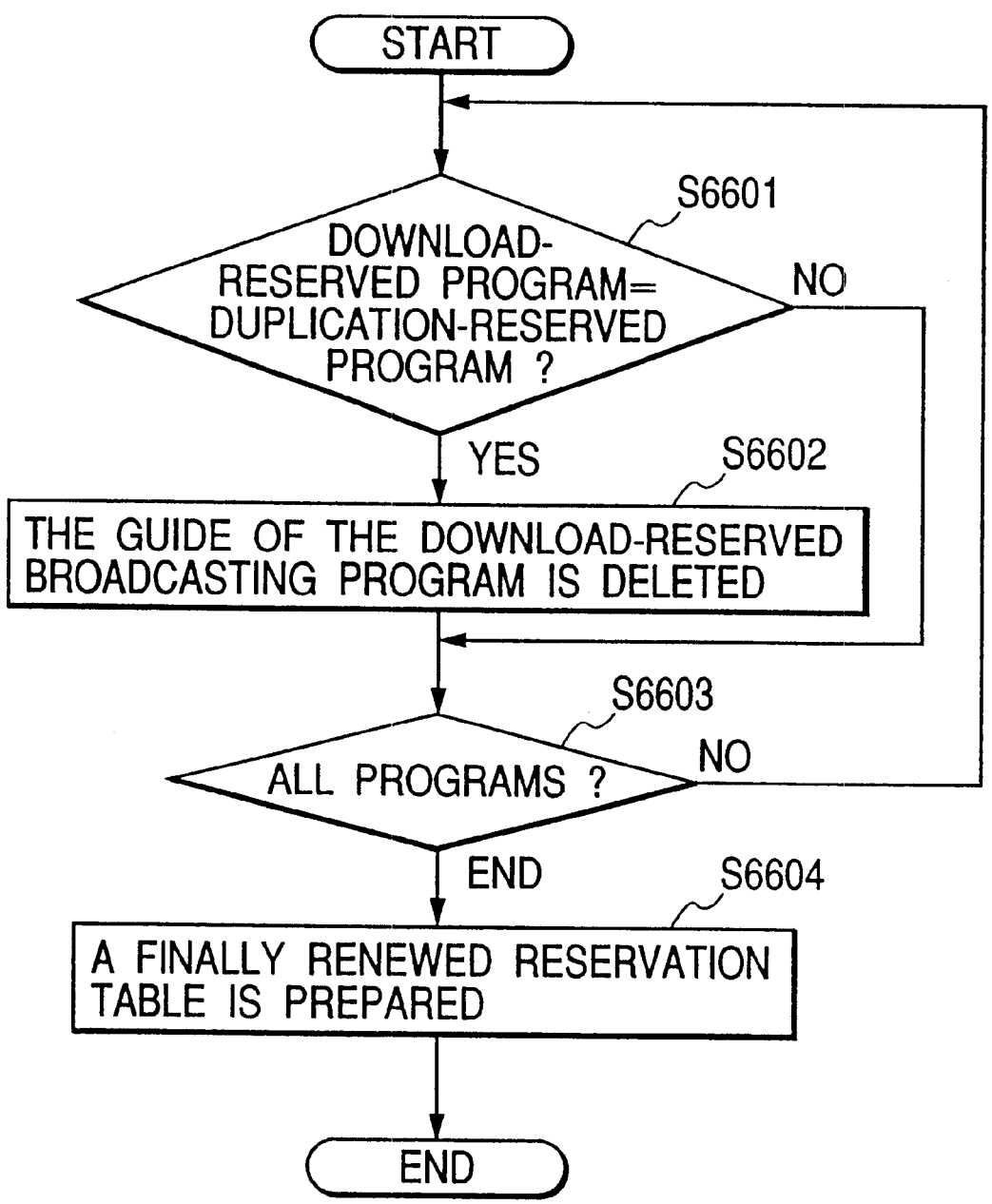
FIG. 66 shows a reservation renewing process performed in a broadcasting program reservation managing unit.

In the managing unit 602, a reservation renewing process for renewing the first renewed reservation table is performed according to the revised reservation table and the duplication-reserved broadcasting program table. The reservation renewing process is described with reference to FIG. 66.

In a step S6601, it is checked whether or not of each download-reserved broadcasting program registered in the first renewed reservation table agrees with one duplication-reserved broadcasting program of the duplication-reserved broadcasting program table. In cases where one download-reserved broadcasting program agrees with the duplication-reserved broadcasting program, the guide of the download-reserved broadcasting program is deleted from the first renewed reservation table (step S6602). The steps S6601 and S6602 are performed for all duplication-reserved broadcasting programs of the duplication-reserved broadcasting program table (step S6603), and a second renewed reservation table is prepared. In this example, the guide of the broadcasting program "weather data" relating to the transmission time period (9:00 to 9:30) is deleted from the first reservation table of FIG. 49, and a second renewed reservation table shown in FIG. 67 is prepared.

Thereafter, in a step S6604, guides of all revised download-reserved broadcasting programs of the revised reservation table and guides of all recording-desired broadcasting programs of the recording table are added to the second renewed reservation table, so that a finally renewed reservation table of recording-reserved broadcasting programs and download-reserved broadcasting programs is prepared. In this example, the guide of the revised download-reserved broadcasting program "weather data" relating to the transmission time period (11:00 to 11:30) and the guide of the recording-desired broadcasting program "morning wide show" are added to the second renewed reservation table of FIG. 67, and a finally renewed reservation table shown in FIG. 68 is prepared.

Thereafter, the computer software products of the download-reserved broadcasting programs of the finally renewed reservation table are downloaded from the receiving unit 108 to the download performing unit 404, and the computer software products are stored in the software storing unit 114 in the same manner as in the first and fourth embodiments.

Accordingly, even though the user reserves the recording of a recording-desired broadcasting program of which a transmission time period overlaps with a particular transmission time period of one download-reserved broadcasting program registered in a reservation table, because the download-reserved broadcasting program relating to the particular transmission time period is removed from the reservation table and the download-reserved broadcasting program relating to a specific transmission time period is registered in the reservation table on condition that the specific transmission time period of the download-reserved broadcasting program does not overlap with that of the recording-desired broadcasting program, the recording of the recording-desired broadcasting program and the downloading of the download-reserved broadcasting program can be performed.

(Seventh Embodiment)

In this embodiment, a computer software product is processed according to various software communication protocols to produce various protocol-processed computer software products, and the protocol-processed computer software products are simultaneously transmitted from a center station to a plurality of terminals with one broadcasting program.

Figure 69:
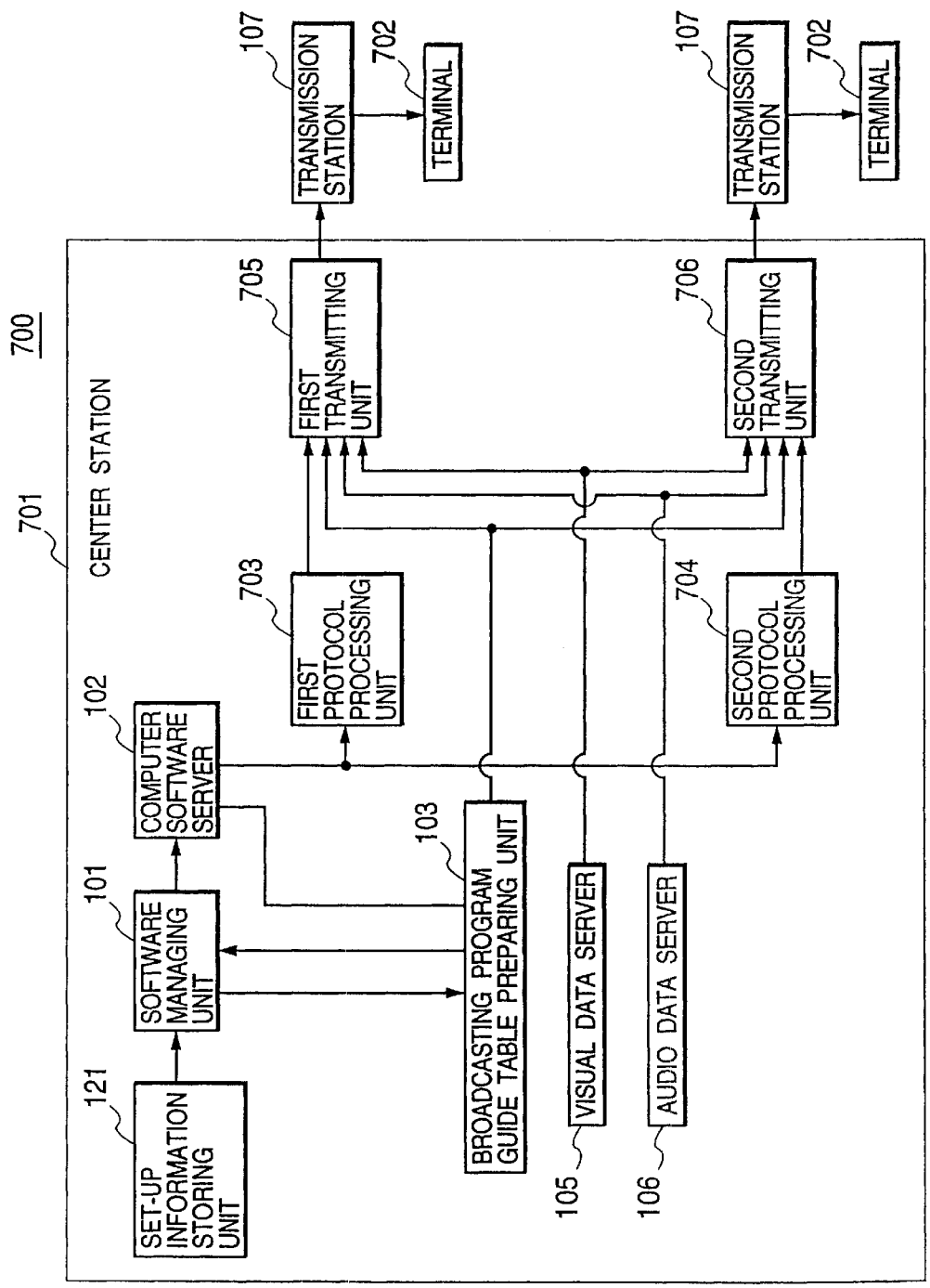
FIG. 69 is a block diagram of a software download system according to a seventh embodiment of the present invention.

FIG. 69 is a block diagram of a software download system according to a seventh embodiment of the present invention.

As shown in FIG. 69, a software download system 700 comprises:

a center station 701 for outputting audio/video data of each broadcasting program during its transmission time period, processing a computer software product representing a software product according to various software communication protocols to produce computer software products of various protocol-processed types for each computer software product, simultaneously outputting each protocol-processed type computer software product with the same broadcasting program at the same transmission channel as that of one broadcasting program, and outputting a broadcasting program guide table of the broadcasting programs with the computer software products;

a plurality of terminals 702 for respectively receiving the audio/video data of one broadcasting program and one protocol-processed computer software product transmitted with the broadcasting program from the center station 701 for each broadcasting program, respectively receiving the broadcasting program guide table from the center station 701, outputting the audio/video data and downloading updated computer software products selected from the computer software products, the terminals 702 being classified into a plurality of groups respectively corresponding to one software communication protocol, and each group of terminals 702 being identified by a terminal type; and a plurality of transmission stations 107, arranged in a communication satellite or a broadcasting satellite, for respectively transmitting the audio/video data of each broadcasting program, one protocol-processed type computer software product and the broadcasting program guide table from the center station 701 to one group of terminals 702.

The center station 701 comprises:

the computer software server 102; the set-up information storing unit 121; the software managing unit 101; the video data server 105; the audio data server 106; the broadcasting program guide table preparing unit 103;

a first protocol processing unit 703 for processing each computer software product stored in the computer software server 102 according to a software communication protocol A to produce a first type protocol-processed computer software product communicable with a terminal according to the software communication protocol A;

a second protocol processing unit 704 for processing each computer software product stored in the computer software server 102 according to a software communication protocol B to produce a second type protocol-processed computer software product communicable with a terminal according to the software communication protocol B;

a first transmitting unit 705 for transmitting the broadcasting program guide table prepared in the guide table preparing unit 103, the files of the first type protocol-processed computer software product produced in the first protocol processing unit 703 and the audio/video data of the broadcasting programs output from the video data server 105 and the audio data server 106 to a first group of terminals 702 through the transmission station 107; and a second transmitting unit 706 for transmitting the broadcasting program guide table prepared in the guide table preparing unit 103, the files of the second type protocol-processed computer software product produced in the second protocol processing unit 704 and the audio/video data of the broadcasting programs output from the video data server 105 and the audio data server 106 to a second group of terminals 702 through the transmission station 107.

In the above configuration, an operation of the software download system 700 is described.

Files of each computer software product stored in the computer software server 102 are processed in the first protocol processing unit 703 to files of a first type protocol-processed computer software product communicable according to the software communication protocol A. Also, files of each computer software product stored in the computer software server 102 are processed in the second protocol processing unit 704 to files of a second type protocol-processed computer software product communicable according to the software communication protocol B.

Figure 70:
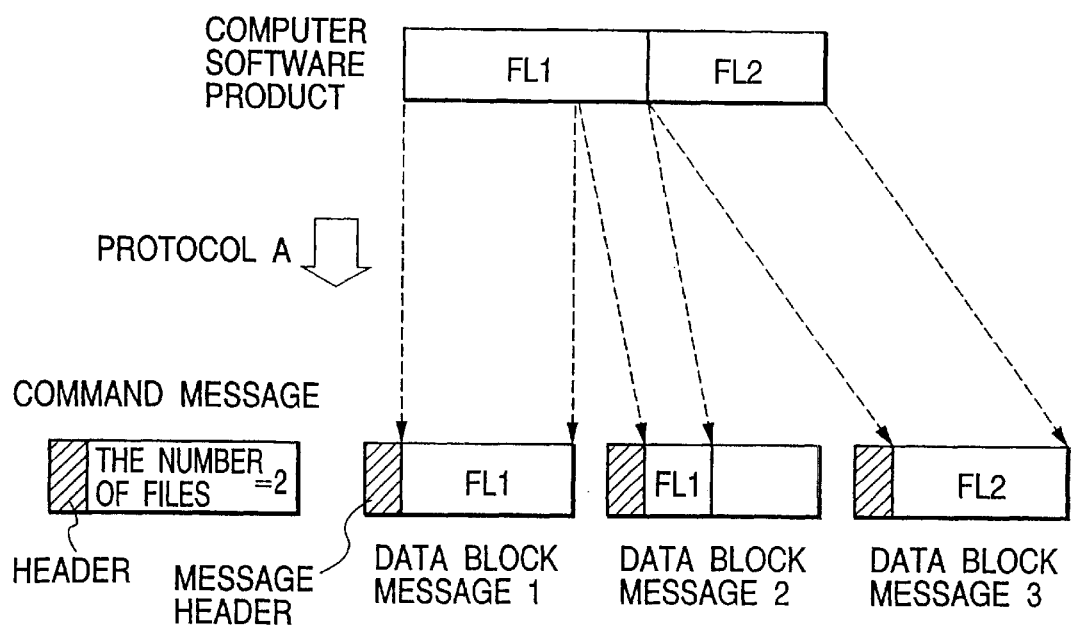
FIG. 70 shows the processing performed for files of a computer software product in a first protocol processing unit.

FIG. 70 shows the processing performed for files of each computer software product in the first protocol processing unit 703.

As shown in FIG. 70, a computer software product composed of a file F1 and a file F2 is divided into three pieces of file data arranged in three data blocks. The data blocks have the same data length determined according to the software communication protocol A. Also, a message header is inserted into each data block, so that a data block message composed of one message header and one file data is arranged in each data block. Also, a command message with a command header and computer software product information (size of each data block message, the number of files and the like) is prepared. Therefore, each first type protocol-processed computer software product is composed of one command message and one or more data block messages. In the same manner, each second type protocol-processed computer software product is composed of one command message and one or more data block messages arranged in one or more data blocks which have the same data length determined according to the software communication protocol B.

Thereafter, the first type protocol-processed computer software product is transmitted to the first transmitting unit 705, and the second type protocol-processed computer software product is transmitted to the first transmitting unit 706. Also, a broadcasting program guide table prepared in the guide table preparing unit 103 and the audio/video data stored in the video data server 105 and the audio data server 106 are transmitted to the transmitting units 705 and 706 in the same manner in the first embodiment.

Thereafter, the first type protocol-processed computer software product, the audio/video data and the broadcasting program guide table are transmitted to the terminal 702 corresponding to the software communication protocol A through the transmission station 107, and the second type protocol-processed computer software product, the audio/video data and the broadcasting program guide table are transmitted to the terminal 702 corresponding to the software communication protocol B through the transmission station 107.

In each terminal 702, the data block message information is extracted from the command message, and the file data is extracted from each data block according to the data block message information.

In this embodiment, two software communication protocol types are considered. However, the number of software communication protocol types is not limited to two. For example, in cases where a group of terminals corresponding to a software communication protocol C are used, a protocol processing unit, a transmitting unit and a transmission station corresponding to the software communication protocol C are arranged in the software download system 700.

Accordingly, even though the terminals 702 are classified into a plurality of groups respectively corresponding to one software communication protocol, because a plurality of protocol-processed computer software products corresponding to a plurality of software communication protocol types are prepared from each computer software product and are simultaneously transmitted to the terminals, one type protocol-processed computer software product can be reliably received in each terminal.

(Eighth Embodiment)

In this embodiment, a protocol-processed computer software product obtained by processing a computer software product according to one software communication protocol is downloaded from a center station to a terminal, the software communication protocol corresponding to the protocol-processed computer software product is detected, a protocol processing is performed for the protocol-processed computer software product according to the detected software communication protocol to obtain the computer software product, and the computer software product is stored.

Figure 71:
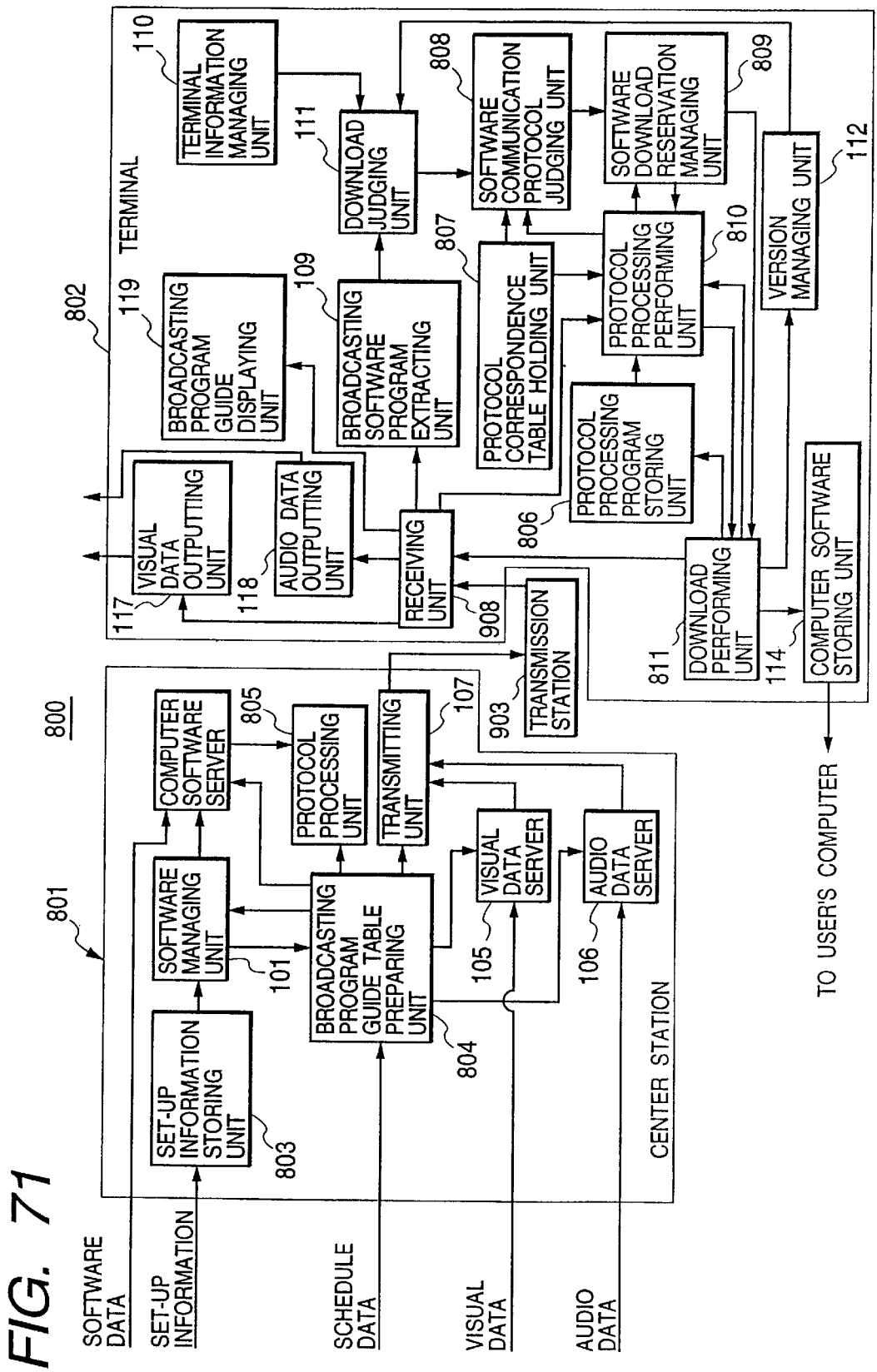
FIG. 71 is a block diagram of a software download system according to an eighth embodiment of the present invention.

FIG. 71 is a block diagram of a software download system according to an eighth embodiment of the present invention.

As shown in FIG. 71, a software download system 800 comprises:

a center station 801 for outputting audio/video data of each broadcasting program during its transmission time period, outputting each protocol-processed computer software product, which is obtained by processing one computer software product representing one software product according to one software communication protocol, with one broadcasting program, and outputting a broadcasting program guide table of the broadcasting programs with the computer software products;

a plurality of terminals 802 for respectively receiving the audio/video data of one broadcasting program and one protocol-processed computer software product transmitted with the broadcasting program from the center station 801 for each broadcasting program, respectively receiving the broadcasting program guide table from the center station 801, detecting a software communication protocol corresponding to one protocol-processed computer software product for each protocol-processed computer software product, performing a protocol processing for each protocol-processed computer software product according to the detected software communication protocol to obtain one computer software product, outputting the audio/video data and downloading updated computer software products selected from the computer software products, the terminals 802 being classified into a plurality of groups, and each group of terminals 802 being identified by a terminal type; and the transmission station 107.

The center station 801 comprises:

the computer software server 102;

a set-up information storing unit 803 for storing a table of pieces of set-up information in which a name of one computer software product, a version number identifying a version of the computer software product, a terminal type fit for the computer software product, names of one or more files composing the computer software product, version numbers identifying versions of the files and a name of a software communication protocol;

the software managing unit 101; the video data server 105; the audio data server 106;

a broadcasting program guide table preparing unit 804 for managing a broadcasting program schedule listed in a schedule table in which a date, a transmission channel, a transmission start time of one broadcasting program, a transmission finish time of the broadcasting program, a name of the broadcasting program, elements of the broadcasting program and a name of a computer software product transmitted with the broadcasting program are listed for each broadcasting program, preparing a broadcasting program guide table (refer to FIG. 72) from the pieces of set-up information of the computer software products managed in the software managing unit 803 and the broadcasting program schedule, and controlling the computer software server 102, the video data server 105 and the audio data server 106 to output the video data of the broadcasting programs listed in the broadcasting program guide table, the audio data of the broadcasting programs listed in the broadcasting program schedule and the files of the computer software products listed in the broadcasting program guide table;

a protocol processing unit 805 for processing each computer software product output from the computer software server 102 according to one software communication protocol, of which the name is listed in the broadcasting program guide table, to produce a protocol-processed computer software product communicable with a terminal according to the software communication protocol; and the transmitting unit 104 for transmitting the broadcasting program guide table prepared in the guide table preparing unit 103, the files of the protocol-processed computer software products output from the protocol processing unit 805 and the audio/video data of the broadcasting programs output from the video data server 105 and the audio data server 106 to the transmission station 107.

Each terminal 802 comprises:

the receiving unit 108; the video data outputting unit 117; the audio data outputting unit 118; the broadcasting program guide displaying unit 119; the terminal information managing unit 110;

the broadcasting software program extracting unit 109 for extracting guides of one or more broadcasting software programs with computer software products from the broadcasting program guide table received in the receiving unit 108, and preparing a broadcasting software program guide table (refer to FIG. 73) in which a date, a transmission channel, a transmission start time of one broadcasting software program, a transmission finish time of the broadcasting software program, a name of the broadcasting software program, a name of a computer software product corresponding to the broadcasting software program, names of one or more files composing the computer software product, version numbers of the files, a version number of the computer software product, a terminal type fit for the computer software product and a name of a software communication protocol are listed for each broadcasting software program;

the version managing unit 112; the download judging unit 111;

a protocol processing program storing unit 806 for storing a first protocol processing program for processing one protocol-processed computer software product communicable according to the software communication protocol A to extract files of one computer software product from the protocol-processed computer software product and storing a second protocol processing program for processing one protocol-processed computer software product communicable according to the software communication protocol B to extract files of one computer software product from the protocol-processed computer software product;

a protocol correspondence table holding unit 807 for holding a protocol correspondence table (refer to FIG. 74) in which the correspondence of one software communication protocol and one protocol processing program is listed for each protocol processing program stored in the protocol processing program storing unit 806;

a software communication protocol judging unit 808 for receiving the download broadcasting program table (refer to FIG. 75) prepared in the download judging unit 111, referring the protocol correspondence table held in the protocol correspondence table holding unit 807, checking whether or not one software communication protocol corresponding to each computer software product listed in the download table is listed in the protocol correspondence table, extracting the guide of the download broadcasting program with the computer software product from the download table in cases where the software communication protocol corresponding to the computer software product is listed in the protocol correspondence table, and registering the guide of the download broadcasting program extracted from the download table in a new download broadcasting program table (refer to FIG. 76);

a software download reservation managing unit 809 for managing the new download broadcasting program table transmitted from the software communication protocol judging unit 808 to reserve the downloading of one computer software product transmitted with one download broadcasting program during the transmission time period of the download broadcasting program for each download broadcasting program, outputting a name of a software communication protocol corresponding to one computer software product of one download broadcasting program written in the new download broadcasting program table during the transmission time period of the download broadcasting program for each download broadcasting program, and outputting information (a transmission channel, a name of one download broadcasting program, a name of the download computer software product corresponding to the download broadcasting program, names of one or more download files composing the download computer software product, version numbers of the download files, a version number of the download computer software product, a terminal type corresponding to the computer software product and a name of a software communication protocol corresponding to the computer software product) of the download broadcasting program;

a protocol processing performing unit 810 for receiving the name of the software communication protocol corresponding to the computer software product of the download broadcasting program from the software download reservation managing unit 809 for each download broadcasting program of the new download broadcasting program table, referring the protocol correspondence table held in the protocol correspondence table holding unit 807, specifying a particular protocol processing program corresponding to the software communication protocol in the protocol correspondence table as a processing program for changing the protocol-processed computer software product transmitted with the download broadcasting program to the computer software product of the download broadcasting program, outputting a protocol processing completion notice to the software download reservation managing unit 809, receiving the protocol-processed computer software product of the download broadcasting program from the receiving unit 108, extracting the particular protocol processing program from the protocol processing program storing unit 806, performing a protocol processing for the protocol-processed computer software product according to the particular protocol processing program to obtain files of the computer software product, and outputting the computer software product of the download broadcasting program;

a download performing unit 811 for receiving the information of the download broadcasting program from the software download reservation managing unit 809 during the transmission time period of the download broadcasting program, outputting a protocol-processed computer software product receiving instruction to the receiving unit 108 to transmit the protocol-processed computer software product of the download broadcasting program from the receiving unit 108 to the protocol processing performing unit 810 and to receive the computer software product from the protocol processing performing unit 810, and transmitting a name of the computer software product corresponding to each download broadcasting program, a version number of the computer software product, names of the files composing the computer software product and version numbers of the files to the version managing unit 112 to prepare a new version management table; and the computer software storing unit 114.

In the above configuration, an operation of the software download system 800 is described.

In a set-up information table stored in the set-up information storing unit 803, a name of a software communication protocol is added to each piece of set-up information as compared with that in the first embodiment. Therefore, in a broadcasting program guide table prepared in the guide table preparing unit 804, a name of a software communication protocol corresponding to one computer software product is added to one guide of one broadcasting program with the computer software product for each computer software product. In the example shown in FIG. 72, the software communication protocol A corresponding to the computer software product "CA" is added to the guide of the broadcasting program "morning download", and the software communication protocol C corresponding to the computer software product "OS" is added to the guide of the broadcasting program "download A".

Thereafter, the broadcasting program guide table is transmitted to each terminal 802 through the transmitting unit 104 and the transmission station 107. Also, when one computer software product of each broadcasting program is transmitted from the computer software server 102 to each terminal 802 with the audio/video data of the broadcasting program during its transmission time period, the computer software product is processed in the protocol processing unit 805 according to one software communication protocol, of which the name is listed in the broadcasting program guide table, and a protocol-processed computer software product communicable according to the software communication protocol is produced. Therefore, the protocol-processed computer software product is transmitted to each terminal 802 in place of the computer software product. In this example, the protocol-processed computer software product "CA" produced from the computer software product "CA" of the broadcasting program "morning download" is communicable according to the software communication protocol A, and the protocol-processed computer software product "OS" produced from the computer software product "OS" of the broadcasting program "download A" is communicable according to the software communication protocol C.

In the terminal 802, a broadcasting software program guide table, in which a name of a software communication protocol corresponding to one computer software product is added to one guide of one broadcasting software program with the computer software product for each computer software product, is prepared in the broadcasting software program extracting unit 109 in the same manner as in the first embodiment. In this example, a broadcasting software program guide table shown in FIG. 73 is prepared. Thereafter, a download broadcasting program table, in which a name of a software communication protocol corresponding to one computer software product is added to one guide of one download broadcasting program with the computer software product for each computer software product, is prepared in the download judging unit 111. In this example, a download broadcasting program table shown in FIG. 75 is prepared.

Thereafter, a process for extracting a guide of a download broadcasting program on condition that a protocol-processed computer software product transmitted with the download broadcasting program is communicable with the terminal 802 is performed in the software communication protocol judging unit 808. FIG. 77 is a flow chart showing the process performed in the software communication protocol judging unit 808.

As shown in FIG. 77, a protocol correspondence table held in the protocol correspondence table holding unit 807 is referred (step S7701). In the example shown in FIG. 74, the software communication protocols A nd B are listed. Thereafter, it is checked whether or not one software communication protocol corresponding to one computer software product of one download broadcasting program listed in the download broadcasting program table is listed in the protocol correspondence table (step S7702). In cases where the software communication protocol corresponding to the computer software product is listed in the protocol correspondence table, because a protocol-processed computer software product transmitted with the download broadcasting program is communicable with the terminal 802, the guide of the download broadcasting program with the computer software product is extracted from the download broadcasting program table, and the guide of the download broadcasting program is registered in a new download broadcasting program table (step S7703). The steps S7701 to S7703 are performed for all download broadcasting programs listed in the download broadcasting program table (step S7704). In this example, because the software communication protocol A corresponding to the computer software product "CA" of the broadcasting program "morning download" listed in the download broadcasting program table of FIG. 75 is listed in the protocol correspondence table of FIG. 74, the protocol-processed computer software product transmitted with the download broadcasting program "morning download" is communicable with the terminal 802 by processing the protocol-processed computer software product with the protocol processing program A. Therefore, the guide of the broadcasting program "morning download" is registered in a new download broadcasting program table of FIG. 76. In contrast, because the software communication protocol C corresponding to the computer software product "OS" of the broadcasting program "download All listed in the download broadcasting program table of FIG. 75 is not listed in the protocol correspondence table of FIG. 74, any protocol processing program for processing the protocol-processed computer software product transmitted with the download broadcasting program "download A" is not arranged in the terminal 802. Therefore, the guide of the broadcasting program "download A" is not registered in the new download broadcasting program table of FIG. 76.

Thereafter, the new download broadcasting program table is transmitted to the software download reservation managing unit 809. In the managing unit 809, the name of the software communication protocol corresponding to the computer software product of each download broadcasting program listed in the table is output to the protocol processing performing unit 810 during the transmission time period of the download broadcasting program. In the performing unit 810, each time the name of the software communication protocol corresponding to the computer software product of the download broadcasting program is received, a particular protocol processing program corresponding to the name of the software communication protocol is specified among from the processing programs of the protocol correspondence table held in the protocol correspondence table holding unit 807. In this example, the name of the software communication protocol A corresponding to the computer software product "CA" of the download broadcasting program "morning download" is output to the protocol processing performing unit 810 at the transmission start time 7:30, and the protocol processing program A corresponding to the software communication protocol A in the protocol correspondence table is specified.

Thereafter, a protocol processing completion notice is transmitted from the performing unit 810 to the software download reservation managing unit 809. In the managing unit 809, information of the download broadcasting program written in the new download broadcasting program table is transmitted to the download performing unit 811. In this example, information of the download broadcasting program "morning download" shown in FIG. 78 is transmitted to the download performing unit 811.

When the information of the download broadcasting program is received in the download performing unit 811, a protocol-processed computer software product receiving instruction is transmitted from the download performing unit 811 to the receiving unit 108, so that the protocol-processed computer software product transmitted with the download broadcasting program is transmitted from the receiving unit 108 to the protocol processing performing unit 810.

In the performing unit 810, the particular protocol processing program is extracted from the protocol processing program storing unit 806, and a protocol processing is performed for the protocol-processed computer software product according to the particular protocol processing program. Therefore, the files of the computer software product are obtained from the protocol-processed computer software product for each download broadcasting program. In this example, the protocol-processed computer software product transmitted with the download broadcasting program "morning download" is transmitted from the receiving unit 108 to the protocol processing performing unit 810, the protocol processing program A is extracted from the protocol processing program storing unit 806, and the files of the computer software product "CA" are obtained from the protocol-processed computer software product according to the protocol processing program A.

Thereafter, the files of the computer software product are transmitted to the download performing unit 113. Therefore, the computer software product can be downloaded from the center station 801 to the terminal 802. Thereafter, the files of the computer software product are stored in the computer software storing unit 114.

Accordingly, even though a protocol-processed computer software product communicable according to a software communication protocol is transmitted with one broadcasting program from the center station 801 to the terminal 802, in cases where a protocol processing program for extracting files of a computer software product from the protocol-processed computer software product is arranged in the terminal 802, the protocol-processed computer software product is changed to the computer software product by using the protocol processing program, and the computer software product is stored. Therefore, the computer software product of the broadcasting program can be downloaded from the center station 801 to the terminal 802.

Also, in cases where a protocol processing program for extracting files of a computer software product from the protocol-processed computer software product is not arranged in the terminal 802, the computer software product of the broadcasting program cannot be downloaded to the terminal 802. Therefore, even though a protocol-processed computer software product communicable according to a software communication protocol is transmitted with a broadcasting program from the center station 801 to a plurality of unspecified terminals 802, the computer software product of the broadcasting program can be downloaded from the center station 801 to a particular group of terminals 802 in which a protocol processing program for extracting files of the computer software product from the protocol-processed computer software product is arranged. Accordingly, the center station 801 is not required to specify a group of terminals, so that the center station 801 can be simplified.

Next, the downloading of a third protocol processing program treated as one computer software product from the center station 801 to the terminal 802 is described. One or more files of a computer software product is extracted from one protocol-processed computer software product communicable according to the software communication protocol C by using the third protocol processing program.

The third protocol processing program is stored in the computer software server 102. In the broadcasting program guide table preparing unit 804, a broadcasting program guide table shown in FIG. 79 is prepared. In this table, a name of the third protocol processing program is registered as a name of one computer software product in a guide of the broadcasting program "the download", a name "B" of a software communication protocol B corresponding to the third protocol processing program is registered in the guide, and a name "C" of the software communication protocol C relating to the function of the third protocol processing program is registered in the guide.

In the protocol processing unit 805, the third protocol processing program stored in the computer software server 102 is processed under the control of the guide table preparing unit 804 to produce a particular protocol-processed computer software product communicable with a terminal according to the software communication protocol B. Thereafter, the particular protocol-processed computer software product is transmitted to the terminal 802 with the broadcasting program "the download".

In the terminal 802, information of the broadcasting program "the download" shown in FIG. 80 is transmitted from the managing unit 809 to the download performing unit 811 at the transmission start time 9:00.

Figure 81:
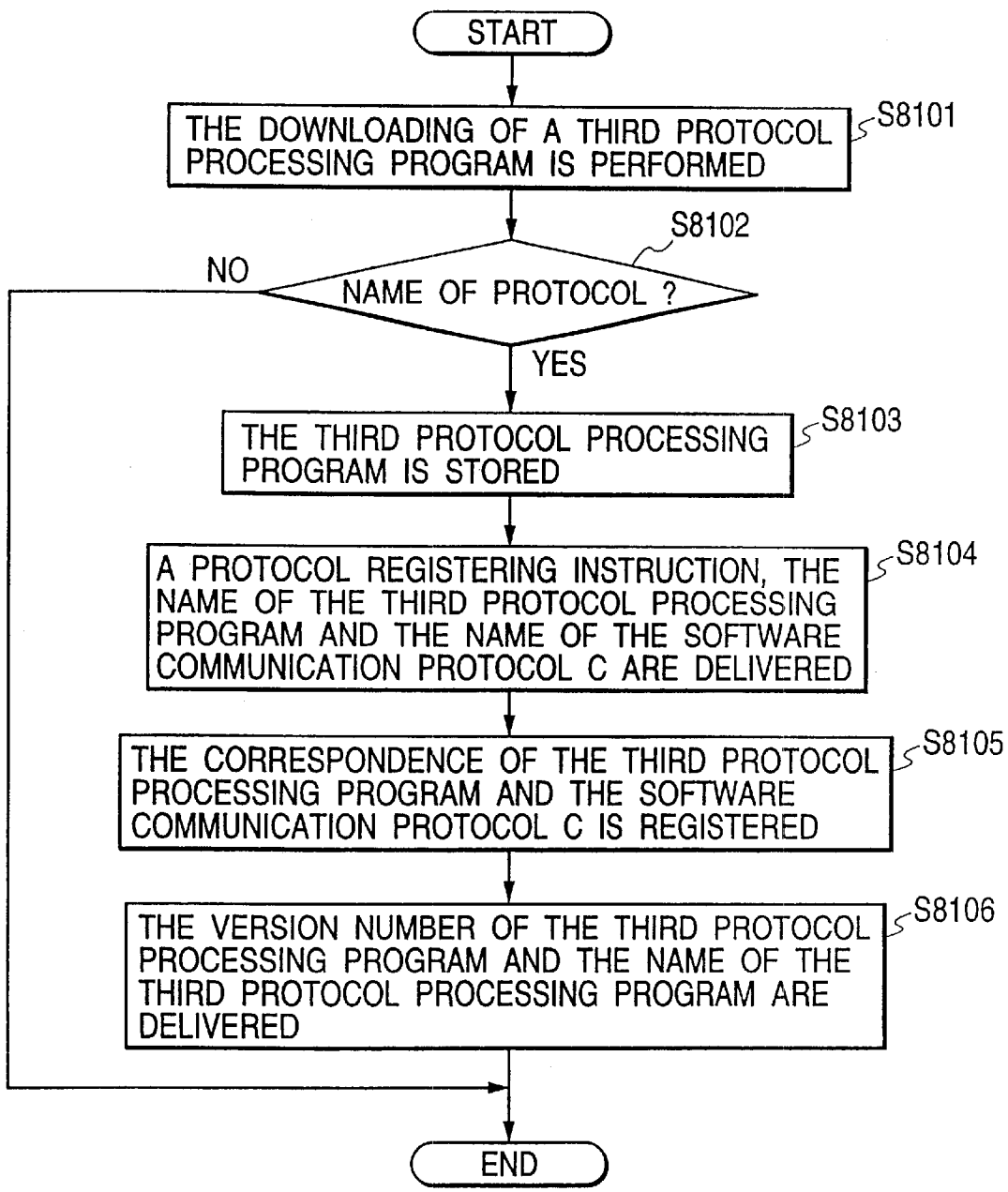
FIG. 81 is a flow chart showing a protocol processing program setting process according to the eighth embodiment.

In the download performing unit 811, because a name "C" of the software communication protocol C relating to the function of the third protocol processing program is registered in the guide of the broadcasting program "the download", it is recognized that one protocol processing program is transmitted with one broadcasting program. Therefore, a protocol processing program setting process is performed according to a flow chart shown in FIG. 81.

In a step S8101, the downloading of the third protocol processing program to the download performing unit 811 is performed, and it is checked whether or not a name of the software communication protocol relating to the function of the third protocol processing program is registered in the guide of the broadcasting program "the download" (step S8102). Because the name IC" of the software communication protocol C relating to the function of the third protocol processing program is registered in the guide, the third protocol processing program is stored in the protocol processing program storing unit 806 (step S8103), a protocol registering instruction is delivered to the protocol processing performing unit 810 with the name of the third protocol processing program and the name "C" of the software communication protocol C (step S8104), the correspondence of the third protocol processing program and the software communication protocol C is registered in the protocol correspondence table of the protocol correspondence table holding unit 807 under the control of the protocol processing performing unit 810 (step S8105), and the version number of the third protocol processing program and the name of the third protocol processing program are delivered to the version managing unit 112 (step S8106). Therefore, the protocol correspondence table shown in FIG. 82 is stored in the protocol correspondence table holding unit 807.

Accordingly, in cases where a user desires to receive a particular computer software product processed to a particular protocol-processed computer software product communicable with a terminal according to a particular software communication protocol, because a particular protocol processing program used for changing the particular protocol-processed computer software product to the particular computer software product can be downloaded from the center station 801 to the user's terminal 802, the user can receive the particular computer software product from the center station 801.

(Ninth Embodiment)

In this embodiment, a plurality of broadcasting programs of a plurality of transmission channels included in the same transport stream can be simultaneously received in each terminal. In a center station, the broadcasting of a particular broadcasting program with a particular computer software product is set to the same transmission time period as that of a specific broadcasting program expected to be watched by users at high probability, and the transmission channel of the particular broadcasting program and the transmission channel of the specific broadcasting program not accompanied by any computer software product differ from each other and are included in the same transport stream. Therefore, even though a user does not watch the particular broadcasting program with the particular computer software product, the particular computer software product transmitted with the particular broadcasting program is downloaded to user's terminal while the user watches the specific broadcasting program.

Figure 83:
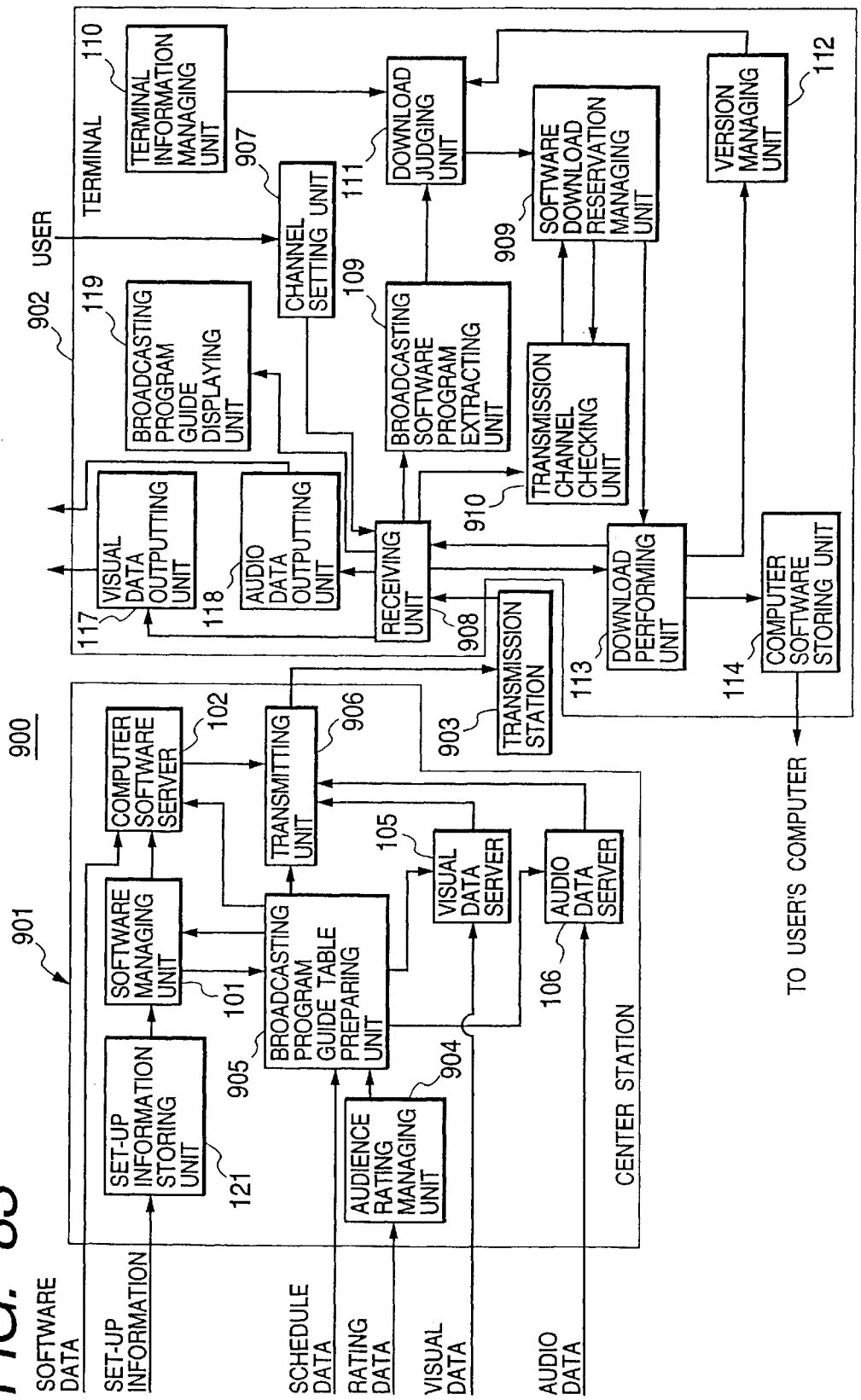
FIG. 83 is a block diagram of a software download system according to a ninth embodiment of the present invention.

FIG. 83 is a block diagram of a software download system according to a ninth embodiment of the present invention.

As shown in FIG. 83, a software download system 900 comprises:

a center station 901 for scheduling a particular broadcasting program with a computer software product (which represents a software product) to transmit the particular broadcasting program during the same transmission time period as that of a broadcasting program expected to be watched by users at high audience rating on condition that the transmission channel of the particular broadcasting program and the transmission channel of the broadcasting program differ from each other and are included in the same transport stream, outputting audio/video data of a plurality of broadcasting programs of one or more transmission channels included in one transport stream during those transmission time periods, one or more computer software products respectively transmitted at the same transmission channel as that of one broadcasting program for each transport stream, and outputting a broadcasting program guide table of the broadcasting programs with the computer software products;

a plurality of terminals 902 for respectively receiving the audio/video data of the broadcasting programs transmitted at one or more transmission channels of the same transport stream from the center station 901, respectively receiving one computer software product transmitted with one of the broadcasting programs from the center station 901 and respectively receiving the broadcasting program guide table from the center station 901, outputting the audio/video data, and downloading the computer software product, the terminals 902 being classified into a plurality of groups, and each group of terminals 902 being identified by a terminal type; and a transmission station 903, arranged in a broadcasting satellite or a communication satellite, for transmitting the audio/video data of the broadcasting programs and the computer software products of the transmission channels of the transport streams output from the center station 901 to the terminals 902, transmitting the broadcasting program guide table output from the center station 901 to the terminals 902.

The center station 901 comprises:

an audience rating managing unit 904 for managing a broadcasting program audience rating table (refer to FIG. 84) in which an audience rating of each broadcasting program is listed;

the computer software server 102; the set-up information storing unit 121; the software managing unit 101; the video data server 105; the audio data server 106;

a broadcasting program guide table preparing unit 905 for managing a broadcasting program schedule listed in a schedule table in which a date, a transmission channel, a transmission start time of one broadcasting program, a transmission finish time of the broadcasting program, a name of the broadcasting program, elements of the broadcasting program and a name of a computer software product transmitted with the broadcasting program are listed for each broadcasting program, initially preparing a broadcasting program guide table (refer to FIG. 85) from the pieces of set-up information of the computer software products managed in the software managing unit 101 and the broadcasting program schedule, searching the broadcasting program audience rating table stored in the audience rating managing unit 904 for a specific broadcasting program which is expected to be watched by users at high audience rating and is listed in the broadcasting program guide table, preparing a particular guide of a particular broadcasting program with a particular computer software product, in which the transmission time period is the same as that of the specific broadcasting program not accompanied by any computer software product, on condition that the transmission channel of the particular broadcasting program and the transmission channel of the specific broadcasting program differ from each other and are included in the same transport stream, adding the particular guide of the particular broadcasting program to the broadcasting program guide table to prepare a revised broadcasting program guide table (refer to FIG. 86), and controlling the computer software server 102, the video data server 105 and the audio data server 106 to output the audio/video data of one or more broadcasting programs and the files of one or more computer software products of one transport stream listed in the revised broadcasting program guide table during those transmission time periods for each transport stream; and a transmitting unit 906 for transmitting the revised broadcasting program guide table prepared in the guide table preparing unit 905 to each terminal 902 through the transmission station 903, transmitting the audio/video data of one or more broadcasting programs of one or more transmission channels of one transport stream output from the video data server 105 and the audio data server 106 to each terminal 902 through the transmission station 903 for each transport stream and transmitting the files of one or more computer software products of one transport stream output from the computer software server 102 to each terminal 902 through the transmission station 903 for each transport stream.

Each terminal 902 comprises:

a channel setting unit 907 for setting a transmission channel received in the terminal 902 to a desired transmission channel according to user's intention;

a receiving unit 908 for receiving the revised broadcasting program guide table from the transmitting unit 906, specifying a specific transport stream with the desired transmission channel set by the channel setting unit 907, receiving the audio/video data of one or more broadcasting programs and the files of one or more computer software products of one or more transmission channels included in the specific transport stream from the center station 901;

the video data outputting unit 117; the audio data outputting unit 118; the broadcasting program guide displaying unit 119; the terminal information managing unit 110; the version managing unit 112; the broadcasting software program extracting unit 109; the download judging unit 111;

a software download reservation managing unit 909 for managing a download broadcasting program table (refer to FIG. 87) transmitted from the download judging unit 111 to reserve the downloading of one computer software product transmitted with one broadcasting program during the transmission time period of the broadcasting program for each broadcasting program of the table, outputting a transport stream identifier listed in the guide of each download broadcasting program of the download table during its transmission time period, receiving a download-performable notice or a download-impossible notice in reply to the transport stream identifier, and outputting information (a transmission channel, a name of one download broadcasting program, a name of the download computer software product corresponding to the download broadcasting program, names of one or more download files composing the download computer software product, version numbers of the download files, a version number of the download computer software product, a name of a terminal type corresponding to the download broadcasting program and one or more packet identifiers) of the download broadcasting program written in the download broadcasting program table during the transmission time period of the download broadcasting program in cases where the download-performable notice is received;

a transmission channel checking unit 910 for receiving the transport stream identifier listed in the guide of one download broadcasting program from the software download reservation managing unit 909 for each download broadcasting program, receiving a specific transport stream identifier of the specific transport stream from the receiving unit 908, checking whether or not the transport stream identifier listed in the guide of the download broadcasting program agrees with the specific transport stream identifier, outputting one download-performable notice to the software download reservation managing unit 909 in cases where the transport stream identifier listed in the guide of the download broadcasting program agrees with the specific transport stream identifier, and outputting one download-impossible notice to the software download reservation managing unit 909 in cases where the transport stream identifier listed in the guide of the download broadcasting program differs from the specific transport stream identifier;

the download performing unit 113; and the computer software storing unit 114.

In the above configuration, an operation of the software download system 900 is described.

In the software download system 900, pieces of data included in a plurality of transport streams are transmitted from the center station 901 to each terminal 902, and audio-video data of one or more broadcasting programs and one or more computer software products included in one transport stream are received in each terminal 902.

Figure 88:
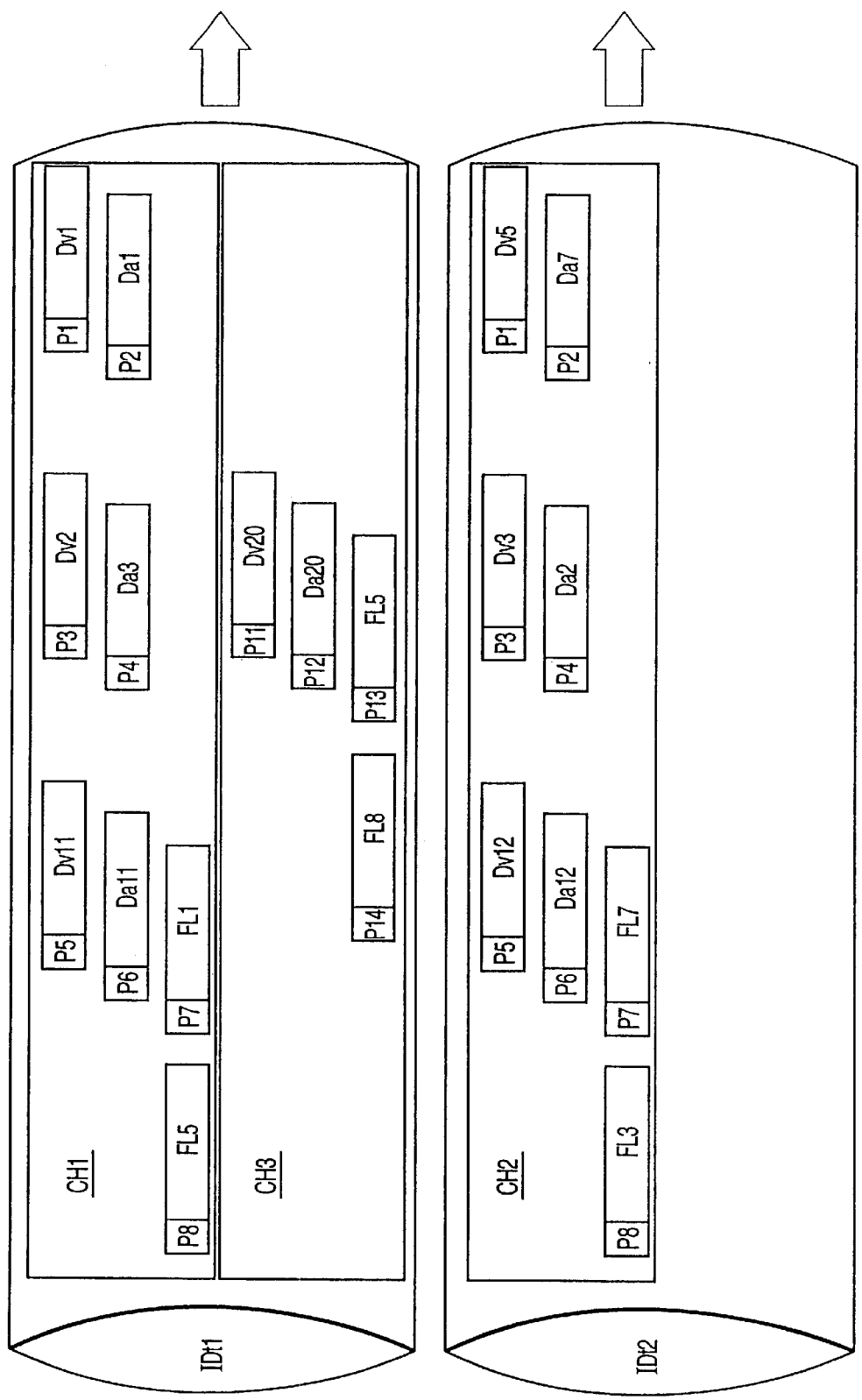
FIG. 88 shows data included in two transport streams transmitted from a transmitting unit according to the ninth embodiment.

FIG. 88 shows data included in two transport streams. As shown in FIG. 88, each transport stream is identified by a transport stream identifier, and data of one or more transmission channels are transmitted as one transport stream. In each transmission channel, audio data, video data and computer software product data are respectively arranged in a packet with a packet identifier. The packets have the same data length. Therefore, the audio data of each broadcasting program is arranged in one or more packets, the video data of each broadcasting program is arranged in one or more packets, and files of each computer software product are arranged in one or more packets as computer software product data. In this example, a first transport stream identified by a transport stream identifier IDt1 and a second transport stream identified by a transport stream identifier IDt2 are transmitted from the center station 901 to each terminal 902. Data of the transmission channels CH1 and CH3 are transmitted as the first transport stream, audio data, video data and computer software product data of the transmission channel CH1 are arranged in six packets identified by packet identifiers P1 to P7, computer software product data are arranged in two packets identified by packet identifiers P11 to P12.

In the broadcasting program guide table preparing unit 905, a broadcasting program guide table is initially prepared from the pieces of set-up information of the computer software products managed in the software managing unit 101 and the broadcasting program schedule. In the broadcasting program guide table, a transport stream identifier and a packet identifier are added to each guide. Thereafter, to transmit a particular computer software product during the same transmission time period as that of a specific broadcasting program expected to be watched by users at high probability and to download the particular computer software product to one terminal 902 when a user of the terminal 902 watches the specific broadcasting program, the broadcasting program audience rating table stored in the audience rating managing unit 904 is searches for a specific broadcasting program expected to be watched by users at high audience rating and is listed in the broadcasting program guide table. In this example, as shown in FIG. 84, because the broadcasting program "ping-pong kids" gets the highest audience rating according to the past broadcasting results, the broadcasting program "ping-pong kids" is set as a specific broadcasting program. Thereafter, a particular guide of a particular broadcasting program with a particular computer software product is prepared. In this particular guide, the transmission start time and transmission finish time of the particular broadcasting program are set to those of the specific broadcasting program not accompanied by any computer software product, and a transmission channel of the particular broadcasting program is set to differ from that of the specific broadcasting program on condition that the transmission channel of the particular broadcasting program and the transmission channel of the specific broadcasting program are included in the same transport stream. Thereafter, the particular guide of the particular broadcasting program is added to the broadcasting program guide table to prepare a revised broadcasting program guide table. In this example, as shown in FIG. 86, a particular guide of a particular broadcasting program "the download" with a particular computer software product "system" is prepared, the transmission start time 7:00 and transmission finish time 7:30 of the particular broadcasting program "the download" are the same as those of the specific broadcasting program "ping-pong kids", and the transmission channel CH3 of the particular broadcasting program "the download" and the transmission channel CH1 of the specific broadcasting program "ping-pong kids" are included in the same transport stream IDt1.

Thereafter, the audio/video data of one or more broadcasting programs and the files of one or more computer software products of one transport stream listed in the revised broadcasting program guide table are transmitted from the servers 102, 105 and 106 during those transmission time periods to each terminal 902 through the transmitting unit 906 under the control of the broadcasting program guide table preparing unit 905 for each transport stream. Also, the revised broadcasting program guide table prepared in the guide table preparing unit 905 is transmitted to each terminal 902 through the transmitting unit 906.

In the terminal 902, when the revised broadcasting program guide table is received in the receiving unit 904 and is displayed by the broadcasting program guide displaying unit 119, the user selects a desired transmission channel of a desired broadcasting program, so that the desired transmission channel is set by the channel setting unit 907. The desired transmission channel is transmitted to the receiving unit 908.

Figure 89:
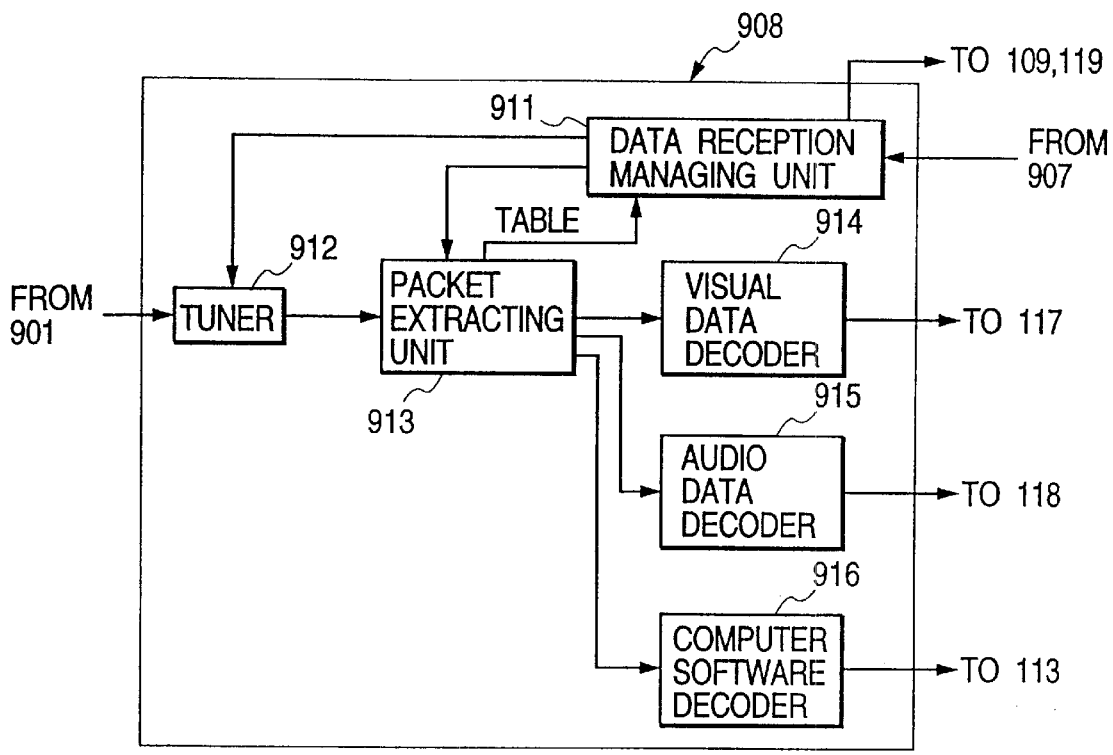
FIG. 89 is a block diagram of a receiving unit according to the ninth embodiment.

FIG. 89 is a block diagram of the receiving unit 908.

As shown in FIG. 89, the receiving unit 908 comprises:

a data reception managing unit 911 for receiving the revised broadcasting program guide table from the center station 901, outputting the revised broadcasting program guide table to the broadcasting program guide displaying unit 119 and the broadcasting software program extracting unit 109, receiving the desired transmission channel from the channel setting unit 907, specifying a specific transport stream with the desired transmission channel according to the revised broadcasting program guide table, and specifying all packet identifiers of all packets of all broadcasting programs included in the specific transport stream according to the revised broadcasting program guide table;

a tuner 912 for selecting the specific transport stream specified by the data reception managing unit 911 from among a plurality of transport streams transmitted from the center station 901;

a packet extracting unit 913 for extracting the packet having each packet identifier specified by the data reception managing unit 911 during its transmission time period from the specific transport stream and transmitting the revised broadcasting program guide table to the data reception managing unit 911;

a video data decoder 914 for detecting video data from the packets extracted by the packet extracting unit 913 and outputting the video data to the video data outputting unit 117;

an audio data decoder 915 for detecting audio data from the packets extracted by the packet extracting unit 913 and outputting the audio data to the audio data outputting unit 118; and a computer software decoder 916 for detecting computer software product data from the packets extracted by the packet extracting unit 913 and outputting the computer software product data to the download performing unit 113.

In the above configuration of the receiving unit 908, a specific transport stream with the desired transmission channel and all packet identifiers of all packets of the specific transport stream are specified in the managing unit 911. Therefore, the specific transport stream is selected from among a plurality of transport streams transmitted from the center station 901 in the tuner 913, and the packets are extracted from the specific transport stream in the packet extracting unit 913. Thereafter, the video data of one or more broadcasting programs included in the specific transport stream are detected from the packets in the video data decoder 914, the audio data of the broadcasting programs included in the specific transport stream are detected from the packets in the audio data decoder 915, and the files of one or more computer software products included in the specific transport stream are detected from the packets in the computer software decoder 916. In this example, because the user desires to watch the broadcasting program "ping-pong kids", the user selects the transmission channel CH1, so that the transport stream IDt1 is selected. Therefore, as shown in FIG. 86, not only the broadcasting programs "morning news", "ping-pong kids" and "morning download" of the transmission channel CH1 but also the broadcasting program "the download" of the transmission channel CH3 are transmitted from the center station 901 to the terminal 902 during those transmission time periods. In particular, the audio/video data of the broadcasting program "ping-pong kids" and the computer software product "system" transmitted with the broadcasting program "the download" are received in the receiving unit 908 at the transmission start time 7:00.

Thereafter, a download broadcasting program table prepared in the download judging unit 111 is transmitted to the software download reservation managing unit 909 in the same manner as in the first embodiment. In this example, a download broadcasting program table shown in FIG. 87 is received in the managing unit 909.

In the managing unit 909, a transport stream identifier listed in the guide of one download broadcasting program of the download table is output to the transmission channel checking unit 910. Therefore, a transmission channel checking process shown in FIG. 90 is performed in the transmission channel checking unit 910.

Figure 90:
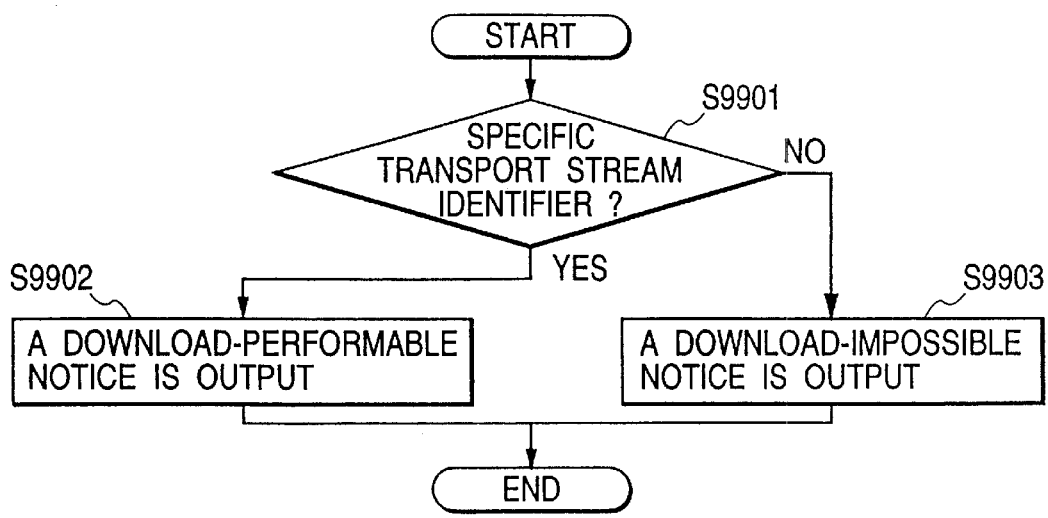
FIG. 90 is a flow chart showing a transmission channel checking process performed in a transmission channel checking unit according to the ninth embodiment.

As shown in FIG. 90, it is checked whether or not the transport stream identifier listed in the guide of the download broadcasting program agrees with a specific transport stream identifier of the specific transport stream received from the receiving unit 908 (step S9001). In cases where the transport stream identifier listed in the guide of the download broadcasting program agrees with the specific transport stream identifier, because the computer software product registered in the guide of the download broadcasting program is transmitted to the receiving unit 908 during its transmission time period, the downloading of the computer software product to the terminal.902 can be performed. Therefore, a download-performable notice is output to the software download reservation managing unit 909 (step S9002). In contrast, in cases where the transport stream identifier listed in the guide of the download broadcasting program differs from the specific transport stream identifier, because a transport stream with the download broadcasting program is not selected in the receiving unit 908, the computer software product transmitted with the download broadcasting program is not received in the receiving unit 908. Therefore, a download-impossible notice is output to the software download reservation managing unit 909 (step S9003).

Thereafter, in cases where the download-performable notice is received in the managing unit 909, information of the download broadcasting program and a download instruction are transmitted from the managing unit 909 to the download performing unit 113, and the computer software product transmitted with the download broadcasting program is downloaded from the center station 901 to the download performing unit 113 through the receiving unit 908 and is stored in the computer software storing unit 114 in the same manner as in the first embodiment. In this example, information of the download broadcasting program shown in FIG. 91 is transmitted to the download performing unit 113, and the computer software product "system" transmitted with the broadcasting program "the download" is downloaded to the terminal 902.

In contrast, in cases where the download-impossible notice is received in the managing unit 909, any information or instruction is not transmitted to the download performing unit 113, so that any downloading operation is not performed in the download performing unit 113.

Accordingly, because the broadcasting of a particular broadcasting program with a particular computer software product is set to the same transmission time period as that of a specific broadcasting program not accompanied by any computer software product in the center station 901 on condition that the transmission channel of the particular broadcasting program and the transmission channel of the specific broadcasting program differ from each other and are included in the same transport stream to simultaneously receive the particular broadcasting program and the specific broadcasting program in the terminal 902, even though a user does not watch the particular broadcasting program but watch the specific broadcasting program, the particular computer software product transmitted with the particular broadcasting program can be downloaded to the terminal 902.

Also, because a broadcasting program expected to be watched by users at high audience rating is set as the specific broadcasting program, the specific broadcasting program is expected to be watched by users at high probability, so that the particular computer software product transmitted with the particular broadcasting program can be downloaded to the terminal 902 at high probability.

(Tenth Embodiment)

In this embodiment, when a particular computer software product is updated in a center station, not only a guide of a first particular broadcasting program with an updated particular computer software product (version No.=Nv1) but also a guide of the particular broadcasting program with a former-version particular computer software product (version No.=Nv1−1) are listed in a broadcasting program guide table, and the broadcasting program guide table, files of the updated computer software product and files of the former-version computer software product are transmitted from the center station to each terminal even though the former-version computer has been already downloaded to a terminal of a user. In cases where the user is not satisfied with a computer operation performed according to the updated computer software product after the updated computer software product is downloaded to user's terminal, the user again download the former-version computer software product from the center station to user's terminal. Therefore, the user can be satisfied with a computer operation performed according to the former-version computer software product.

Figure 92:
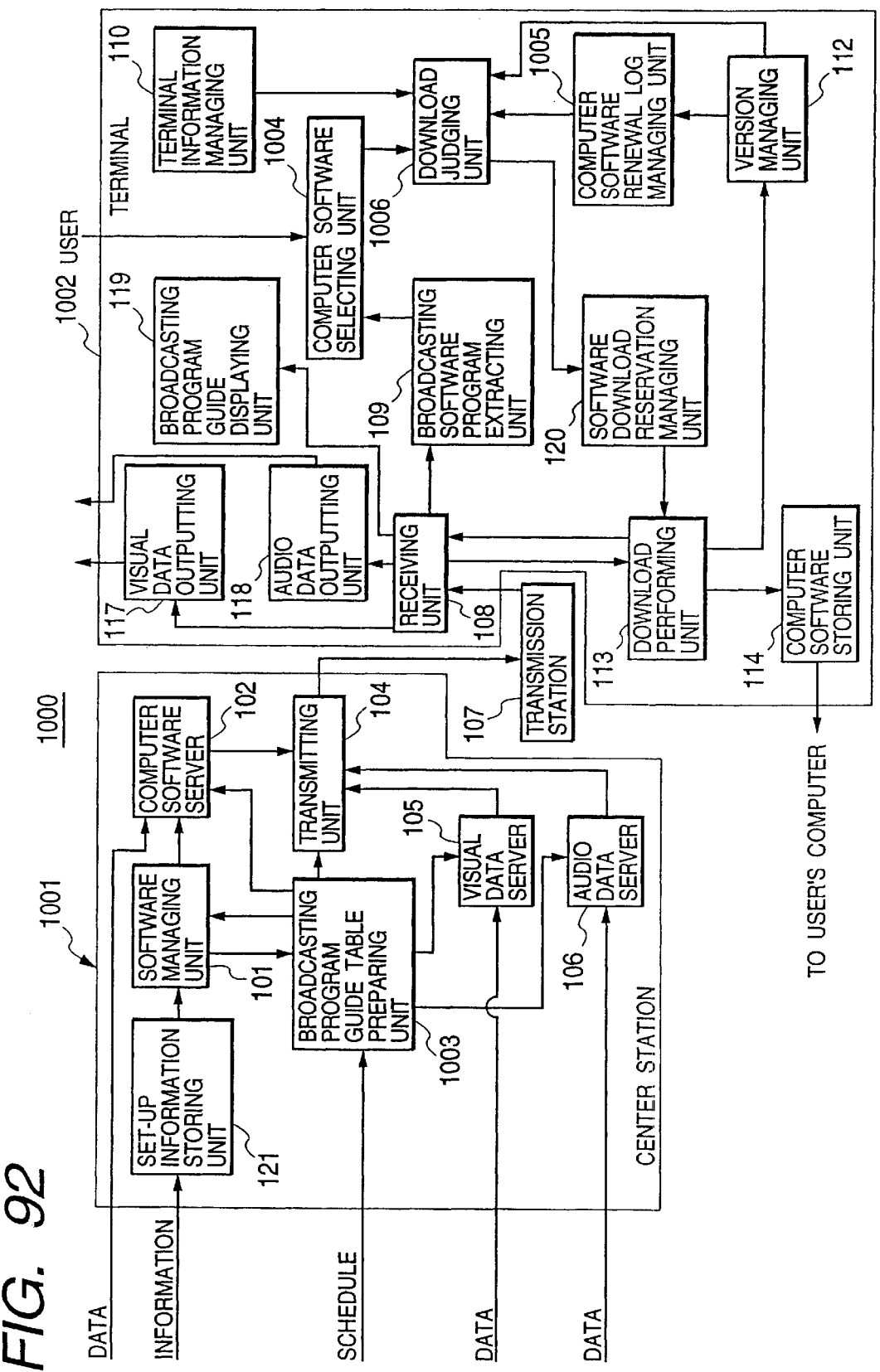
FIG. 92 is a block diagram of a software download system according to a tenth embodiment of the present invention.

FIG. 92 is a block diagram of a software download system according to a tenth embodiment of the present invention.

As shown in FIG. 92, a software download system 1000 comprises:

a center station 1001 for outputting audio/video data of each broadcasting program during its transmission time period, one or more computer software products (which represent one or more software products) respectively transmitted at the same transmission channel as that of one broadcasting program, and outputting a broadcasting program guide table in which a guide of a first particular broadcasting program with an updated particular computer software product (version No.=Nv1) and a guide of a second particular broadcasting program with a former-version particular computer software product (version No.=Nv1−1) are listed with other guides of broadcasting programs;

a plurality of terminals 1002 for respectively receiving the audio/video data of the broadcasting programs, the broadcasting program guide table and the computer software products from the center station 115, outputting the audio/video data, and downloading the former-version computer software product, the terminals 1002 being classified into a plurality of groups, and each group of terminals 1002 being identified by a terminal type; and the transmission station 107.

The center station 1001 comprises:

the computer software server 102; the set-up information storing unit 121; the software managing unit 101; the video data server 105; the audio data server 106;

a broadcasting program guide table preparing unit 1003 for managing a broadcasting program schedule listed in a schedule table, preparing a broadcasting program guide table (refer to FIG. 93), in which a guide of a first particular broadcasting program with an updated particular computer software product (version No.=Nv1) and a guide of a second particular broadcasting program with a former-version particular computer software product (version No.=Nv1−1) are listed with other guides of broadcasting programs, from the pieces of set-up information of the computer software products managed in the software managing unit 101 and the broadcasting program schedule, and controlling the computer software server 102, the video data server 105 and the audio data server 106 to output the audio/video data of one broadcasting program listed in the broadcasting program guide table during its transmission time period for each broadcasting program and to output the files of the computer software product listed in the broadcasting program guide table with one broadcasting program during its transmission time period for each computer software product; and the transmitting unit 104.

Each terminal 1002 comprises:

the receiving unit 108; the video data outputting unit 117; the audio data outputting unit 118; the broadcasting program guide displaying unit 119; the terminal information managing unit 110; the broadcasting software program extracting unit 109, the version managing unit 112;

a computer software selecting unit 1004 for displaying an image (refer to FIG. 94) of a plurality of computer software names corresponding to the broadcasting software programs listed in the guide table prepared in the broadcasting software program extracting unit 109, and receiving a name of the particular computer software product and a former-version selecting instruction input by a user;

a computer software renewal log managing unit 1005 for managing a computer software renewal log table (refer to FIG. 95) in which a version renewal log of all computer software products managed in the version managing unit 112 is listed;

a download judging unit 1006 for receiving the terminal management table from the terminal information managing unit 110, receiving the version management table (refer to FIG. 96) from the version managing unit 112, receiving the particular computer software name, the former-version selecting instruction and the broadcasting software program guide table (refer to FIG. 97) from the computer software selecting unit 1004, receiving the computer software renewal log table from the computer software renewal log managing unit 1005, extracting the guide of the second particular computer software product with the former-version particular computer software product from the broadcasting software program guide table in response to the former-version selecting instruction according to the terminal management table, the version management table and the computer software renewal log table, and preparing a download broadcasting program table (refer to FIG. 98) of the guide of the second particular computer software product with the former-version particular computer software product;

the software download reservation managing unit 120; the download performing unit 113; and the computer software storing unit 114.

In the above configuration, an operation of the software download system 1000 is described.

In the center station 1001, a particular computer software product is updated, so that a former-version particular computer software product is renewed to an updated particular computer software product. In this case, a broadcasting program guide table is prepared in the broadcasting program guide table preparing unit 1003 to include a guide of a first particular broadcasting program with an updated particular computer software product (version No.=Nv1) and a guide of a second particular broadcasting program with a former-version particular computer software product (version No.= Nv1−1). In this example, as shown in FIG. 93, the guide of the broadcasting program "morning download" with an updated computer software product "CA" of the version number "7" and the guide of the broadcasting program "daytime download" with an former-version computer software product "CA" of the version number "6" are listed in a broadcasting program guide table.

Thereafter, the broadcasting program guide table is transmitted from the center station 1001 to each terminal 1002. Also, audio/video data of the first particular broadcasting program is transmitted with updated files of the updated particular computer software product to each terminal 1002 during its transmission time period. In this example, the broadcasting program "morning download" is transmitted with the updated computer software product "CA" at the transmission start time 7:30.

Figures 94, 95, 96:
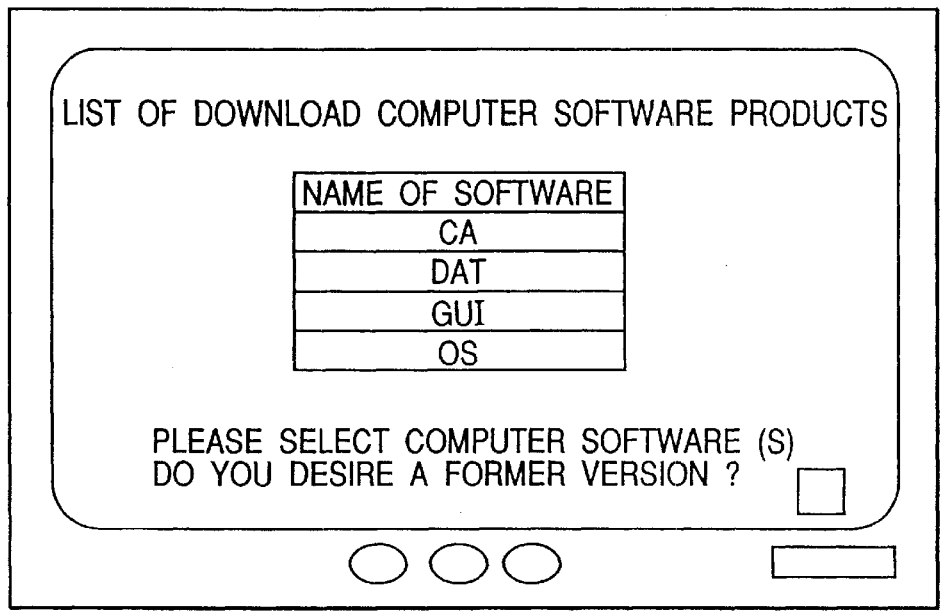
FIG. 94 shows an image of a plurality of computer software names displayed in a computer software selecting unit according to the tenth embodiment.
FIG. 95 shows a computer software renewal log table initially managed in a computer software renewal log managing unit according to the tenth embodiment.
FIG. 96 shows a version management table managed by a version managing unit according to the tenth embodiment.

In the terminal 1004, because the particular computer software product "CA" is updated in the center station 1001, the updated computer software product "CA" is stored in the computer software storing unit 114 during its transmission time period, and the version number of the updated particular computer software product and version numbers of the updated files of the updated particular computer software product are recorded in a version management table managed by the version managing unit 112 in the same manner as in the fifth embodiment. Also, a version renewal log of the updated particular computer software product is listed in a computer software renewal log table managed in the computer software renewal log managing unit 1005. In this example, as shown in FIG. 96, the version number "7" of the computer software product "CA" transmitted with the broadcasting program "morning download", the version number "3" of the file F11 and the version number "4" of the file F15 are recorded in a version management table. Also, as shown in FIG. 95, the version number "7" of the computer software product "CA" is recorded as a renewed version with a renewal date "June 25 in 1997", in a computer software renewal log table, and the version number "6" of the computer software product "CA" already written in the computer software renewal log table" is recorded as a former version.

Thereafter, a plurality of computer software names corresponding to the broadcasting software programs of the broadcasting software program guide table prepared in the extracting unit 109 are displayed on a screen under the control of the computer software selecting unit 1004 in the same manner as in the fifth embodiment. Also, a former-version selecting request is displayed. In this example, as shown in FIG. 94, names "CA", "DAT", "GUI" and "OS" of the computer software products are displayed.

In cases where the user is not satisfied with the updated particular computer software product when the user executes the updated particular computer software product to perform a user's computer operation, the user desires to again obtain the former-version particular computer software product. Therefore, the user selects the name of the particular computer software product and inputs a former-version selecting instruction. In this example, because the user is not satisfied with the updated particular computer software product "CA", the user selects the computer software product "CA" and inputs the selection of the former-version as a former-version selecting instruction.

Figure 99:
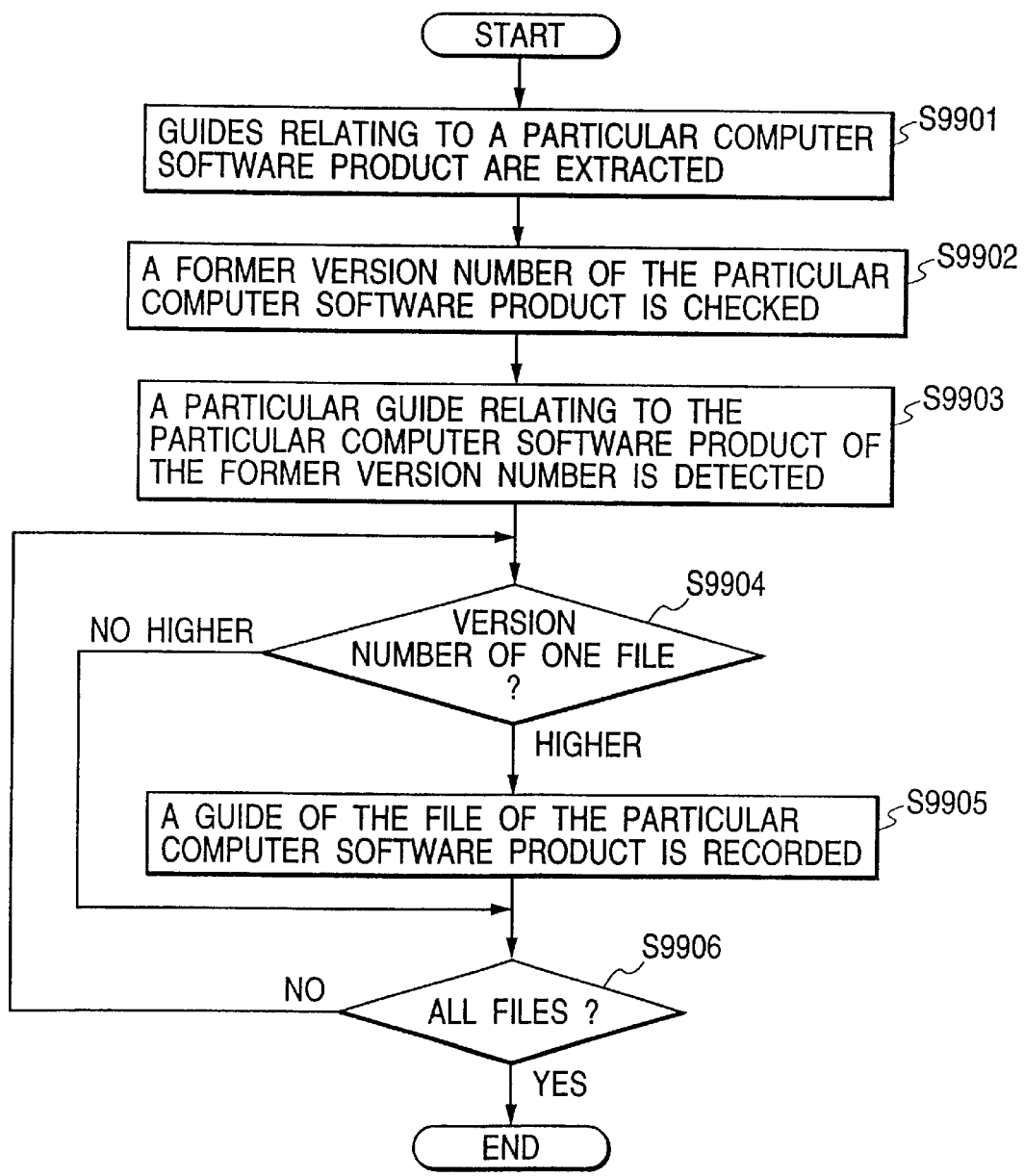
FIG. 99 is a flow chart showing a download broadcasting program table preparing process performed in the download judging unit according to the tenth embodiment.

The name of the particular computer software product and the former-version selecting instruction are transmitted to the download judging unit 1006. In the judging unit 1006, the terminal management table is received from the terminal information managing unit 110, the version management table is received from the version managing unit 112, the broadcasting software program guide table is received from the computer software selecting unit 1004 with the particular computer software name and the former-version selecting instruction, and the computer software renewal log table is received from the computer software renewal log managing unit 1005. Thereafter, in a download broadcasting program table preparing process, the guide of the second particular computer software product with the former-version particular computer software product is extracted from the broadcasting software program guide table in response to the former-version selecting instruction according to the terminal management table, the version management table and the computer software renewal log table, and a download broadcasting program table of the guide of the second particular computer software product with the former-version particular computer software product is prepared. The download broadcasting program table preparing process is described in detail with reference to FIG. 99.

In a step S9901, one or more guides relating to the particular computer software product selected by the user are extracted from the broadcasting software program guide table. In this example, a guide of the broadcasting program "morning download" with the computer software product "CA" and a guide of the broadcasting program "daytime download" with the computer software product "CA" are extracted from the broadcasting software program guide table shown in FIG. 93. Thereafter, a former version number of the particular computer software product recorded in the computer software renewal log table as the former version is checked (step S9902). In this example, a former version number of the computer software product "CA" recorded as the former version is "6". Thereafter, it is checked whether or not the version number of the particular computer software product in each guide extracted from the broadcasting software program guide table agrees with the former version number of the particular computer software product, and a particular guide relating to the particular computer software product, of which the version number agrees with the former version number of the particular computer software product, is detected from the broadcasting software program guide table (step S9903). In this example, the guide of the broadcasting program "daytime download" with the computer software product "CA" of the version number "6" is detected. Thereafter, it is checked whether or not the version number of one file of the particular computer software product registered in the version management table is higher than the version number of the same file of the particular computer software product relating to the particular guide detected from the broadcasting software program guide table (step S9904). In cases where the version number of one file of the particular computer software product registered in the version management table is higher than the version number of the same file of the particular computer software product detected from the broadcasting software program guide table, a guide of the file of the particular computer software product detected from the broadcasting software program guide table is recorded in a download broadcasting program table (step S9905). The steps S9904 and S9905 are performed for all files of the particular computer software product (step S9906), so that the download broadcasting program table is prepared. In this example, because the version number "3" of the file F11 of the computer software product "CA" in the version management table is higher than the version number "2" of the file F11 of the computer software product "CA" in the broadcasting software program guide table, a guide of the file F11 of the computer software product "CA" is recorded. However, because the version number "4" of the file F15 of the computer software product "CA" in the version management table is not higher than the version number "4" of the file F15 of the computer software product "CA" in the broadcasting software program guide table, a guide of the file F15 of the computer software product "CA" is not recorded. Therefore, a download broadcasting program table shown in FIG. 98 is prepared.

Thereafter, the download broadcasting program table is transmitted to the software download reservation managing unit 120. In the managing unit 120, information (a transmission channel, the name of the particular broadcasting program, the name of the particular computer software product, names of one or more files of the particular computer software product, the version numbers of the files, the version number of the particular computer software product, and a name of a terminal type corresponding to the particular broadcasting program) written in the download broadcasting program table is output to the download performing unit 113 with a download instruction during the transmission time period of the particular broadcasting program.

In the download performing unit 113, a channel setting instruction is output to the receiving unit 108 to receive a broadcasting program transmitted through the same transmission channel as that written in the information of the download broadcasting program table. Therefore, audio/video data of the second particular broadcasting program with the former-version particular computer software product is received in the receiving unit 108 during its transmission time period, and one or more files of the particular computer software product written in the information of the download broadcasting program table are downloaded to the download performing unit 113. In this example, as shown in FIG. 93, the broadcasting program "daytime download" is transmitted with the computer software product "CA" of the version number "6" at the transmission start time 12:30.

Thereafter, the files of the former-version particular computer software product downloaded from the center station 1001 are stored in the computer software storing unit 114 in the same manner as in the first and fifth embodiments. Also, the name of the former-version particular computer software product, the names of the files stored in the storing unit 114, the version number of the former-version particular computer software product and the version numbers of the files are recorded in the version management table of the version managing unit 112. Thereafter, the name of the former-version particular computer software product and the version number of the former-version particular computer software product are transmitted from the managing unit 112 to the computer software renewal log managing unit 1005, and the name and version number of the former-version particular computer software product are recorded as a version renewal log in the computer software renewal log table. In this example, as shown in FIG. 100, the version number "6" of the particular computer software product "CA" is set as a renewed version, and the version number "7" of the particular computer software product "CA" is set as a former version.

Accordingly, even though the user is not satisfied with an updated computer software product obtained by renewing a former-version computer software product, because the former-version computer software product is transmitted with one broadcasting program, the user can download the former-version computer software product to replace the updated computer software product with the former-version computer software product. Therefore, the user can again execute the former-version computer software product in user's computer to perform a computer operation.

(Eleventh Embodiment)

In the first to tenth embodiments, each computer software product is transmitted with one broadcasting program. However, the present invention is not limited to the downloading of the computer software product transmitted with one broadcasting program. In this embodiment, a specific time period, in which any broadcasting program is not transmitted from a center station to a terminal, exists even though a plurality of broadcasting programs are transmitted from the center station to the terminal, a computer software product is downloaded from the center station to the terminal during the specific time period. In this case, the transmission of the computer software product is performed by using the same frequency band (or the same transmission channel) as that for the data transmission of one broadcasting program.

Figure 101:
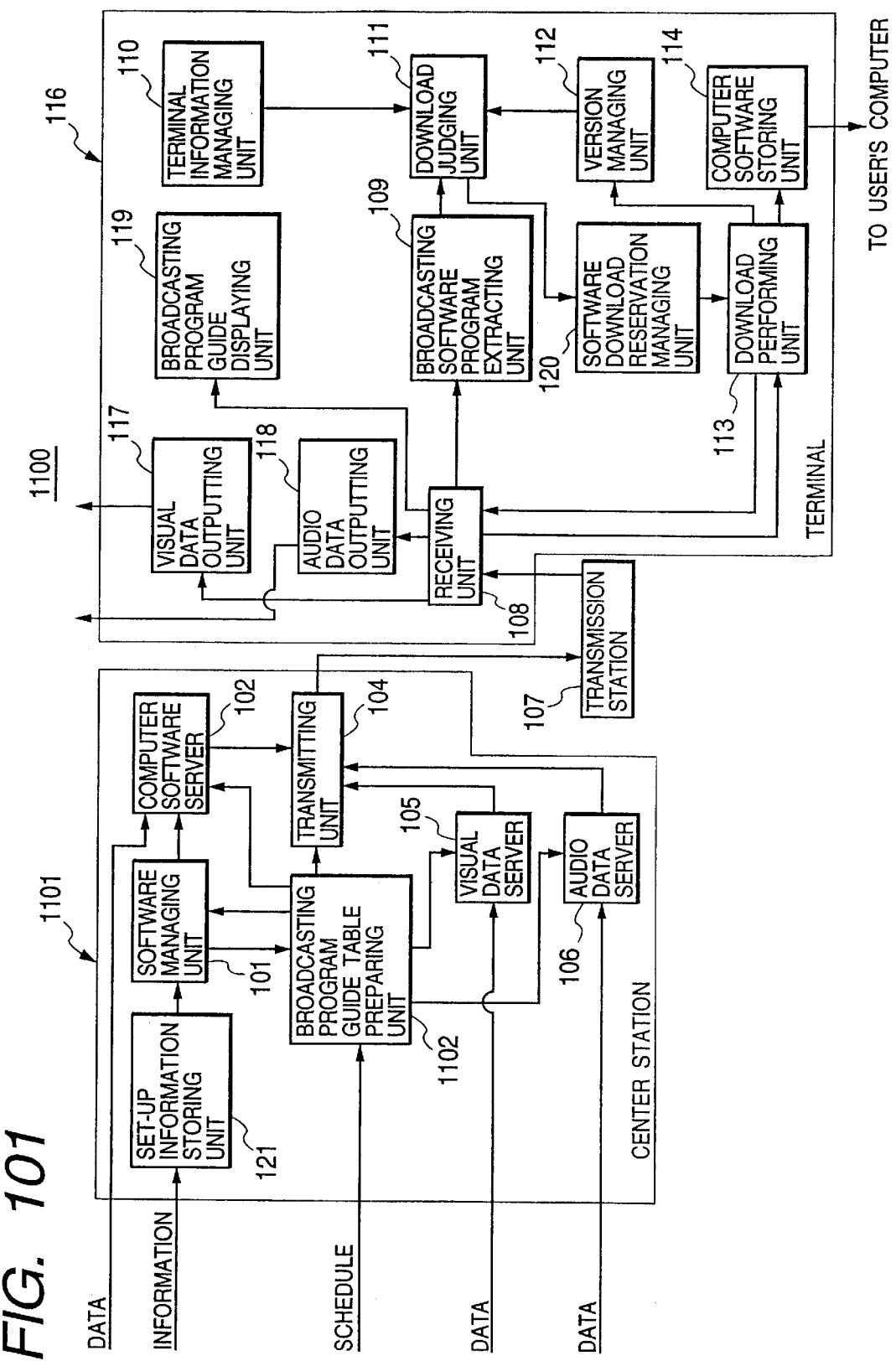
FIG. 101 is a block diagram of a software download system according to an eleventh embodiment of the present invention.

FIG. 101 is a block diagram of a software download system according to an eleventh embodiment of the present invention.

As shown in FIG. 101, a software download system 1100 comprises a center station 1101 for outputting a broadcasting program guide table in which guides of a plurality of broadcasting programs respectively not accompanied by any computer software product and guides of a plurality of computer software products are listed, outputting audio/video data of each broadcasting program during its transmission time period, and outputting each computer software product during its transmission time period at the same transmission channel as that of one broadcasting program when data of any broadcasting program is not transmitted;

the terminals 116 for respectively receiving the audio/video data of the broadcasting programs, the broadcasting program guide table and the computer software products from the center station 1101, outputting the audio/video data, and downloading updated computer software products selected from the computer software products; and the transmission station 107.

The center station 1101 comprises:

the computer software server 102; the set-up information storing unit 121; the software managing unit 101; the video data server 105; the audio data server 106;

a broadcasting program guide table preparing unit 1102 for managing a broadcasting program schedule listed in a schedule table (refer to FIG. 102) in which a date, a transmission channel, a transmission start time, a transmission finish time, a name and elements are listed for each broadcasting program and a date, a transmission channel, a transmission start time, a transmission finish time, elements and a name are listed for each computer software product, preparing a broadcasting program guide table (refer to FIG. 103) from the pieces of set-up information of the computer software products managed in the software managing unit 101 and the broadcasting program schedule, and controlling the computer software server 102, the video data server 105 and the audio data server 106 to output the audio/video data of each broadcasting program listed in the broadcasting program guide table during its transmission time period and to output the files of each computer software product listed in the broadcasting program guide table through a transmission channel during a specific time period in which data of any broadcasting program is not output from the servers 105 and 106 through the transmission channel; and the transmitting unit 104.

In the above configuration, a broadcasting program schedule listed in a schedule table is managed in the broadcasting program guide table preparing unit 1102. In the schedule table, as shown in FIG. 102, any audio/video data is not written as an element of each computer software product, but one or more files F1 are written as elements of each computer software product. a broadcasting program guide table is prepared from the schedule table and the set-up information of the computer software products. Therefore, as shown in FIG. 103, one or more files are written as the elements of each computer software product.

After the broadcasting program guide table is transmitted from the center station 1001 to each terminal 116 in the same manner as in the first embodiment, the audio/video data of each broadcasting program output from the servers 105 and 106 are transmitted from the center station 1001 to each terminal 116 during its transmission time period under the control of the preparing unit 1102 in the same manner as in the first embodiment.

Also, each computer software product listed in the broadcasting program guide table is output from the computer software server 102 and is transmitted to each terminal 116 through a transmission channel during a specific time period listed in the guide of the computer software product under the control of the preparing unit 1102. In this case, because any audio/video data is not written in the guide of the computer software product, any broadcasting program is not transmitted through the same transmission channel (or the same frequency band) as that for the data transmission of the computer software product. Thereafter, one or more updated computer software products are downloaded to the terminal 116 in the same manner as in the first embodiment, and updated version numbers of the updated computer software products are stored and managed in the version managing unit 112.

Accordingly, because each computer software product is transmitted to the terminal 116 through a transmission channel (or a frequency band) during a specific time period in which any broadcasting program is not transmitted through the transmission channel, any private channel (or any private frequency band) for the transmission of the computer software product is not required. That is, a frequency band for the data transmission can be effectively utilized.

Having illustrated and described the principles of the present invention in a preferred embodiment thereof, it should be readily apparent to those skilled in the art that the invention can be modified in arrangement and detail without departing from such principles. We claim all modifications coming within the scope of the accompanying claims.

What is claimed is:

1. A software download system for downloading a software product from a center station to a terminal through a transmission channel, the system comprising:

broadcast program guide preparing means, located in the center station, for preparing at least one guide of broadcast program(s) accompanied by the software product whose version number is a first version number, wherein the version number is changed each time the software product is revised in the center station;

broadcast program data storing means, located in the center station, for storing data of the broadcast program listed in the prepared guide of the broadcast program;

software storing means, located in the center station, for storing data of the software product listed in the prepared guide of the broadcast program;

transmitting means, located in the center station, for transmitting the prepared guide of the broadcast program accompanied by the software product, and transmitting the data of the software product with the data of the broadcast program during a time period of transmission of the broadcast program through the transmission channel under the control of the broadcast program guide preparing means;

receiving means, located in the terminal, for:
- receiving the guide to the broadcast program, accompanied by the software product, from the transmitting means transmitted through the transmission channel, and
- receiving the data of the software product with the data of the broadcast program during the time period of transmitting from the transmitting means through the transmission channel;

version number managing means, located in the terminal, for managing a second version number of the software product previously downloaded from the center station to the terminal;

download judging means, located in the terminal, for checking whether or not the first version number of the software product of the received guide differs from the managed second version number of the software product and deciding whether to download the received data of the software product to the terminal, where the first version number differs from the second version number;

downloading means, located in the terminal, for extracting the data of the software product from the received broadcast program in cases where the downloading of the software product has been accepted by the download judging means and for storing the data of the software product whereby to download the received software product from the center station to the terminal and to use the software product on a user's side;

download completion notice means, located in the terminal, for transmitting information about a download completion notice to the center station where the downloading of the software product performed by the downloading means is completed; and download record managing means, located in the center station, for managing a record of the downloading of the software product performed in the terminal by using the information contained in the download completion notice.

2. A software download system, according to claim 1, further comprising:
set up information storing means, located at the center station, for storing set up information indicating a first version number of the software product and a first version numbers of files of which the software product is comprised, wherein the set up information is added to the guide prepared by the broadcast program guide preparing means, wherein the appropriateness of downloading each file of the software product from the center station to the terminal is determined by the download judging means where the first version number of the file differs from the second version number of the file, and wherein the file that has been selected to be downloaded is extracted from the program being broadcast by the downloading means and is stored.

3. A software downloading system according to claim 2 in which the appropriateness of downloading a particular file of the software product from the center station to the terminal is judged by the download judging means where the first version number of the software product listed in the guide is newer than the second version number of the software product managed by the version number managing means and the first version number of the file is a newer than the second version number of the file managed by the version number managing means.

4. A software downloading system according to claim 1, further comprising:
set up information storing means, located at the center station, for storing set up information indicating a required specific terminal type, wherein the set up information is added to the guide prepared by the broadcast program guide preparing means; and terminal information managing means for managing a particular type of the terminal, wherein the appropriateness of downloading the software product from the center station to the terminal is determined by the download judging means where the particular terminal type agrees with the specific terminal type listed in the guide, and wherein the software product is extracted from the broadcast program by the downloading means and is stored.

5. A software download system according to claim 1, further comprising:
software download reservation managing means, located at the terminal, for managing the reservation of the software product to be transmitted for downloading with the broadcast program where the downloading of the software product is selected by the download judging means, and means for instructing the downloading means to download the software product to the terminal during the time period that the broadcast program is being transmitted.

6. A software download system according to claim 1, wherein the download record managing means comprises:
download completion notification judging means for judging whether or not the downloading of the software product performed by the downloading means has been completed; and download completion notice transmitting means for transmitting a download completion notice comprising: an identification number of the terminal and a name of the software product downloaded by the downloading means, to the center station where the download completion notification judging means has determined that the downloading of the software product performed by the downloading means has been completed.

7. A software download system according to claim 6, wherein: said download record managing means is configured to manage the record of the downloading of the software program corresponding to the identification number of the terminal and the name of the software product transmitted from the download completion notice transmitting means.

8. A software download system according to claim 6, further comprising:
set-up information storing means, located in the center station,, for storing set-up information including a download completion notification flag, wherein the set-up information is included in the guide prepared by the broadcast program guide preparing means, and wherein the notification of the downloading of the software product is adapted to be judged by the download completion notification judging means according to the download completion notification flag.

9. A software download system for downloading a software product from a center station terminal through a transmission channel, the system comprising:

broadcast program guide preparing means, located in a center station, for preparing first guides of a first group of broadcast programs and second guides of a second group of broadcast programs, each broadcast program of the first group being accompanied by a software product having a first version number, each broadcast program of the second group being unaccompanied by any software product, wherein the version number of the software product is adapted to be changed each time the software product is revised in the center station;

broadcast program data storing means, located in the center station, for storing data of each broadcast program;

a program guide preparing means adapted to prepare a program guide from said stored broadcast program data;

software storing means, located in the center station, for storing data of a software product, corresponding to the first version number of each software product, from which the guide is prepared by the broadcast program guide preparing means:

transmitting means, located in the center station, for transmitting the prepared guides to the broadcast programs, and adapted to transmit the data, of each broadcast program stored in the broadcast program data storing means, during a time period of transmitting the broadcast program, wherein said transmitting means is under the control of the program guide preparing means and is adapted transmit the data of each software product stored in the software storing means with the data of a broadcast program through the transmission channel of the broadcasting means under the control of the broadcasting program preparing means;

receiving means, located in the terminal, for receiving the guides of the broadcast programs from the transmitting means, and for receiving the data of the broadcast programs and the data of the software products from the transmitting means;

version number managing means, located in the terminal, for managing a second version number corresponding to each software product previously downloaded from the center station to the terminal;

broadcasting software program extracting means, located in the terminal, for extracting the guide of each broadcast program of the first group from the received guides as a guide of a broadcast software program;

download judging means, located in the terminal, for checking whether or not the first version number of the software product of the software program being broadcast differs from the second version number of the software product managed by the version number managing means and extracted by the broadcast software program extracting means, and for determining whether to download the software product of each broadcast software program received by the receiving means to the terminal where the first version number of the software product differs from the second version number of the software product;

downloading means, located in the terminal, for extracting the data of the software product from the received broadcast program during the transmission time period where downloading of the software product is permitted by the download judging means and for storing the data of the software product to download the received software product from the center station to the terminal and to use the software product on a users side;

software download reservation managing means, located in the terminal, for managing recording of a reservation for one or more recording-reserved broadcast programs selected from the second group of broadcast programs; and download-reserved broadcast program determining means, located in the terminal, for selecting a guide of a download-reserved broadcast program from among guides to one or more broadcast programs, of which software products are judged, by the download judging means, to be downloaded to the terminal, on condition that a transmission time period of the download-reserved broadcast program does not overlap with the transmission time period of any recording-reserved broadcast program managed by the software download reservation managing means, wherein the software product transmitted with the download-reserved broadcast program is downloaded by the downloading means.

10. A software download system according to claim 9, in which the guide of the download-reserved broadcast program is selected on condition that a transmission start time of the download-reserved broadcast program is later than the current date and time.

11. A software download system according to claim 9, in which a plurality of guides to broadcast programs with the same particular software product are prepared by the broadcast program guide preparing means, data of the broadcast programs stored in the broadcast program data storing means are transmitted by the transmitting means during different transmission time periods, at least one name-checked broadcast program with the particular software product being selected from the broadcast programs with the same particular software product by the download-reserved broadcast program determining means on condition that a transmission time period of each name-checked broadcast program does not overlap with the transmission time period of any recording-reserved broadcast program, and the download-reserved broadcast program with the particular software product being selected from the name-checked broadcast programs by the download-reserved broadcast program determining means on condition that the download-reserved broadcast program is the earliest in its transmission start time from among the name-checked broadcast programs.

12. A software download system for downloading a software product from a center station to a terminal through a transmission channel, the system comprising:

broadcast program ,guide preparing means, located in a center station, for preparing guides of a first group of broadcast programs and guides of a second group of broadcast programs, each broadcast program of the first group being accompanied by the software product of which version number is a first version number, each broadcast program of the second group being unaccompanied by any software product, and a version number of the software product being changed each time the software product is revised in he center r station;

broadcast program data storing means, located in the center station, for storing data of each broadcast program from which the guide is prepared by the broadcast program guide preparing means;

software storing means, located in the center station, for storing data of a software product corresponding to the first version number for each software product of which the guide is prepared by the broadcast program guide preparing means;

transmitting means, located in the center station, for transmitting the prepared guides of the broadcast programs, transmitting the data of each broadcast program stored in the broadcast program data storing means, during a transmission time period of the broadcast program, under the control of the broadcast program guide preparing means, and transmitting the data of each software product stored in the software storing means with the data of a broadcast program under the control of the broadcast program guide preparing means;

receiving means, located in the terminal, for receiving the guides of the broadcast programs from the transmitting means, and for receiving the data of the broadcast programs and the data of the software products from the transmitting means;

version number managing means, located in the terminal, for managing a second version number corresponding to each software product previously downloaded from the center station to the terminal;

broadcast software program extracting means, located in the terminal, for extracting the guide of each broadcast program of the first group from the received guides as a guide of one broadcast software program;

download judging means, located in the terminal, for checking whether or not the first version number of the software product of the broadcast software program of each guide, that is extracted by the broadcast software program extracting means, differs from the second version number of the software product managed by the version number managing means and determining whether to download the software product of a broadcast software program received by the receiving means to the terminal where the first version number of the software product differs from the second version number of the software product;

downloading means, located in the terminal, for extracting the data of the software product from the received broadcast program during the transmission time period where the downloading of the software product is judged by the download judging means and for storing the data of the software product to download the received software product from the center station to the terminal and to use the software product on user's side;

software download reservation managing means, located in the terminal, for managing the recording reservation for one or more first recording-reserved broadcast programs selected from the second group of broadcast programs, and newly managing the recording reservation for a second recording-reserved broadcasting program selected from the second group of broadcasting programs;

download-reserved broadcast program determining means, located in the terminal, for selecting a guide of a first particular download-reserved broadcast program from guides of one or more particular broadcasting programs, which include the same particular software product determined by the download judging means to be downloaded to the terminal, on condition that a transmission time period of the first download-reserved broadcasting program does not overlap with the transmission time period of any of the first recording-reserved broadcast program managed by the software download reservation managing means; and duplication reservation detecting means, located in the terminal, for detecting that a transmission time period of the first particular download-reserved broadcasting program overlaps with the transmission time period of the second recording-desired broadcast program newly managed by the software download reservation managing means, transmitting information indicating the duplication reservation of the first particular download-reserved broadcast program to the download-reserved broadcast program determining means to select a guide of a second particular download-reserved broadcast program relating to a specific transmission time period from the guides of the particular broadcast programs in the download-reserved broadcasting program determining means on condition that the specific transmission time period of the second particular download-reserved broadcasting program does not overlap with the transmission time period of any first recording-desired broadcast program or the second recording-desired broadcasting program, and transmitting the guide of the second particular download-reserved broadcast program relating to the specific transmission time period to the software product transmitted with the second particular download-reserved broadcasting program downloaded by the downloading means at the specific transmission time period under the control of the software download reservation managing means.

13. A software download system according to claim 12, in which the guide of the first particular download-reserved broadcast program and the guide of the second particular download-reserved broadcast program are selected on condition that a transmission start time of each download-reserved broadcast program follows current date and time.

14. A software download system for downloading a software product from a center station to a terminal through a transmission channel, the system comprising:

broadcast program guide preparing means, located in the center station, for preparing a guide of a broadcast program accompanied by the software product whose version number is a first version number, the version number being adapted to be changed each time the software product is revised in the center station;

broadcast program data storing means, located in the center station, for storing data of the broadcast program listed in the prepared guide of the broadcasting program;

software storing means, located in the center station, for storing data of the software product listed in the prepared guide of the broadcast program;

transmitting means, located in the center station, for transmitting the prepared guide of the broadcast program accompanied by the software product, and transmitting the data of the software product with the data of the broadcast program during a transmission time period of the broadcast program through the transmission channel of the broadcast program under the control of the broadcast program guide preparing means;

receiving means, located in the terminal, for receiving the guide of the broadcast program accompanied by the software product from the transmitting means transmitted through the transmission channel, and receiving the data of the software product with the data of the broadcast program, during the transmission time period, from the transmitting means and transmitted through the transmission channel;

version number managing means, located in the terminal, for managing a second version number of the software product previously downloaded from the center station to the terminal, download judging means, located in the terminal, for checking whether or not the first version number of the software product of the received guide differs from the managed second version number of the software product and determining whether to download the received data of the software product to the terminal where the first version number differs from the second version number;

downloading means, located in the terminal, for extracting the data of the software product from the received broadcast program in cases where the downloading of the software product is judged by the download judging means and for storing the data of the software product from the center station to the terminal and to use the software product on a user's side;

protocol processing means, located in the center station, for processing the stored data of the software product according to a particular software communication protocol to produce a particular protocol-processed software product that is communicable according to the particular software communication protocol, a name of the particular software communication protocol being listed in the prepared guide of the broadcast program, the particular protocol-processed software product being adapted to be transmitted from the transmitting means to the receiving means of the terminal though the transmission channel, and the particular protocol-processed software product being adapted to be received by the receiving means;

protocol processing program storing means, located in the terminal, for storing one or more protocol processing programs respectively used for a protocol processing in which one protocol-processed software product, communicable according to one software communication protocol, is changed to data of one software product;

protocol correspondence table holding means, located in the terminal, for holding a protocol correspondence table in which the correspondence of one software communication protocol and one protocol processing program is listed for each protocol processing program stored in the protocol processing program storing means;

software communication protocol judging means, located in the terminal, for checking whether or not the particular software communication protocol, whose name is listed in the guide of the received broadcast program, is listed in the held protocol correspondence table in cases where the download judging means decides to download the software product, and adapted to output the name of the particular software communication protocol in cases where the particular software communication protocol is listed in the protocol correspondence table; and protocol processing performing means, located in the terminal, for receiving the name of the judged particular software communication protocol, extracting a particular protocol processing program corresponding to the particular software communication protocol from the protocol processing program storing means, performing a protocol processing for the received particular protocol-processed software product according to the particular protocol processing program to change the particular protocol-processed software product to the software product being downloaded by the downloading means.

15. A software download system for downloading a software product from a center station to a terminal through a transmission channel, the system comprising:

broadcast program guide preparing means, located in a center station, for preparing at least one guide comprising a first group of programs for broadcasting and at least one guide comprising a second group of programs for broadcasting,
wherein each program of the first group is accompanied by a software product having a version number that is a first version number,
wherein each program of the second group is unaccompanied by any software product, and
wherein a version number of the software product is changed each time the software product is revised in the center station;

broadcast program data storing means, located in the center station, for storing data of each broadcast program that has a guide that has been prepared by the broadcast program preparing means;

software storing means, located in the center station, for storing data of a software product corresponding to the first version number for each software product from which the guide has been prepared by the broadcast program; guide preparing means;

transmitting means, located in the center station, through the transmission channel, for transmitting the prepared guides of the broadcast programs, adapted to transmit the data of each broadcast program that has been stored in the broadcast program data storing means during a time period of the transmission of a broadcast program under the control of the broadcast program guide preparing means, and adapted to transmit the data of each software product stored in the software storing means with the data of one broadcast program through the transmission channel of the broadcast program under the control of the broadcast program guide preparing means;

receiving means, located in the terminal, for receiving the guide(s) related to the broadcast programs from the transmitting means, and adapted to receive the data of the broadcast programs and the data of the software products from the transmitting means;

version number managing means, located in the terminal, for managing a second version number corresponding to each software product previously downloaded from the center station to the terminal;

broadcast software program extracting means, located in the terminal, for extracting the guide related to each broadcast program of the first group from the received guides of one broadcasting software program;

download judging mean, located in the terminal, for checking whether or not the first version number of the software product of the broadcasting software program of each guide, that has been extracted by the broadcast software program extracting means, differs from the second version number of the software product managed by the version number managing means and deciding whether to download the software product of each broadcasting software program received by the receiving means to the terminal where the first version number of the software product differs from the second version number of the software product;

downloading means, located in the terminal, for extracting the data of the software product from the received broadcast program during the transmission time period where the downloading of the software product is judged by the download judging means and adapted to store the data of the software product to download the received software product from the center station to the terminal and to use the software product on a user's side; and audience rating managing means, located in the center station, for managing a broadcast program audience rating table in which an audience rating of each broadcast program whose guide has been prepared by the broadcast program guide preparing means is listed, wherein the broadcast program guide preparing means includes means for setting a broadcast program having a high audience rating as a specific broadcast program not accompanied by a software product on condition that the particular broadcast program with the particular software product is in a different transmission channel from each other channel and in the same transmission time period to each other.

* * * * *